United States Patent
Koseoglu

(10) Patent No.: US 11,124,716 B2
(45) Date of Patent: *Sep. 21, 2021

(54) PROCESSES AND SYSTEMS FOR PETROCHEMICAL PRODUCTION INTEGRATING COKING AND DEEP HYDROGENATION OF COKING REACTION PRODUCTS

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/787,529

(22) Filed: Feb. 11, 2020

(65) Prior Publication Data

US 2021/0246385 A1    Aug. 12, 2021

(51) Int. Cl.
*C10G 69/06* (2006.01)
*C10G 45/54* (2006.01)
(Continued)

(52) U.S. Cl.
CPC ............ *C10G 69/06* (2013.01); *B01J 19/245* (2013.01); *C10G 45/52* (2013.01); *C10G 45/54* (2013.01); *B01J 2219/0004* (2013.01); *C10G 2300/107* (2013.01); *C10G 2300/1044* (2013.01); *C10G 2300/4006* (2013.01); *C10G 2300/4012* (2013.01); *C10G 2300/4018* (2013.01); *C10G 2400/20* (2013.01); *C10G 2400/30* (2013.01)

(58) Field of Classification Search
CPC ........ C10G 9/005; C10G 69/06; C10G 45/46; C10G 45/52–54
See application file for complete search history.

(56) References Cited

U.S. PATENT DOCUMENTS

| 4,404,092 A * | 9/1983 | Audeh .................. C10G 9/005 208/106 |
| 5,314,511 A | 5/1994 | Liotta, Jr. et al. |

(Continued)

FOREIGN PATENT DOCUMENTS

| CN | 103333713 A1 | 10/2002 |
| CN | 1162516 C | 8/2004 |

(Continued)

OTHER PUBLICATIONS

Elsayed, H.A. et al, "Upgrading of coker distillate under variable hydrotreating operating conditions", Egyptian Journal of Petroleum (2011), 20, pp. 25-31 (Year: 2011).*

(Continued)

*Primary Examiner* — Renee Robinson
(74) *Attorney, Agent, or Firm* — Abelman, Frayne & Schwab

(57) ABSTRACT

A feedstock is processed in a coking zone unit to produce at least light gases, coker naphtha, light coker gas oil and petroleum coke. Light coker gas oil, and in certain embodiments hydrotreated light coker gas oil, is subjected to deep hydrogenation to produce a deeply hydrogenated middle distillate fraction. All or a portion of the deeply hydrogenated middle distillate fraction is used as feed to the stream cracking zone to produce light olefins.

25 Claims, 6 Drawing Sheets

(51) Int. Cl.
  *C10G 45/52* (2006.01)
  *B01J 19/24* (2006.01)

(56) References Cited

U.S. PATENT DOCUMENTS

| | | | |
|---|---|---|---|
| 6,210,561 B1* | 4/2001 | Bradow | C10G 45/08 |
| | | | 208/130 |
| 9,221,036 B2 | 12/2015 | Koseoglu et al. | |
| 9,315,742 B2 | 4/2016 | Kubry et al. | |
| 10,081,009 B2 | 9/2018 | Koseoglu et al. | |
| 10,407,630 B2 | 9/2019 | Al-Ghamdi et al. | |
| 10,472,574 B2 | 11/2019 | Al-Ghamdi et al. | |
| 10,472,579 B2 | 11/2019 | Al-Ghamdi | |
| 10,472,580 B2 | 11/2019 | Al-Ghamdi et al. | |
| 10,487,275 B2 | 11/2019 | Al-Ghamdi et al. | |
| 10,487,276 B2 | 11/2019 | Al-Ghamdi et al. | |
| 10,619,112 B2 | 4/2020 | Al-Ghamdi | |
| 2007/0090018 A1 | 4/2007 | Keusenkothen et al. | |
| 2012/0298552 A1* | 11/2012 | Koseoglu | C10G 55/06 |
| | | | 208/95 |
| 2013/0213859 A1* | 8/2013 | Etter | C10G 9/005 |
| | | | 208/52 R |
| 2018/0057758 A1 | 3/2018 | Al-Ghamdi et al. | |
| 2018/0142168 A1 | 5/2018 | Al-Ghamdi | |
| 2018/0155633 A1* | 6/2018 | Al-Ghamdi | C10G 47/00 |
| 2018/0155642 A1 | 6/2018 | Al-Ghamdi et al. | |
| 2018/0223197 A1 | 8/2018 | Al-Ghamdi et al. | |

FOREIGN PATENT DOCUMENTS

| | | |
|---|---|---|
| CN | 1294239 C | 1/2007 |
| CN | 101942330 B | 6/2013 |
| CN | 103333713 A | 10/2013 |
| CN | 105647573 B | 7/2017 |
| CN | 105273754 B | 3/2018 |
| DE | 157199 A1 | 10/1982 |
| MX | 933823 B | 6/1993 |
| MX | 190308 B | 11/1998 |
| WO | 2015000849 A1 | 1/2015 |
| WO | 2017133975 A1 | 8/2017 |
| WO | 2017146876 A1 | 8/2017 |
| WO | 2018094336 A1 | 5/2018 |

OTHER PUBLICATIONS

Cheng, Zhen-Min et al., "Deep removal of sulfur and aromatics from diesel through two-stage concurrently and countercurrently operated fixed-bed reactors", Chemical Engineering Science, vol. 59, Issues 22-23, Nov.-Dec. 2004, pp. 5465-5472 (abstract only).
Gupta, M. et al., "Nanowire catalysts for ultra-deep hydrodesulfurization and aromatic hydrogenation", Applied Catalysis B: Environmental, vol. 180, Jan. 2016, pp. 246-254 (abstract only).
Resasco, Daniel E., "Combined deep hydrogenation and ring opening of poly-aromatic hydrocarbons for diesel quality improvement", PETR 47, The 229th ACS National Meeting in San Diego, CA, Mar. 13-17, 2005 (abstract only).
Cheng, ZM et al., "Deep removal of sulfur and aromatics from diesel through two-stage concurrently and countercurrently operated fixed-bed reactors," Chemical Engineering Science | 59 (22-23): 5465-5472 Nov.-Dec. 2004 (Abstract).
Gupta, M et al., "Nanowire catalysts for ultra-deep hydrodesulfurization and aromatic hydrogenation," Applied Catalysis B-Environmental | 180: 246-254 Jan. 2016 (Abstract).
Resasco, DE et al., "Combined deep hydrogenation and ring opening of poly-aromatic hydrocarbons for diesel quality improvement," Abstracts of Papers of the American Chemical Society | 229: U594-U594 047-PETR Part 2 Mar. 13, 2005.
International Search Report from corresponding PCT Application No. PCT/US2021/017693 dated May 3, 2021.

* cited by examiner

PROCESSES AND SYSTEMS FOR PETROCHEMICAL PRODUCTION INTEGRATING COKING AND DEEP HYDROGENATION OF COKING REACTION PRODUCTS

RELATED APPLICATIONS

Not applicable.

BACKGROUND OF THE INVENTION

Field of the Invention

The inventions disclosed herein relate to deep hydrogenation of middle distillates for conversion into feedstocks suitable for steam cracking to produce light olefins, and an integrated process and system for converting crude oil to petrochemicals integrating deep hydrogenation of middle distillates.

Description of Related Art

Processing options for crude oil fractions are typically as follows: light naphtha streams from crude oil distillation and/or from other processing units are sent to an isomerization unit to convert straight-chain paraffins into isomers which have higher octane numbers to produce gasoline blending component; heavy naphtha streams from crude oil distillation, coker, and cracking units are fed to a catalytic reformer to improve octane numbers, and products from the catalytic reformer can be blended into regular and premium gasolines for marketing; middle distillates from the crude oil distillation and other processing unit are blended into diesel fuels, jet fuels and/or furnace oils, directly or following hydrotreating to obtain ultra-low sulfur diesel; vacuum gas oil is hydrocracked to produce diesel or fluid catalytically cracked to obtain gasoline; the vacuum residue fraction can be subjected to hydroprocessing, delayed or fluid coking, thermal cracking, solvent deasphalting, gasification, or visbreaking.

Conventional refineries are designed and built to produce transportation fuels such as gasoline and diesel. With the increasing demand for light olefins such as ethylene and propylene as chemical building blocks, and increasing cost of conventional feedstocks, refiners and petrochemical producers are exploring new processing options to convert crude oil to produce light olefins and aromatics. In a typical refinery, the naphtha stream is typically hydrotreated to remove sulfur and nitrogen and then sent to a catalytic reforming unit to produce gasoline.

In refineries integrating light olefin production, one or more naphtha streams are routed to a steam cracking complex to produce light olefins. The lower olefins (i.e., ethylene, propylene, butylene and butadiene) are basic intermediates which are widely used in the petrochemical and chemical industries. Thermal cracking, or steam pyrolysis, is a major type of process for forming these materials, typically in the presence of steam, and in the absence of oxygen. In such refineries, middle distillates are typically fractioned between a kerosene range fraction and a diesel range fraction to produce jet fuels and diesel/furnace oil fuels, respectively. For instance, a diesel range fraction is subjected to hydrotreating, typically followed by other hydroprocessing to produce diesel fuels and/or furnace oils.

A need remains in the art for improved processes for converting crude oil to basic chemical intermediates such as lower olefins. In addition, a need remains in the art for new approaches that offer higher value chemical production opportunities with greater leverage on economies of scale.

SUMMARY

In accordance with one or more embodiments, a system and process are provided for deep hydrogenation of hydrotreated middle distillates to produce an effluent that is suitable as a feedstock to a steam cracking complex.

In accordance with one or more embodiments, the invention relates to an integrated process for producing petrochemicals. A suitable feedstock is processed in a coking unit to produce at least light gases, coker naphtha, light coker gas oil, heavy coker gas oil, and coke. Light coker gas oil, and in certain embodiments hydrotreated light coker gas oil is subjected to deep hydrogenation to produce a deeply hydrogenated middle distillate fraction. All or a portion of the deeply hydrogenated middle distillate fraction is used as feed to the stream cracking zone, to produce lower olefins, pyrolysis gasoline and pyrolysis oil. The products from the steam cracking zone $H_2$, methane, ethane, ethylene, mixed C3s and mixed C4s; pyrolysis gasoline stream(s); and pyrolysis oil stream(s). From the mixed product stream(s) C3s and the mixed C4s, petrochemicals ethylene, propylene and butylenes are recovered. Ethane and non-olefinic C3s are recycled to the steam cracking zone, and non-olefinic C4s are recycled to the steam cracking zone or to a separate processing zone for production of additional petrochemicals.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DESCRIPTION

Figure 1:
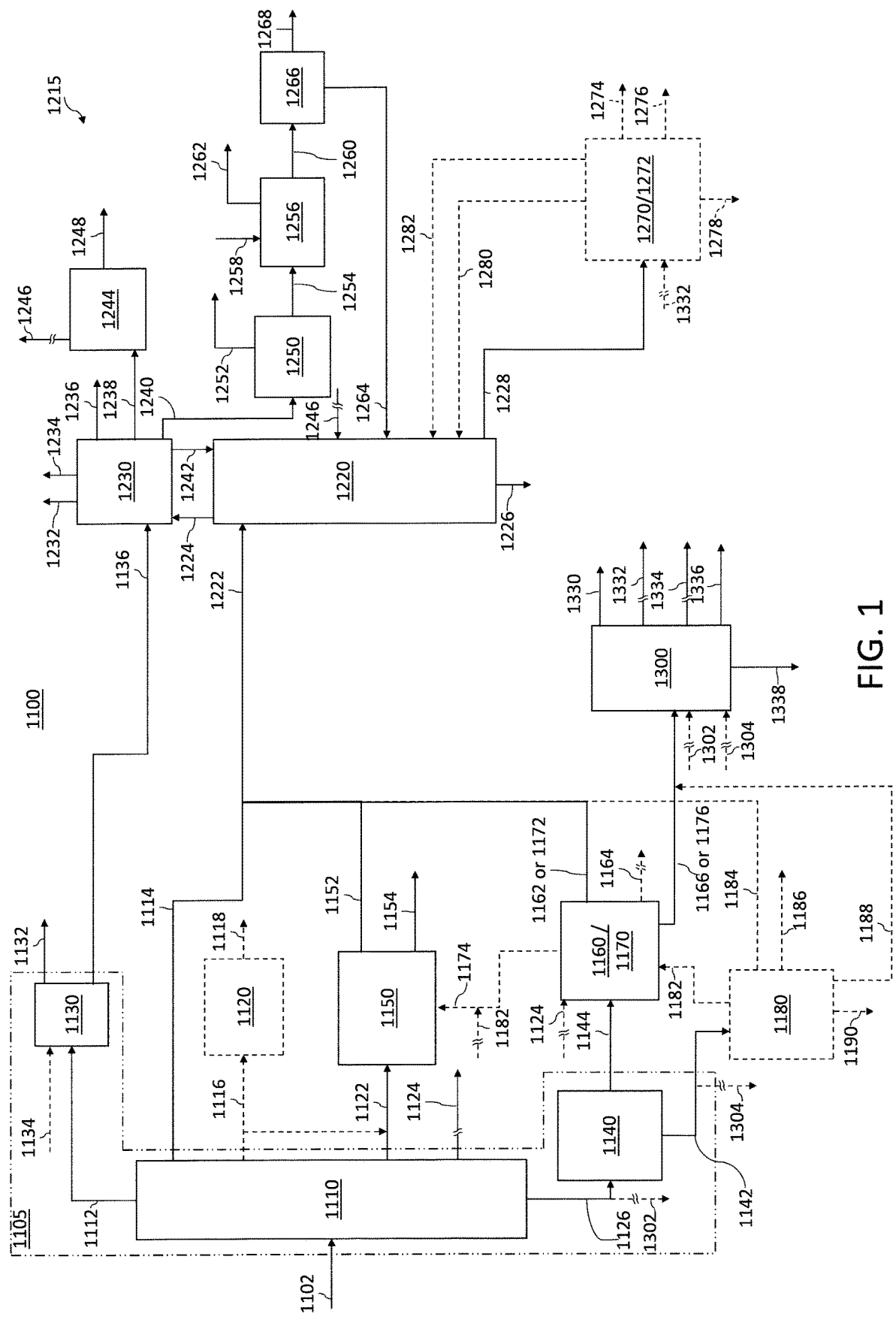
FIG. 1 schematically depicts an embodiment of a process for producing petrochemicals and fuel products integrating coking of certain feeds within a refinery system and a steam cracker complex.

Process scheme configurations are disclosed that enable conversion of crude oil feeds with several processing units in an integrated manner into petrochemicals. The designs utilize minimum capital expenditures to prepare suitable feedstocks for the steam cracker complex. The integrated process for converting crude oil to petrochemical products includes steam cracking of deeply hydrogenated middle distillate fractions. Feeds to the steam cracker are derived from straight run middle distillates, and one or more middle distillate fractions from hydroprocessing zones within the battery limits.

The phrase "a major portion" with respect to a particular stream or plural streams means at least about 50 wt % and up to 100 wt %, or the same values of another specified unit.

The phrase "a significant portion" with respect to a particular stream or plural streams means at least about 75 wt % and up to 100 wt %, or the same values of another specified unit.

The phrase "a substantial portion" with respect to a particular stream or plural streams means at least about 90, 95, 98 or 99 wt % and up to 100 wt %, or the same values of another specified unit.

The phrase "a minor portion" with respect to a particular stream or plural streams means from about 1, 2, 4 or 10 wt %, up to about 20, 30, 40 or 50 wt %, or the same values of another specified unit.

The term "crude oil" as used herein refers to petroleum extracted from geologic formations in its unrefined form. Crude oil suitable as the source material for the processes herein include Arabian Heavy, Arabian Light, Arabian Extra Light, other Gulf crudes, Brent, North Sea crudes, North and West African crudes, Indonesian, Chinese crudes, or mixtures thereof. The crude petroleum mixtures can be whole range crude oil or topped crude oil. As used herein, "crude oil" also refers to such mixtures that have undergone some pre-treatment such as water-oil separation; and/or gas-oil separation; and/or desalting; and/or stabilization. In certain embodiments, crude oil refers to any of such mixtures having an API gravity (ASTM D287 standard), of greater than or equal to about 20°, 30°, 32°, 34°, 36°, 38°, 40°, 420 or 44°.

The acronym "LPG" as used herein refers to the well-known acronym for the term "liquefied petroleum gas," and generally is a mixture of C3-C4 hydrocarbons. In certain embodiments, these are also referred to as "light ends."

As used herein, all boiling point ranges relative to hydrocarbon fractions derived from crude oil via atmospheric and/or shall refer to True Boiling Point values obtained from a crude oil assay, or a commercially acceptable equivalent.

The term "naphtha" as used herein refers to hydrocarbons boiling in the range of about 20-220, 20-210, 20-200, 20-190, 20-180, 20-170, 32-220, 32-210, 32-200, 32-190, 32-180, 32-170, 36-220, 36-210, 36-200, 36-190, 36-180 or 36-170° C.

The term "light naphtha" as used herein refers to hydrocarbons boiling in the range of about 20-110, 20-100, 20-90, 20-88, 32-110, 32-100, 32-90, 32-88, 36-110, 36-100, 36-90 or 36-88° C.

The term "heavy naphtha" as used herein refers to hydrocarbons boiling in the range of about 90-220, 90-210, 90-200, 90-190, 90-180, 90-170, 93-220, 93-210, 93-200, 93-190, 93-180, 93-170, 100-220, 100-210, 100-200, 100-190, 100-180, 100-170, 110-220, 110-210, 110-200, 110-190, 110-180 or 110-170° C.

In certain embodiments naphtha, light naphtha and/or heavy naphtha refer to such petroleum fractions obtained by crude oil distillation, or distillation of intermediate refinery processes as described herein.

The term "middle distillates" as used herein relative to effluents from the atmospheric distillation unit or flash zone refers to hydrocarbons boiling in the range of about 170-370, 170-360, 170-350, 170-340, 170-320, 180-370, 180-360, 180-350, 180-340, 180-320, 190-370, 190-360, 190-350, 190-340, 190-320, 200-370, 200-360, 200-350, 200-340, 200-320, 210-370, 210-210, 210-350, 210-340, 210-320, 220-370, 220-220, 220-350, 220-340 or 220-320° C.

The modifying term "straight run" is used herein having its well-known meaning, that is, describing fractions derived directly from the atmospheric distillation unit, optionally subjected to steam stripping, without other refinery treatment such as hydroprocessing, delayed coking or steam cracking. An example of this is "straight run naphtha" and its acronym "SRN" which accordingly refers to "naphtha" defined above that is derived directly from the atmospheric distillation unit, optionally subjected to steam stripping, as is well known.

The term "kerosene" as used herein refers to hydrocarbons boiling in the range of about 160-280, 160-270, 160-260, 170-280, 170-270, 170-260, 180-280, 180-270, 180-260, 190-280, 190-270, 190-260, 193-280, 193-270 or 193-260° C.

The term "light kerosene" as used herein refers to hydrocarbons boiling in the range of about 160-250, 160-235, 160-230, 160-225, 170-250, 170-235, 170-230, 170-225, 180-250, 180-235, 180-230, 180-225, 190-250, 190-235, 190-230 or 190-225° C.

The term "heavy kerosene" as used herein refers to hydrocarbons boiling in the range of about 225-280, 225-270, 225-260, 230-280, 230-270, 230-260, 235-280, 235-270, 235-260 or 250-280° C.

The term "atmospheric gas oil" and its acronym "AGO" as used herein refer to hydrocarbons boiling in the range of about 250-400, 250-380, 250-370, 250-360, 250-340, 250-320, 260-400, 260-380, 260-370, 260-360, 260-340, 260-320, 270-400, 270-380, 270-370, 270-360, 270-340 or 270-320° C.

The term "heavy atmospheric gas oil" and its acronym "H-AGO" as used herein in certain embodiments refer to the heaviest cut of hydrocarbons in the AGO boiling range including the upper 3-30° C. range (for example, for AGO having a range of about 250-360° C., the range of H-AGO includes an initial boiling point from about 330-357° C. and an end boiling point of about 360° C.). For example, H-AGO can include hydrocarbons boiling in the range of about 290-400, 290-380, 290-370, 310-400, 310-380, 310-370, 330-400, 330-380, 330-370, 340-400, 340-380, 340-370, 350-400, 350-380, 350-370, 360-370, 365-370, 290-360, 310-360, 330-360, 340-360, 350-360, 355-360, 290-340, 310-340, 330-340, 335-340, 290-320, 310-320 or 315-320° C.

The term "medium atmospheric gas oil" and its acronym "M-AGO" as used herein in certain embodiments in conjunction with H-AGO to refer to the remaining AGO after H-AGO is removed, that is, hydrocarbons in the AGO boiling range excluding the upper about 3-30° C. range (for example, for AGO having a range of about 250-360° C., the range of M-AGO includes an initial boiling point of about 250° C. and an end boiling point of from about 330-357° C.). For example, M-AGO can include hydrocarbons boiling in the range of about 250-365, 250-355, 250-335, 250-315, 260-365, 260-355, 260-335, 260-315, 270-365, 270-355, 270-335 or 270-315° C.

In certain embodiments, the term "diesel" is used with reference to a straight run fraction from the atmospheric distillation unit, for instance containing hydrocarbons boiling in the nominal range of about 180-370° C. In embodiments in which this terminology is used herein, the diesel fraction also refers to medium AGO range hydrocarbons and in certain embodiments also in combination with heavy kerosene range hydrocarbons.

The term "atmospheric residue" and its acronym "AR" as used herein refer to the bottom hydrocarbons having an initial boiling point corresponding to the end point of the AGO range hydrocarbons, and having an end point based on the characteristics of the crude oil feed.

The term "vacuum gas oil" and its acronym "VGO" as used herein refer to hydrocarbons boiling in the range of about 370-550, 370-540, 370-530, 370-510, 400-550, 400-540, 400-530, 400-510, 420-550, 420-540, 420-530 or 420-510° C.

The term "light vacuum gas oil" and its acronym "LVGO" as used herein refer to hydrocarbons boiling in the range of about 370-425, 370-415, 370-405, 370-395, 380-425, 390-425 or 400-425° C.

The term "heavy vacuum gas oil" and its acronym "HVGO" as used herein refer to hydrocarbons boiling in the range of about 425-550, 425-540, 425-530, 425-510, 450-550, 450-540, 450-530 or 450-510° C.

The term "vacuum residue" and its acronym "VR" as used herein refer to the bottom hydrocarbons having an initial boiling point corresponding to the end point of the VGO range hydrocarbons, and having an end point based on the characteristics of the crude oil feed.

The term "fuels" refers to crude oil-derived products used as energy carriers. Fuels commonly produced by oil refineries include, but are not limited to, gasoline, jet fuel, diesel fuel, fuel oil and petroleum coke. Unlike petrochemicals, which are a collection of well-defined compounds, fuels typically are complex mixtures of different hydrocarbon compounds.

The terms "kerosene fuel" or "kerosene fuel products" refer to fuel products used as energy carriers, such as jet fuel or other kerosene range fuel products (and precursors for producing such jet fuel or other kerosene range fuel products). Kerosene fuel includes but is not limited to kerosene fuel products meeting Jet A or Jet A-1 jet fuel specifications.

The terms "diesel fuel" and "diesel fuel products" refer to fuel products used as energy carriers suitable for compression-ignition engines (and precursors for producing such fuel products). Diesel fuel includes but is not limited to ultra-low sulfur diesel compliant with Euro V diesel standards.

The term "aromatic hydrocarbons" or "aromatics" is very well known in the art. Accordingly, the term "aromatic hydrocarbon" relates to cyclically conjugated hydrocarbons with a stability (due to delocalization) that is significantly greater than that of a hypothetical localized structure (for example, Kekule structure). The most common method for determining aromaticity of a given hydrocarbon is the observation of diatropicity in its 1H NMR spectrum, for example the presence of chemical shifts in the range of from 7.2 to 7.3 ppm for benzene ring protons.

The term "wild naphtha" is used herein to refer to naphtha products derived from hydroprocessing units such as distillate hydrotreating units, diesel hydrotreating units and/or gas oil hydroprocessing units.

The term "unconverted oil" and its acronym "UCO," is used herein having its known meaning, and refers to a highly paraffinic fraction from a hydrocracker with a low nitrogen, sulfur and Ni content and including hydrocarbons having an initial boiling point corresponding to the end point of the AGO range hydrocarbons, in certain embodiments the initial boiling point in the range of about 340-370° C., for instance about 340, 360 or 370° C., and an end point in the range of about 510-560° C., for instance about 540, 550 or 560° C. UCO is also known in the industry by other synonyms including "hydrowax."

The term "C # hydrocarbons" or "C #", is used herein having its well-known meaning, that is, wherein "#" is an integer value, and means hydrocarbons having that value of carbon atoms.

The term "C #+ hydrocarbons" or "C #+" refers to hydrocarbons having that value or more carbon atoms. The term "C #− hydrocarbons" or "C #−" refers to hydrocarbons having that value or less carbon atoms. Similarly, ranges are also set forth, for instance, C1-C3 means a mixture comprising C1, C2 and C3.

The term "petrochemicals" or "petrochemical products" refers to chemical products derived from crude oil that are not used as fuels. Petrochemical products include olefins and aromatics that are used as a basic feedstock for producing chemicals and polymers. Typical olefinic petrochemical products include, but are not limited to, ethylene, propylene, butadiene, butylene-1, isobutylene, isoprene, cyclopentadiene and styrene. Typical aromatic petrochemical products include, but are not limited to, benzene, toluene, xylene, and ethyl benzene.

The term "olefin" is used herein having its well-known meaning, that is, unsaturated hydrocarbons containing at least one carbon-carbon double bond. In plural, the term "olefins" means a mixture comprising two or more unsaturated hydrocarbons containing at least one carbon-carbon double bond. In certain embodiments, the term "olefins" relates to a mixture comprising two or more of ethylene, propylene, butadiene, butylene-1, isobutylene, isoprene and cyclopentadiene.

The term "BTX" as used herein refers to the well-known acronym for benzene, toluene and xylenes.

The term "make-up hydrogen" is used herein with reference to hydroprocessing zones to refer to hydrogen requirements of the zone that exceed recycle from conventionally integrated separation vessels; in certain embodiments as used herein all or a portion of the make-up hydrogen in any given hydroprocessing zone or reactor within a zone is from gases derived from the steam cracking zone(s) in the integrated processes and systems.

The term "crude to chemicals conversion" as used herein refers to conversion of crude oil into petrochemicals including but not limited to lower olefins such as ethylene, propylene, butylenes (including isobutylene), butadiene, MTBE, butanols, benzene, ethylbenzene, toluene, xylenes, and derivatives of the foregoing.

The term "crude to chemicals conversion ratio" as used herein refers to the ratio, on a mass basis, of the influent crude oil before desalting, to petrochemicals.

The term "crude C4" refers to the mixed C4 effluent from a steam cracking zone.

The term "C4 Raffinate 1" or "C4 Raff-1" refers to the mixed C4s stream leaving the butadiene extraction unit, that is, mixed C4s from the crude C4 except butadiene.

The term "C4 Raffinate 2" or "C4 Raff-2" refers to the mixed C4s stream leaving the MTBE unit, that is, mixed C4s from the crude C4 except butadiene and isobutene.

The term "C4 Raffinate 3" or "C4 Raff-3" refers to the mixed C4s stream leaving the C4 distillation unit, that is, mixed C4s from the crude C4 except butadiene, isobutene, and butane-1.

The terms "pyrolysis gasoline" and its abbreviated form "py-gas" are used herein having their well-known meaning, that is, thermal cracking products in the range of C5 to C9, for instance having an end boiling point of about 204.4° C. (400° F.), in certain embodiments up to about 148.9° C. (300° F.).

The terms "pyrolysis oil" and its abbreviated form "py-oil" are used herein having their well-known meaning, that is, a heavy oil fraction, C10+, that is derived from steam cracking.

The terms "light pyrolysis oil" and its acronym "LPO" as used herein in certain embodiments refer to pyrolysis oil having an end boiling point of about 440, 450, 460 or 470° C.

The terms "heavy pyrolysis oil" and its acronym "HPO" as used herein in certain embodiments refer to pyrolysis oil having an initial boiling point of about 440, 450, 460 or 470° C.

The term "coker gas oil" is used herein to refer to hydrocarbons boiling above an end point of the middle distillate range, for instance having an initial boiling point in the range of about 320-370° C., and an end boiling point in the range of about 510-565° C., which are derived from thermal cracking operations in a coker unit, for instance hydrocarbons boiling in the range of about 320-565, 320-540, 320-510, 340-565, 340-540, 340-510, 370-565, 370-540, or 370-510° C.

The term "light coker gas oil" is used herein to refer to coker gas oil in the light range, for instance having an end boiling point from about 375-425° C., for instance hydrocarbons boiling in the range of about 320-425, 320-400, 320-375, 340-425, 340-375, 340-375, 370-425, 370-400, or 370-375° C.

The term "heavy coker gas oil" is used herein to refer to coker gas oil in the heavy range, for instance having an initial boiling point from about 375-425° C., for instance hydrocarbons boiling in the range of about 375-565, 375-540, 375-510, 400-565, 400-540, 400-510, 425-565, 425-540, or 425-510° C.

The term "coker naphtha" is used herein to refer to hydrocarbons boiling in the naphtha range derived from thermal cracking operations in a coker unit.

The term "coker middle distillates" is used herein to refer to hydrocarbons boiling in the middle distillate range derived from thermal cracking operations in a coker unit.

In general, a suitable feedstock is processed in a coking zone unit to produce at least light gases, coker naphtha, light coker gas oil and petroleum coke. Light coker gas oil, and in certain embodiments hydrotreated light coker gas oil, is subjected to deep hydrogenation to produce a deeply hydrogenated middle distillate fraction. All or a portion of the deeply hydrogenated middle distillate fraction is used as feed to the stream cracking zone, to produce light olefins, pyrolysis gasoline and pyrolysis oil. The products from the steam cracking zone $H_2$, methane, ethane, ethylene, mixed C3s and mixed C4s; pyrolysis gasoline stream(s); and pyrolysis oil stream(s). From the mixed product stream(s) C3s and the mixed C4s, petrochemicals ethylene, propylene and butylenes are recovered. Ethane and non-olefinic C3s are recycled to the steam cracking zone, and non-olefinic C4s are recycled to the steam cracking zone or to a separate processing zone for production of additional petrochemicals.

In certain embodiments, a coking zone is integrated in a refinery system to produce petrochemicals and fuel products from a feedstock such as crude oil feed. The system includes a separation zone such as an atmospheric distillation zone to separate at least a first atmospheric distillation zone fraction comprising straight run naphtha and a second atmospheric distillation zone fraction comprising at least a portion of middle distillates. In certain embodiments, heavy middle distillates such as atmospheric gas oil or heavy atmospheric gas oil is subjected to coking, a light coker gas oil product is hydrotreated, and the hydrotreated light coker gas oil is subjected to deep hydrogenation, thereby producing a hydrocarbon mixture effective as a feed for thermal cracking in a steam cracking complex to obtain light olefins. Lighter atmospheric distillation zone middle distillates (optionally subjected to hydrotreating) can also be subjected to deep hydrogenation and increasing the feed for thermal cracking in a steam cracking complex to obtain light olefins.

In certain embodiments, a third atmospheric distillation zone fraction comprising atmospheric residue is also separated. In certain embodiments, a vacuum distillation zone is integrated to further separate the third atmospheric distillation zone fraction into a first vacuum distillation zone fraction comprising vacuum gas oil and a second vacuum distillation zone fraction comprising vacuum residue. In the embodiments in which the second vacuum distillation zone fraction is recovered, all or a portion of that fraction can optionally be processed in a vacuum residue treatment zone. A vacuum residue treatment zone can include one or more of residue hydroprocessing, delayed coking, gasification, or solvent deasphalting. In additional embodiments, all or a portion of the third atmospheric distillation zone fraction comprising atmospheric residue is processed in an atmospheric residue treatment zone, which can include one or more of residue hydroprocessing, fluid catalytic cracking, delayed coking, gasification, or solvent deasphalting.

In a distillate hydrotreating ("DHT") zone, such as a diesel hydrotreater, all or a portion of the second atmospheric distillation zone fraction is processed to produce at least a first DHT fraction and a second DHT fraction. The first DHT fraction comprises naphtha and the second DHT fraction is used as a hydrotreated middle distillate feed for deep hydrogenation in the deep hydrogenation ("DHG") zone.

In a gas oil hydroprocessing ("GOHP") zone (which can be included for treatment of gas oil range streams, for instance atmospheric gas oil or vacuum gas oil if a vacuum distillation zone is used, or other gas oil range components obtained from other treatment of residue), all or a portion of gas oil components within the integrated process are subjected to hydrotreating, or hydrotreating and hydrocracking. The GOHP zone generally produces at least a first GOHP fraction and a second GOHP fraction. The first GOHP fraction comprises naphtha and the second GOHP fraction comprise middle distillates, and is used as a source of hydrotreated middle distillate feed for the DHG zone. The second GOHP fraction can be routed to the DHG zone directly, and/or subjected to further treatment to remove sulfur, nitrogen and/or other heteroatoms, for example by routing to the DHT zone. In addition, the GOHP zone produces hydrotreated gas oil and/or unconverted oil (depending on the mode of operation). In certain embodiments, the hydrotreated gas oil and/or unconverted oil is subjected to coking, a light coker gas oil product is hydrotreated, and the hydrotreated light coker gas oil is subjected to deep hydrogenation, thereby producing a hydrocarbon mixture effective as a feed for thermal cracking in a steam cracking complex to obtain light olefins.

In certain embodiments, a vacuum residue treatment zone and/or an atmospheric residue treatment zone can include a residue hydroprocessing zone such as a residue hydrocracker. In certain embodiments a residue hydroprocessing zone includes a preceding residue hydrotreating step, and/or a post hydrotreating step. The residue hydroprocessing zone generally produces distillates naphtha, middle distillates, unconverted oil and pitch. The residue hydroprocessing zone products can be used as conventionally known. In certain embodiments of the processes herein, all or a portion of the middle distillates range products from the vacuum residue hydroprocessing zone and/or the atmospheric residue treatment zone can be passed to the GOHP zone (if included), the DHT zone or directly used as middle distillate feed for the DHG zone.

In certain embodiments, a vacuum residue treatment zone and/or an atmospheric residue treatment zone can include a coking zone such as delayed coking to process all or a portion of vacuum residue (straight run vacuum residue or vacuum residue that has been subjected to treatment to remove sulfur, nitrogen and/or other heteroatoms), or all or a portion of atmospheric residue (straight run atmospheric residue or atmospheric residue that has been subjected to treatment to remove sulfur, nitrogen and/or other heteroatoms). The coking liquid and gas products can be used as conventionally known. In certain embodiments of the processes herein, all or a portion of the middle distillates from the coking liquid and gas products, including light coker gasoil from the coking zone products is used as additional middle distillate feed for deep hydrogenation. If necessary, all or a portion of the middle distillate range coker liquid products can be subjected to treatment to remove sulfur, nitrogen and/or other heteroatoms prior to deep hydrogenation; the additional treatment of middle distillate range coker liquid products can comprise a dedicated treatment unit or step, or one or more of the units or steps within the integrated process and system such as the GOHP zone (if included) or the DHT zone. In embodiments in which middle distillate range coker liquid products are passed to the GOHP zone (if included) or the DHT zone, severity of the conditions in those zones may be increased to accommodate the higher concentrations of sulfur, nitrogen and/or other heteroatoms.

In certain embodiments, a vacuum residue treatment zone and/or an atmospheric residue treatment zone can include a solvent deasphalting zone to process all or a portion of vacuum residue (straight run vacuum residue or vacuum residue that has been subjected to treatment to remove sulfur, nitrogen and/or other heteroatoms), or all or a portion of atmospheric residue (straight run atmospheric residue or atmospheric residue that has been subjected to treatment to remove sulfur, nitrogen and/or other heteroatoms). The deasphalted oil phase and the asphalt phase can be used as conventionally known. In certain embodiments of the processes herein, all or a portion of the deasphalted oil is used as a source of additional middle distillate feed for the DHG zone. For example, all or a portion of the deasphalted oil can be subjected to treatment to remove sulfur, nitrogen and/or other heteroatoms prior to deep hydrogenation; the additional treatment of deasphalted oil can comprise a dedicated treatment unit or step, or one or more of the units or steps within the integrated process and system such as a vacuum residue treatment zone (if included), the GOHP zone (if included) or the DHT zone. In embodiments in which deasphalted oil is passed to the DHT zone, severity of the conditions in those zones may be increased to accommodate the higher concentrations of sulfur, nitrogen and/or other heteroatoms.

In certain embodiments, a vacuum residue treatment zone and/or an atmospheric residue treatment zone can include a gasification zone to process all or a portion of vacuum residue (straight run vacuum residue or vacuum residue that has been subjected to treatment to remove sulfur, nitrogen and/or other heteroatoms), or all or a portion of atmospheric residue (straight run atmospheric residue or atmospheric residue that has been subjected to treatment to remove sulfur, nitrogen and/or other heteroatoms). The produced syngas can be used as conventionally known. In certain embodiments of the processes herein, syngas is subjected to water-gas shift reaction as is conventionally known to produce hydrogen that can be recycled to hydrogen users in the system, such as a residue hydroprocessing unit (if included), the GOHP zone (if included) or the DHT zone.

In certain embodiments, an atmospheric residue treatment zone comprises a delayed coking zone. The feed can be straight run atmospheric residue or atmospheric residue that has been subjected to treatment to remove sulfur, nitrogen and/or other heteroatoms. The delayed coking products can be used as conventionally known. In certain embodiments of the processes herein, all or a portion of light coker gas oil from the delayed coking products is used as additional middle distillate feed for the DHG zone. If necessary, all or a portion of the light coker gas oil can be subjected to treatment to remove sulfur, nitrogen and/or other heteroatoms prior to deep hydrogenation; the additional treatment of light coker gas oil can comprise a dedicated treatment unit or step, or one or more of the units or steps within the integrated process and system such as the gas oil hydroprocessing zone or the DHT zone. In embodiments in which light coker gas oil is passed to the gas oil hydroprocessing zone or the DHT zone, severity of the conditions in those zones may be increased to accommodate the higher concentrations of sulfur, nitrogen and/or other heteroatoms.

All or a portion of the hydrotreated middle distillates from the DHT zone are passed to the DHG zone to produce hydrogenated middle distillates. In certain embodiments, middle distillates from the GOHP zone (if included) are subjected to deep hydrogenation, in the same DHG zone as the hydrotreated middle distillates from the DHT zone, or in a separate DHG zone. In certain embodiments, middle distillates obtained from the VR and/or AR treatment zones (if included), if necessary suitably pretreated in separate treatment units or integrated units such as the DHT zone or the GOHP zone (if included), are subjected to deep hydrogenation, in the same DHG zone as the hydrotreated middle distillates from the DHT zone, in the same DHG zone as the middle distillates from the GOHP zone (if included), or in a separate DHG zone.

In the process herein, all or a portion of the hydrogenated middle distillates produced in the DHG zone(s) are processed in a steam cracking zone. The products from the steam cracking zone include mixed product stream(s) comprising $H_2$, methane, ethane, ethylene, mixed C3s and mixed C4s; pyrolysis gasoline stream(s); and pyrolysis oil stream(s). From the mixed product stream C3s and the mixed C4s, petrochemicals ethylene, propylene and butylenes are recovered. Ethane and non-olefinic C3s are recycled to the steam cracking zone, and non-olefinic C4s are recycled to the steam cracking zone or to a separate processing zone for production of additional petrochemicals. Ethane and non-olefinic C3s and C4s are recovered, with ethane and non-olefinic C3s recycled to the steam cracking complex, and non-olefinic C4s recycled to the steam cracking complex or passed to a separate processing zone for production of additional petrochemicals such as propylene and/or mixed butanol liquids.

FIG. 1 schematically depicts an embodiment of a process and system 1100 for conversion of crude oil to petrochemicals and fuel products, that is, without deep hydrogenation of middle distillates as additional steam cracking feedstock. This embodiment is depicted for illustrative purpose, and the various unit operations and various streams are denoted as a "1000" series of reference numerals. In further embodiments described herein, deep hydrogenation of middle distillates is integrated to produce additional steam cracking feedstock rather than fuel products such as kerosene and/or diesel fuel products or blending components.

The system 1100 generally includes a crude complex 1105, typically including an atmospheric distillation zone ("ADU") 1110, a saturated gas plant 1130, a vacuum distillation zone ("VDU") 1140 and a coking zone 1300. A steam cracking complex 1215 is integrated and typically receives plural naphtha streams, shown as a combined naphtha stream 1222 including straight run naphtha and other naphtha fractions produced within the system; an optional kerosene sweetening zone 1120 producing kerosene fuel fraction 1118 as a fuel product and/or blending component; a diesel hydrotreating zone 1150 producing a hydrotreated naphtha fraction 1152 (sometimes referred to as wild naphtha) as part of the combined naphtha stream 1222, and a diesel fuel fraction 1154 as a fuel product and/or blending component; a gas oil hydroprocessing zone 1160/1170 operating as a gas oil hydrocracking zone 1160 or as a gas oil hydrotreating zone 1170, and in certain embodiments operating under conditions used in vacuum gas oil hydrotreating and/or hydrocracking. A hydrocracking zone 1160 produces a naphtha fraction 1162 as part of the combined naphtha stream 1222, a diesel fuel fraction 1164 as a fuel product and/or blending component, and an unconverted oil fraction 1166. A hydrotreating zone 1170 produces a hydrotreated naphtha fraction 1172 and a hydrotreated gas oil fraction 1176.

A vacuum residue conditioning zone 1180 can be integrated, for instance, a vacuum residue hydrocracking zone producing a naphtha stream 1184 as part of the combined naphtha stream 1222, a diesel fraction 1186, an unconverted oil fraction 1188 and pitch 1190. In certain embodiments a middle distillates stream 1182 (instead of the diesel fraction or in conjunction therewith) is routed to the gas oil hydroprocessing zone 1160/1170 and/or the diesel hydrotreating zone 1150.

A feed 1102 is separated into fractions in a crude complex 1105, typically including an atmospheric distillation zone ("ADU") 1110, a saturated gas plant 1130 and a vacuum distillation zone ("VDU") 1140. The feed 1102 can be crude oil, or in certain embodiment the feed can be crude oil that has been subjected to hydrotreating (hydrotreated crude oil), solvent deasphalting (deasphalted oil) or coking, such as delayed coking (coker liquid and gas products). The atmospheric distillation unit and vacuum distillation unit are used in well-known arrangements. The feed 1102, in certain embodiments having LPG and light naphtha removed, is separated into fractions in the atmospheric distillation zone 1110. In embodiments in which LPG and light naphtha are removed, those products can be sent to the same steam cracking complex 1215, a separate steam cracking complex, or used for other purposes. Light products, for instance, light hydrocarbons with fewer than six carbons, are passed to the steam cracking zone 1220. In particular, C2-C4 hydrocarbons 1136 including ethane, propane and butanes are separated from the light ends and LPG 1112 from the atmospheric distillation zone 1110 via the saturated gas plant 1130. Optionally, other light products are routed to the saturated gas plant 1130, shown in dashed lines as stream 1134, such as light gases from refinery units within the integrated system, and in certain embodiments light gases from outside of the battery limits. The separated C2-C4 hydrocarbons 1136 are routed to the steam cracking complex 1215. Sweet off-gases 1132 from the saturated gas plant 1130 and off-gases 1234 from the steam cracking complex 1215 (via an olefins recovery train 1230) are removed and recovered as is typically known, for instance to contribute to a fuel gas ("FG") system, or in certain embodiments recycled to the steam cracker. Off-gases from the coking unit, after passing through an unsaturated gas plant, can be integrated with off-gases from the saturated gas plant 1130 for common handling of the fuel gases.

Straight run naphtha 1114 from the atmospheric distillation zone 1110 is passed to the steam cracking zone 1220. In certain embodiments, all, a substantial portion or a significant portion of the straight run naphtha 1114 is routed to the steam cracking zone 1220. Remaining naphtha (if any) can be upgraded if necessary and added to a gasoline pool. In addition, the straight run naphtha stream 1114 can contain naphtha from other sources as described herein and sometimes referred to as wild naphtha, for instance, naphtha range hydrocarbons from one or more of the integrated distillate, gas oil and/or residue hydroprocessing units. In additional embodiments, one or more straight run naphtha stream(s) are recovered from the atmospheric distillation zone 1110, for instance a light naphtha stream and a heavy naphtha stream. In such embodiments, all or a portion of straight run light naphtha can be routed to the steam cracker, while all or a portion of heavy naphtha is subjected to hydroprocessing (hydrotreating and/or hydrogenation). In certain embodiments, all, a substantial portion or a significant portion of straight run light naphtha is routed to the steam cracking zone 1220, while all, a substantial portion or a significant portion of heavy naphtha is routed to hydrotreating and/or hydrogenation process units.

Middle distillates are used to produce diesel and/or kerosene, and additional naphtha feed to the steam cracking complex 1215. In the embodiment shown in FIG. 1, at least three different middle distillate cuts are processed for production of fuel products and petrochemicals (via the steam cracker). In one example using the arrangement shown in FIG. 1, a first atmospheric distillation zone middle distillate fraction 1116, in certain embodiments referred to as a kerosene fraction, contains light kerosene range hydrocarbons, a second atmospheric distillation zone middle distillate fraction 1122, in certain embodiments referred to as a diesel fraction, contains heavy kerosene range hydrocarbons and medium AGO range hydrocarbons, and a third atmospheric distillation zone middle distillate fraction 1124, in certain embodiments referred to as an atmospheric gas oil fraction, contains heavy AGO range hydrocarbons. In another example using the arrangement shown in FIG. 1, a first middle distillate fraction 1116 contains kerosene range hydrocarbons, a second middle distillate fraction 1122 contains medium AGO range hydrocarbons and a third middle distillate fraction 1124 contains heavy AGO range hydrocarbons. In another example using the arrangement shown in FIG. 1, a first middle distillate fraction 1116 contains light kerosene range hydrocarbons and a portion of heavy kerosene range hydrocarbons, a second middle distillate fraction 1122 contains a portion of heavy kerosene range hydrocarbons and a portion of medium AGO range hydrocarbons and a third middle distillate fraction 1124 contains a portion of medium AGO range hydrocarbons and heavy AGO range hydrocarbons.

For example, a first middle distillate fraction 1116 can be processed in a kerosene sweetening process 1120 to produce kerosene fuel product 1118, for instance, jet fuel compliant with Jet A or Jet A-1 specifications, and optionally other fuel products (not shown). In certain embodiments herein, all or a portion of the first middle distillate fraction 1116 is not used for fuel production, but rather is used as a feed for distillate hydrotreating so as to produce additional feed for the stream cracking zone 1220 by production of additional wild naphtha.

A second middle distillate fraction 1122 is processed in a distillate hydrotreating zone such as a diesel hydrotreating zone 1150, to produce wild naphtha 1152 and a diesel fuel fraction 1154, for instance, as a diesel fuel blending component that can be compliant with Euro V diesel standards. In additional embodiments, all or a portion of the first middle distillate fraction 1116 can be treated with the second middle distillate fraction 1122, as denoted by a dashed line. In further embodiments, the diesel hydrotreating zone 1150 can also process distillate products from the gas oil hydroprocessing zone. All or a portion of the wild naphtha 1152 is routed to the steam cracking zone 1220; any portion that is not passed to the steam cracking zone 1220 can be upgraded if necessary and routed to the gasoline pool. In certain embodiments, the wild naphtha 1152 is routed through the crude complex 1105, alone, or in combination with other wild naphtha fractions from within the integrated process. In embodiments in which the wild naphtha 1152 is routed through the crude complex 1105, all or a portion of the LPG produced in the diesel hydrotreating zone 1150 can be passed with the wild naphtha fraction 1152. In certain embodiments, all, a substantial portion, a significant portion or a major portion of the wild naphtha 1152 is routed to the steam cracking zone 1220 (directly or through the crude complex 1105).

In certain embodiments (as denoted by dashed lines), all, a substantial portion, a significant portion or a major portion of the third middle distillate fraction 1124 is routed to the gas oil hydroprocessing zone 1160/1170 in combination with the vacuum gas oil stream 1144. In additional embodiments in which vacuum distillation is not used, the third middle distillate fraction 1124 is routed to the gas oil hydroprocessing zone 1160/1170 and/or a residue treatment zone.

In certain embodiments, the first middle distillate fraction 1116 can be routed either through the kerosene sweetening zone 1120 or routed to the distillate hydrotreating zone 1150. During periods in which maximizing the fuel fraction 1118 is desired, the first middle distillate fraction 1116 can be routed to the kerosene sweetening zone 1120. During periods in which the naphtha range feedstock to the steam cracking zone 1220 is to be maximized, the first middle distillate fraction 1116 can be routed to the distillate hydrotreating zone 1150, so as to produce additional hydrotreated naphtha 1152. In additional alternative embodiments, the first middle distillate fraction 1116 can be divided (on a volume or weight basis, for example, with a diverter) so that a portion is passed to the distillate hydrotreating zone 1150 and the remaining portion is passed to the kerosene sweetening zone 1120.

In certain embodiments, the first middle distillate fraction 1116 can be routed either through the kerosene sweetening zone 1120 or routed to the distillate hydrotreating zone 1150. During periods in which maximizing the fuel fraction 1118 is desired, the first middle distillate fraction 1116 can be routed to the kerosene sweetening zone 1120. During periods in which the naphtha range feedstock to the steam cracking zone 1220 is to be maximized, the first middle distillate fraction 1116 can be routed to the distillate hydrotreating zone 1150, so as to produce additional hydrotreated naphtha 1152. In additional alternative embodiments, the first middle distillate fraction 1116 can be divided (on a volume or weight basis, for example, with a diverter) so that a portion is passed to the distillate hydrotreating zone 1150 and the remaining portion is passed to the kerosene sweetening zone 1120.

In other embodiments, kerosene sweetening can be eliminated. Accordingly, a relatively light middle distillate fraction including separate or combined streams corresponding to streams 1116 and 1122 are routed to the distillate hydrotreating zone 1150, and a heavier middle distillate fraction 1124 is treated as described above. In one example a relatively light middle distillate fraction 1116 and 1122 contains kerosene range hydrocarbons and medium AGO range hydrocarbons, and a heavier atmospheric distillation zone middle distillate fraction 1124 contains heavy AGO range hydrocarbons. In another example the relatively light middle distillate fraction 1116 and 1122 contains kerosene range hydrocarbons and a portion of medium AGO range hydrocarbons and the heavier middle distillate fraction 1124 contains a portion of medium AGO range hydrocarbons and heavy AGO range hydrocarbons.

In certain embodiments an atmospheric residue fraction 1126 from the atmospheric distillation zone 1110 is further separated in the vacuum distillation zone 1140, generally into vacuum gas oil fraction 1144 and a vacuum residue fraction 1142. Vacuum gas oil 1144 from the vacuum distillation zone 1140 is routed to the gas oil hydroprocessing zone 1160/1170. In certain embodiments, a minor portion of the atmospheric residue fraction 1126 can bypass the vacuum distillation zone 1140 (not shown) and is routed to the vacuum residue conditioning zone 1180 with the vacuum residue fraction 1142. In certain embodiments, 0-100% of the atmospheric residue fraction 1126 can bypass the vacuum distillation zone 1140 (not shown) and is routed to the vacuum residue conditioning zone 1180. For instance, in certain embodiments vacuum distillation is bypassed or not used, and atmospheric residue 1126 is the feed to the vacuum residue conditioning zone 1180. In certain embodiments, a minor portion of the atmospheric residue fraction 1126, shown as portion 1302, can bypass the vacuum distillation zone 1140 and is routed to the coking zone 1300. In certain embodiments, 0-100% of the atmospheric residue fraction 1126 can be used as portion 1302 to the coking zone 1300.

In certain embodiments, all, a substantial portion, a significant portion or a major portion of the vacuum gas oil 1144 is routed to the gas oil hydroprocessing zone 1160/1170. In addition, the gas oil fractions from the vacuum distillation zone 1140 can include one or more VGO fractions, such as a light vacuum gas oil stream and a heavy vacuum gas oil stream. In certain optional embodiments, in addition to vacuum gas oil and optionally atmospheric gas oil, the gas oil hydroprocessing zone 1160/1170 can also process atmospheric and/or vacuum gas oil range products from the vacuum residue conditioning zone 1180. In certain embodiments vacuum gas oil hydroprocessing is with a gas oil hydrocracking zone 1160 that can operate under mild, moderate or severe hydrocracking conditions, and generally produces a hydrocracked naphtha fraction 1162, a diesel fuel fraction 1164, and an unconverted oil fraction 1166. The diesel fuel fraction 1164 is recovered as fuel, for instance, as a diesel fuel blending component that can be compliant with Euro V diesel standards, and can be combined with the diesel fuel fraction 1154 from the diesel hydrotreating zone 1150. In other embodiments, vacuum gas oil hydroprocessing is with a gas oil hydrotreating zone 1170 that can operate under mild, moderate or severe hydrotreating conditions, and generally produces a hydrotreated gas oil fraction 1176, naphtha and some middle distillates. Naphtha range products can be separated from products within the gas oil hydrotreating zone 1170 as a hydrotreated naphtha stream 1172. Alternatively, or in conjunction with the hydrotreated naphtha stream 1172, a cracked distillates stream 1174 containing hydrotreated distillates (and in certain embodiments naphtha range products) are routed to diesel hydrotreating zone 1150 for further hydroprocessing and/or separation into diesel hydrotreating zone 1150 products.

In certain embodiments, all, a substantial portion, a significant portion or a major portion of the wild naphtha fraction from the gas oil hydroprocessing zone 1160/1170, streams 1162 or 1172, is routed to the steam cracking zone 1220, alone, or in combination with other wild naphtha sub-fractions from within the integrated process; any portion that is not passed to the steam cracking zone 1220 can be upgraded if necessary and routed to the gasoline pool. In certain embodiments, the wild naphtha fraction from the gas oil hydroprocessing zone 1160/1170 is routed through the crude complex 1105, alone, or in combination with other wild naphtha fractions from within the integrated process. In embodiments in which the wild naphtha fraction from the gas oil hydroprocessing zone 1160/1170 is routed through the crude complex 1105, all or a portion of the LPG produced in the gas oil hydroprocessing zone 1160/1170 can be passed with the wild naphtha. In certain embodiments, all or any portion of the heavy product from the gas oil hydroprocessing zone 1160/1170 is routed to the vacuum residue conditioning zone 1180. Alternatively, any remainder can be recycled and further processed (cracked to extinction in VGO hydrocracking) and/or bled from the system.

A vacuum residue fraction 1142 from the vacuum distillation zone 1140 can be recovered as a fuel oil pool component. Optionally, a vacuum residue conditioning zone 1180 can be used to treat the vacuum residue fraction 1142; in such embodiments, all, a substantial portion, a significant portion, a major portion or a minor portion of the vacuum residue fraction 1142 is passed to the vacuum residue conditioning zone 1180, and remaining vacuum residue (if any) can be recovered as a fuel oil pool component.

The vacuum residue conditioning zone 1180 can be a residue cracker operating under hydrocracking conditions, in certain embodiments severe hydrocracking conditions, effective to produce off-gas and light ends (not shown), a hydrocracked gas oil fraction 1188, pitch 1190, and one or more distillate streams (including one or more of a wild naphtha stream 1184, a diesel fraction 1186. The diesel fraction 1186 is recovered as a diesel fuel pool component, or used as diesel fuel compliant with Euro V standards. In certain embodiments a middle distillates stream 1182 (instead of the diesel fraction or in conjunction therewith) is routed to the gas oil hydroprocessing zone 1160/1170 and/or the diesel hydrotreating zone 1150. In embodiments in which the vacuum residue hydrocracking zone 1180 operates under conditions effective to produce a diesel fuel blending component, for instance diesel fuel compliant with Euro V standards, the fraction 1186 can be combined with the diesel fuel fraction 1154 from the diesel hydrotreater 1150 or diesel fuel fraction 1164 from the gas oil hydrocracking zone 1160, or both the diesel fuel fraction 1154 from the diesel hydrotreater 1150 and the diesel fuel fraction 1164 from the gas oil hydrocracking zone 1160.

In embodiments in which a separate wild naphtha stream 1184 is recovered, all, a substantial portion, a significant portion or a major portion of the wild naphtha stream 1184 is routed to the steam cracking zone 1220, alone, or in combination with other wild naphtha fractions from within the integrated process; any portion that is not passed to the steam cracking zone 1220 can be upgraded if necessary and routed to the gasoline pool. In certain embodiments, the wild naphtha stream 1184 is routed through the crude complex 1105, alone, or in combination with other wild naphtha fractions from within the integrated process. In embodiments in which the wild naphtha stream 1184 is routed through the crude complex 1105, all or a portion of the LPG produced in the gas oil hydroprocessing zone 1160/1170 can be passed with the wild naphtha.

In certain optional embodiments, all or portion of the hydrocracked gas oil fraction 1188 is routed to the gas oil hydroprocessing zone 1160/1170. For instance, all, a substantial portion, a significant portion or a major portion of the hydrocracked gas oil fraction 1188 from the vacuum residue hydrocracking zone 1180 is routed to the gas oil hydroprocessing zone 1160/1170. The remainder (if any) can be processed in other units and/or bled from the system.

The coking zone 1300 is typically operable to produce at least light gases 1330, coker naphtha 1332, light coker gas oil 1334, heavy coker gas oil 1336, and coke 1338. Off-gases from the coking zone 1300 can be integrated with the fuel gas system. In certain embodiments (not shown), certain gases, after treatment in an unsaturated gas plant, can be routed to the separation units within the steam cracking complex 1215, and/or LPGs can be routed to the steam cracking zone 1220. All, a substantial portion, a significant portion or a major portion of the gases containing light olefins (a C2− stream and a C3+ stream) are routed through the unsaturated gas plant. The remainder, if any, can be routed to the steam cracking zone 1220 and/or the olefins recovery train 1230.

In certain embodiments, all or a portion of the coker naphtha 1332 can be processed as described below in a py-gas hydrotreatment and recovery center 1270/1272, to increase the quantity of raffinate as additional feed to the steam cracking zone 1220. Any portion of the coker naphtha 1332 that is not routed to the py-gas hydrotreatment and recovery center 1270/1272, shown in dashed lines, can be hydrotreated and recovered for fuel production. For instance, in modalities in which the objective is maximum petrochemical production, all, a substantial portion, a significant portion or a major portion of the coker naphtha 1332 is routed to the py-gas hydrotreatment and recovery center 1270/1272; the remainder, if any, is recovered for fuel production and incorporation into a gasoline pool.

In additional embodiments, all or a portion of the coker naphtha 1332 is hydrotreated and recovered for fuel production and incorporation into a gasoline pool. Optionally, a portion of the coker naphtha 1332 that is not recovered for fuel production can be processed in the py-gas hydrotreatment and recovery center 1270/1272, as shown in dashed lines, to increase the quantity of raffinate as additional feed to the steam cracking zone 1220.

Other products from the coking zone 1300 include cycle oil, such as light coker gas oil 1334 and heavy coker gas oil 1336. All or a portion of the light coker gas oil 1334 can be routed to the diesel hydrotreating zone 1150, increasing the yield of the diesel fuel fraction 1154 and wild naphtha 1152 that can be passed to the steam cracking zone 1220. In certain embodiments, all, a substantial portion, a significant portion or a major portion of the light coker gas oil 1334 is passed to the diesel hydrotreating zone 1150, and any remaining portion can be routed to the vacuum residue conditioning zone. Heavy coker gas oil stream 1336 can be routed to a fuel oil pool and/or used as feedstock for production of carbon black.

Embodiments are disclosed herein for separation of products from a quenched cracked gas stream containing mixed C1-C4 paraffins and olefins, and for treatment and handling of pyrolysis gasoline and pyrolysis fuel oil stream 1226. However, it should be appreciated that other operations can be used to separate petrochemical products from the steam cracker effluents. In certain embodiments as disclosed in FIG. 1, the steam cracking zone 1220 operates in conjunction with the olefins recovery train 1230 to convert the feeds into a mixed products stream 1224 that is separated into products ethylene 1236, a mixed C3s stream 1238 used to produce propylene 1248, and mixed C4s stream 1240 used to produce C4 olefin products (for instance 1,3-butadiene product stream 1252 and 1-butene product stream 1268), and hydrogen 1232 and off-gases 1234, typically from the olefins recovery train 1230. Pyrolysis gasoline 1228 and pyrolysis oil 1226 are also recovered. The off-gases 1234 can be passed to an integrated fuel gas system. Further, the hydrogen 1232 that is recovered from the cracked products can be recycled to hydrogen users within the complex limits. In certain embodiments hydrogen for all hydrogen users in the integrated process and system is derived from hydrogen 1232 recovered from the cracked products, and no outside hydrogen is required once the process has completed start-up and reached equilibrium. In further embodiments excess hydrogen can be recovered. While particular arrangements of unit operations are shown to recover the main light olefin products and recycle streams, a person having ordinary skill in the art will appreciate that other arrangements can be used.

In a typical arrangement, the mixed C4s stream 1240 containing a mixture of C4s from the olefins recovery train 1230 of the steam cracker complex 1215, known as crude C4s, is routed to a butadiene extraction unit 1250 to recover a high purity 1,3-butadiene product 1252. A first raffinate 1254 ("C4-Raff-1") containing butanes and butenes is passed to a selective hydrogenation unit ("SHU") and methyl tertiary butyl ether ("MTBE") unit, SHU and MTBE zone 1256, where it is mixed with high purity fresh methanol 1258 from outside battery limits to produce methyl tertiary butyl ether 1262.

A second raffinate 1260 ("C4 Raff-2") from the SHU and MTBE zone 1256 is routed to a C4 distillation unit 1266 for separation into a 1-butene product stream 1268 and an alkane stream 1264 (a third raffinate "C4 Raff-3") containing residual C4s, which is recycled to the steam cracking zone 1220. Separation of the ethylene 1236, propylene 1248 and the mixed C4s stream 1240 occurs in a suitable arrangement of known separation steps for separating steam cracking zone effluents, including compression stage(s), depropanizer, debutanizer, demethanizer and deethanizer.

In further embodiments of processes and systems for conversion of crude oil to petrochemicals and fuel products, metathesis conversion of C4 and C5 olefins is included to produce additional propylene. The process operates as described in conjunction with FIG. 1 upstream of the steam cracking operations and with respect to the coking operations. Downstream of the steam cracking operations, the butadiene extraction train can operate in a manner similar to that above, with a mixed C4 raffinate stream ("C4 Raff 3") from the C4 distillation unit routed to a metathesis unit for metathesis conversion to additional propylene.

In further embodiments of processes and systems for conversion of crude oil to petrochemicals and fuel products, an additional step is provided to convert a mixture of butenes into mixed butanols suitable as a gasoline blending oxygenate and for octane enhancement. Suitable processes to convert a mixture of butenes into mixed butanols are described in one or more of commonly owned US Patent Publication US20150148572A1, and commonly owned US Patents U.S. Ser. No. 10/155,707B2, U.S. Pat. No. 9,732,018B2, U.S. Pat. No. 9,447,346B2, U.S. Pat. No. 9,393,540B2, U.S. Pat. No. 9,187,388B2, U.S. Pat. No. 8,999,013B2, U.S. Pat. No. 8,629,080B2 and U.S. Pat. No. 8,558,036B2, all of which are incorporated by reference herein in their entireties. In certain embodiments, a particularly effective conversion process known as "SuperButol™" technology is integrated, which is a one-step process that converts a mixture of butenes into mixed butanol liquids. Downstream of the steam cracking operations, the butadiene extraction train can operate in a manner similar to that above, with a mixed C4 raffinate stream ("C4 Raff 3") from the C4 distillation unit that is routed to a mixed butanols production zone to convert the mixture of butenes into mixed butanol liquids, and alkanes are recycled to the steam cracking zone.

The crude complex 1105 is schematically depicted. Components of the crude complex not shown but which are well-known can include feed/product and pump-around heat exchangers, crude charge heaters, crude tower(s), product strippers, cooling systems, hot and cold overhead drum systems including re-contactors and off-gas compressors, and units for water washing of overhead condensing systems. The atmospheric distillation zone 1110 can include well-known design features. In certain embodiments, all or portions of the naphtha and middle distillate (for instance kerosene and atmospheric gas oil products) from the atmospheric distillation column 1110 are steam-stripped in side strippers, and atmospheric residue can be steam-stripped in a reduced-size can section inside the bottom of the atmospheric distillation column. The vacuum distillation zone 1140, can include well-known design features, such as operation at reduced pressure levels (mm Hg absolute pressure), for instance, in the range of about 10-40, which can be maintained by steam ejectors or mechanical vacuum pumps.

The total feed to the atmospheric distillation zone 1110 is primarily the feed 1102, although it shall be appreciated that wild naphtha, LPGs and off-gas streams from the diesel hydrotreating zone 1150 and in certain embodiments from the gas oil hydroprocessing step and/or the vacuum residue hydrocracking zone 1180 can be routed to the atmospheric distillation zone 1110 where they are fractionated before being passed to the steam cracking complex. A desalting unit (not shown) is typically included upstream of the distillation zone 1110. A substantial amount of the water required for desalting can be obtained from a sour water stripper within the integrated process and system.

The saturated gas plant 1130 generally comprises a series of operations including fractionation and in certain systems absorption and fractionation, as is well known, with an objective to process light ends to separate fuel gas range components from LPG range components suitable as a steam cracker feedstock. The light ends that are processed in one or more saturated gas plants within embodiments of the integrated system and process herein are derived from the crude distillation, such as light ends and LPG. In addition, other light products can optionally be routed to the saturated gas plant 1130, shown in dashed lines as stream 1134, such as light gases from refinery units within the integrated system, and in certain embodiments light gases from outside of the battery limits. For instance, stream 1134 can contain off-gases and light ends from the diesel hydrotreating zone 1150, the gas oil hydroprocessing zone, and/or the vacuum residue hydrocracking zone 1180. The products from the saturated gas plant 1130 include: an off-gas stream 1132 containing C1-C2 alkanes that is passed to the fuel gas system and/or the cracker complex; and a light ends stream 1136, containing C2+, that is passed to the steam cracking unit 1220.

In certain embodiments, a suitable saturated gas plant 1130 includes amine and caustic washing of liquid feed, and amine treatment of vapor feed, before subsequent steps. The crude tower overhead vapor is compressed and recontacted with naphtha before entering an amine scrubber for $H_2S$ removal and is then routed to the steam cracker complex. Recontact naphtha is debutanized to remove LPGs which are amine washed and routed to the steam cracker complex.

The debutanized naphtha is routed separately from the heavy naphtha to the steam cracker complex. As is known, light naphtha absorbs C4 and heavier hydrocarbons from the vapor as it travels upward through an absorber/debutanizer. Off-gasses from the absorber/debutanizer is compressed and sent to a refinery fuel gas system. A debutanizer bottoms stream is sent to the steam cracker as an additional source of feed.

As shown, the first middle distillate fraction 1116 is processed in a kerosene sweetening zone 1120 to remove unwanted sulfur compounds, as is well-known. Treated kerosene is recovered as a kerosene fuel product 1118, for instance, jet fuel compliant with Jet A or Jet A-1 specifications, and optionally other fuel products. In certain embodiments, all or a portion of the first middle distillate fraction 1116 is not used for fuel production, but rather is used as a feed for distillate hydrotreating so as to produce additional feed for the stream cracking zone 1220. For instance, a kerosene sweetening zone 1120 operates as is well-established commercially, and appropriate operating conditions are well known to produce kerosene fuel product 1118 and disulfide oils as by-products. In certain kerosene sweetening processes, impregnated carbon is utilized as catalyst to promote conversion to disulfide oil.

For example, one arrangement of a kerosene sweetening zone includes caustic wash of the kerosene feed for residual $H_2S$ removal. A reactor vessel containing an effective quantity of activated carbon catalyst utilizes air in conjunction with the caustic solution to affect the oxidation of mercaptans to disulfides. Caustic is separated from treated kerosene in the bottom section of the reactor. After water washing, kerosene product passes upwards through one of two parallel salt filters to remove free water and some soluble water. The kerosene product passes downward through one of two parallel clay filters for removal of solid s, moisture, emulsions and surfactants, so as to ensure that the kerosene product meets haze, color stability and water separation specifications, for instance, compliant with Jet A specifications.

The second middle distillate fraction 1122 is processed in a diesel hydrotreating zone 1150 in the presence of an effective amount of hydrogen obtained from recycle within the diesel hydrotreating zone 1150 and make-up hydrogen (not shown). In certain embodiments, all or a portion of the make-up hydrogen is derived from the steam cracker hydrogen stream 1232 from the olefins recovery train 1230. The diesel hydrotreating zone 1150 operates under conditions effective for removal of a significant amount of the sulfur and other known contaminants, for instance, to meet necessary sulfur specifications for the diesel fuel fraction 1154, such as a diesel fuel blending component that can be compliant with Euro V diesel standards. In addition, a hydrotreated naphtha fraction 1152 (sometimes referred to as wild naphtha) is recovered from the diesel hydrotreating zone 1150, which is routed to the steam cracking zone 1220 as one of plural steam cracking feed sources. Effluent off-gases are recovered from the diesel hydrotreating zone 1150 and are passed to the olefins recovery train, the saturated gas plant as part of the other gases stream 1134, and/or directly to a fuel gas system. LPG can be recovered from the diesel hydrotreating zone 1150 and routed to the steam cracking zone, the olefins recovery train and/or the saturated gas plant. In certain embodiments, the hydrotreated naphtha fraction 1152 is routed through the crude complex 1105, alone, or in combination with other wild naphtha fractions from within the integrated process. In embodiments in which hydrotreated naphtha fraction 1152 is routed through the crude complex 1105, all or a portion of the LPG produced in the diesel hydrotreating zone 1150 can be passed with the hydrotreated naphtha fraction 1152, or can be passed directly to the gas plant 1130, or to a separate gas treatment zone. In certain embodiments, all, a substantial portion or a significant portion of the wild naphtha 1152 is routed to the steam cracking zone 1220 (directly or through the crude complex 1105).

The diesel hydrotreating zone 1150 can optionally process other fractions from within the complex (not shown). In embodiments in which a kerosene sweetening zone 1120 is used, all or a portion of the disulfide oil can be additional feed to the diesel hydrotreating zone 1150. Further, all or a portion of the first middle distillate fraction 1116 can be additional feed to the diesel hydrotreating zone 1150. Additionally, all or a portion of distillates from a vacuum gas oil hydroprocessing zone, and/or all or a portion of distillates from a vacuum residue hydrocracking zone, can be routed to the diesel hydrotreating zone 1150. Any portion of distillates not routed to the diesel hydrotreating zone 1150 can be passed to the crude complex 1105 or routed to the steam cracking zone 1220.

In certain embodiments, the diesel hydrotreating zone 1150 also processes at least a portion of the light coker gas oil 1334 from the coking zone 1300. Any portion of the light coker gas oil 1334 not routed to the diesel hydrotreating zone 1150 can optionally be passed to a fuel oil pool and/or processed in the integrated gas oil hydroprocessing zone. For example, 0-30, 0-25, 0-20, 5-30, 5-25, 5-20, 10-30, 10-25, or 10-20 wt % of the total light coker gas oil 1334 from the coking zone 1300 can be routed to the diesel hydrotreating zone 1150.

The diesel hydrotreating zone 1150 can contain one or more fixed-bed, ebullated-bed, slurry-bed, moving bed, continuous stirred tank (CSTR) or tubular reactors, in series and/or parallel arrangement, and is operated under conditions effective for hydrotreating of the diesel feed 1122, the particular type of reactor, the feed characteristics, the desired product slate and the catalyst selection. In certain embodiments, the diesel hydrotreating zone 1150 contains a layered bed reactor with three catalyst beds and having inter-bed quench gas, and employs a layered catalyst system with the layer of hydrodewaxing catalyst positioned between beds of hydrotreating catalyst. Additional equipment, including exchangers, furnaces, feed pumps, quench pumps, and compressors to feed the reactor(s) and maintain proper operating conditions, are well known and are considered part of the diesel hydrotreating zone 1150. In addition, equipment including pumps, compressors, high temperature separation vessels, low temperature separation vessels and the like to separate reaction products and provide hydrogen recycle within the diesel hydrotreating zone 1150, are well known and are considered part of the diesel hydrotreating zone 1150.

In certain embodiments, the diesel hydrotreating zone 1150 operating conditions include:

a reactor temperature (° C.) in the range of from about 270-450, 300-450, 320-450, 340-450, 270-435, 300-435, 320-435, 340-435, 270-400, 300-400, 320-400, 340-400, 270-380, 300-380, 320-380, 340-360, 270-360, 300-360, 320-360 or 340-360;

a hydrogen partial pressure (barg) in the range of from about 30-80, 30-70, 30-60, 35-80, 35-70, 35-60, 40-80, 40-70 or 40-60;

a hydrogen gas feed rate (standard liters per liter of hydrocarbon feed, SLt/Lt) of up to about 1000, 700 or 500, in certain embodiments from about 200-1000, 200-700, 200-500, 250-1000, 250-700, 250-500, 300-1000, 300-700 or 300-500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.5-10.0, 0.5-5.0, 0.5-2.0, 0.8-10.0, 0.8-6.0, 0.8-5.0, 0.8-4.0, 0.8-2.0, 1.0-10.0, 1.0-6.0, 1.0-5.0, 1.0-4.0 or 1.0-2.0.

An effective quantity of hydrotreating catalyst is provided in the diesel hydrotreating zone 1150, including those possessing hydrotreating functionality, including hydrodesulfurization and/or hydrodenitrification, to remove sulfur, nitrogen and other contaminants. Suitable hydrotreating catalysts (sometimes referred to in the industry as "pretreat catalyst") contain one or more active metal component of metals or metal compounds (oxides or sulfides) selected from the Periodic Table of the Elements IUPAC Groups 6, 7, 8, 9 and 10. One or more active metal component(s) are typically deposited or otherwise incorporated on a support, which can include alumina, silica alumina, silica, titania, titania-silica, titania-silicates or combinations including at least one of the foregoing support materials. In certain embodiments, the active metal or metal compound is one or more of Co, Ni, W and Mo, including combinations such as one or more active metals or metal compounds selected from Co/Mo, Ni/Mo, Ni/W, and Co/Ni/Mo. Combinations of one or more of Co/Mo, Ni/Mo, Ni/W and Co/Ni/Mo can also be used, for instance, in plural beds or separate reactors in series. The combinations can be composed of different particles containing a single active metal species, or particles containing multiple active species. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal(s) or metal compound(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10.

In certain embodiments, an effective quantity of a grading material is added to remove contaminants such as iron sulfide. In certain embodiments, an effective quantity of hydrodewaxing catalyst is also added to improve cloud point and pour point, generally by conversion of normal paraffins into isoparaffins. In such embodiments, effective hydrodewaxing catalysts include those typically used for isomerizing and cracking paraffinic hydrocarbon feeds to improve cold flow properties, such as catalysts comprising Ni, W, or molecular sieves or combinations thereof.

Catalyst comprising Ni/W, zeolite with medium or large pore sizes, or a combination thereof are suitable, along with catalyst comprising aluminosilicate molecular sieves such as zeolites with medium or large pore sizes. Effective commercial zeolites include for instance ZSM-5, ZSM-11, ZSM-12, ZSM-22, ZSM-23, ZSM 35, and zeolites of type beta and Y. Hydrodewaxing catalyst is typically supported on an oxide support such as $Al_2O_3$, $SiO_2$, $ZrO2$, zeolites, zeolite-alumina, alumina-silica, alumina-silica-zeolite, activated carbon, and mixtures thereof. Effective liquid hourly space velocity values ($h^{-1}$), on a fresh feed basis relative to the hydrodewaxing catalyst, are in the range of from about 0.1-12.0, 0.1-8.0, 0.1-4.0, 0.5-12.0, 0.5-8.0, 0.5-4.0, 1.0-12.0, 1.0-8.0, 1.0-4.0 or 1.6-2.4.

The vacuum gas oil stream 1144 (or separate light and heavy VGO streams, not shown) are processed in a gas oil hydroprocessing zone 1160/1170, in the presence of an effective amount of hydrogen obtained from recycle within the gas oil hydroprocessing zone and make-up hydrogen. In certain embodiments, all or a portion of the make-up hydrogen is derived from the steam cracker hydrogen stream 1232 from the olefins recovery train 1230. In certain embodiments, all or a portion of the heavy middle distillate fraction, such as a portion of the third middle distillate fraction 1124, for example, atmospheric gas oil from the atmospheric distillation zone 1110, can also be treated in the gas oil hydroprocessing zone 1160/1170. The heavy middle distillate fraction can include a full range atmospheric gas oil, or a fraction thereof such as heavy atmospheric gas oil, and any portion not treated in the gas oil hydroprocessing zone 1160/1170 is separately treated.

Further, a portion of the third middle distillate fraction 1124 can be routed to the gas oil hydroprocessing zone. In certain embodiments, all, a substantial portion, a significant portion or a major portion of the vacuum gas oil stream 1144 is routed to the gas oil hydroprocessing zone 1160/1170, and any remainder of the vacuum gas oil can be separately treated. In combination, or alternatively with the straight run vacuum gas oil stream 1144, the feed to the gas oil hydroprocessing zone 1160/1170 can include a wide range of initial feedstocks obtained from various sources, such as one or more of treated vacuum gas oil, demetallized oil from solvent demetallizing operations, deasphalted oil from solvent deasphalting operations, coker gas oils from coker operations, cycle oils from delayed coking operations including heavy coker gas oil, and visbroken oils from visbreaking operations. In certain embodiments in which residue treatment is integrated, all, a substantial portion, a significant portion or a major portion of gas oil range products, stream 1188, can be routed to the gas oil hydroprocessing zone 1160/1170, and any remainder can be separately treated. The feedstream to the feed gas oil hydroprocessing zone 1160/1170 generally has a boiling point range within about 350-800, 350-700, 350-600 or 350-565° C.

In a hydrocracking mode of operation for treatment of the vacuum gas oil, denoted as gas oil hydrocracking zone 1160, the feed is converted by reaction under suitable hydrocracking conditions, and generally produces off-gas and light ends (not shown), a wild naphtha stream 1162, a diesel fuel fraction 1164, and an unconverted oil fraction 1166. Hydrocracking processes are used commercially in a large number of petroleum refineries. They are used to process a variety of feeds boiling above the atmospheric gas oil range (for example, in the range of about 370 to 520° C.) in conventional hydrocracking units and boiling above the vacuum gas oil range (for example, above about 520° C.) in residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen-to-carbon ratio and by removing organosulfur and organonitrogen compounds. The significant economic benefit derived from hydrocracking processes has resulted in substantial development of process improvements and more active catalysts.

Three major hydrocracking process schemes include single-stage once through hydrocracking, series-flow hydrocracking with or without recycle, and two-stage recycle hydrocracking. Single-stage once through hydrocracking is the simplest of the hydrocracker configuration and typically occurs at operating conditions that are more severe than hydrotreating processes, and less severe than conventional higher pressure hydrocracking processes. It uses one or more reactors for both treating steps and cracking reaction, so the catalyst must be capable of both hydrotreating and hydrocracking. This configuration is cost effective, but typically results in relatively low product yields (for example, a maximum conversion rate of about 50 wt %). Single stage hydrocracking is often designed to maximize mid-distillate yield over a single or dual catalyst systems. Dual catalyst systems can be used in a stacked-bed configuration or in two different reactors. The effluents are passed to a fractionator column to separate the $H_2S$, $NH_3$, light gases ($C_1$-$C_4$), naphtha and diesel products, boiling in the temperature range including and below atmospheric gas oil range fractions (for instance in the temperature range of 36–370° C.). The hydrocarbons boiling above the atmospheric gas oil range (for instance 370° C.) are typically unconverted oils.

The gas oil hydrocracking zone 1160 operates under mild, moderate or severe hydrocracking conditions, and generally produces off-gas and light ends (not shown), a wild naphtha stream 1162, a diesel fuel fraction 1164, and an unconverted oil fraction 1166. Effluent off-gases are recovered from the gas oil hydrocracking zone 1160 and are passed to the olefins recovery train, the saturated gas plant as part of the other gases stream 1134, and/or directly to a fuel gas system. LPG can be recovered from the gas oil hydrocracking zone 1160 and routed to the steam cracking zone 1220, the olefins recovery train 1230 and/or the saturated gas plant 1130. The naphtha fraction 1162 is routed to the steam cracking zone 1220. In certain embodiments, the naphtha fraction 1162 is routed through the crude complex 1105, alone, or in combination with other wild naphtha fractions from within the integrated process. In embodiments in which naphtha fraction 1162 is routed through the crude complex 1105, all or a portion of the LPG produced in the gas oil hydrocracking zone 1160 can be passed with the naphtha fraction 1162. The unconverted oil fraction 1166 is routed to the coking zone 1300. The diesel fuel fraction 1164 is recovered as fuel, for instance, as a diesel fuel blending component that can be compliant with Euro V diesel standards, and can be combined with the diesel fuel fraction 1154 from the diesel hydrotreating zone 1150.

Vacuum gas oil hydrocracking zone 1160 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrocracked products and minor proportions of off-gases, light ends and unconverted product. A suitable vacuum gas oil hydrocracker zone 1160 can include, but is not limited to, systems based on technology commercially available from Honeywell UOP, US; Chevron Lummus Global LLC (CLG), US; Axens, FR; Shell Catalysts & Technologies, US, or Haldor Topsoe, DK.

The gas oil hydrocracking zone 1160 can contain one or more fixed-bed, ebullated-bed, slurry-bed, moving bed, continuous stirred tank (CSTR) or tubular reactors, in series and/or parallel arrangement, and is operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the gas oil hydrocracking zone 1160. In addition, equipment, including pumps, compressors, high temperature separation vessels, low temperature separation vessels and the like to separate reaction products and provide hydrogen recycle within the gas oil hydrocracking zone 1160, are well known and are considered part of the gas oil hydrocracking zone 1160.

Series-flow hydrocracking with or without recycle is one of the most commonly used configurations. It uses one reactor (containing both treating and cracking catalysts) or two or more reactors for both treating and cracking reaction steps. In a series-flow configuration the entire hydrocracked product stream from the first reaction zone, including light gases (typically $C_1$-$C_4$, $H_2S$, $NH_3$) and all remaining hydrocarbons, are sent to the second reaction zone. Unconverted bottoms from the fractionator column are recycled back into the first reactor for further cracking. This configuration converts heavy crude oil fractions such as vacuum gas oil, into light products and has the potential to maximize the yield of naphtha, kerosene and/or diesel range hydrocarbons, depending on the recycle cut point used in the distillation section.

Two-stage recycle hydrocracking uses two reactors and unconverted bottoms from the fractionation column are passed to the second reactor for further cracking. Since the first reactor accomplishes both hydrotreating and hydrocracking, the feed to the second reactor is virtually free of ammonia and hydrogen sulfide. This permits the use of high performance zeolite catalysts which are susceptible to poisoning by sulfur or nitrogen compounds.

Effective hydrocracking catalyst generally contain about 5-40 wt % based on the weight of the catalyst, of one or more active metal component of metals or metal compounds (oxides or sulfides) selected from the Periodic Table of the Elements IUPAC Groups 6, 7, 8, 9 and 10. In certain embodiments, the active metal component is one or more of Mo, W, Co or Ni. The active metal component is typically deposited or otherwise incorporated on a support, such as amorphous alumina, amorphous silica alumina, zeolites, or combinations thereof. In certain embodiments, alone or in combination with the above metals, Pt group metals such as Pt and/or Pd, may be present as a hydrogenation component, generally in an amount of about 0.1-2 wt % based on the weight of the catalyst.

Exemplary products from the gas oil hydrocracking zone 1160 include 27-99, 27-90, 27-82, 27-80, 27-75, 27-52, 27-48, 30-99, 30-90, 30-82, 30-80, 30-75, 30-52, 30-48, 48-99, 48-90, 48-82, 48-80, 48-75, 48-52, 78-99, 78-90, 78-85, 80-90 or 80-99 wt % of effluent (relative to the feed to the gas oil hydrocracking zone 1160) boiling at or below the atmospheric residue end boiling point, such as 370° C., including LPG, kerosene, naphtha, and atmospheric gas oil range components. The remaining bottoms fraction is the unconverted oil fraction all or a portion of which can be effectively integrated as feed to the coking zone 1300 as described herein.

In certain embodiments, a gas oil hydrocracking zone 1160 operates as a once-through single reactor hydrocracking system, and typically includes a reaction zone and a fractionating zone, which can serve as a mild conversion or partial conversion hydrocracker. A reaction zone in a once-through single reactor system generally includes one or more inlets in fluid communication with the feedstock 1144 and optionally all or any portion of stream 1124, and a source of hydrogen gas. One or more outlets of reaction zone that discharge an effluent stream are in fluid communication with one or more inlets of the fractionating zone (typically including one or more high pressure and/or low pressure separation stages therebetween for recovery of recycle hydrogen). The fractionating zone typically includes one or more outlets for discharging gases, typically $H_2$, $H_2S$, $NH_3$, and light hydrocarbons ($C_1$-$C_4$); one or more outlets for recovering products, such as naphtha 1162 and diesel range products 1164, and one or more outlets for discharging bottoms 1166 including hydrocarbons boiling above the atmospheric gas oil range (for instance 370° C.) which is then routed to the coking zone 1300. In certain embodiments, the temperature cut point for the bottoms stream (and correspondingly the end point for the products) is a range corresponding to the upper temperature limit of the diesel range products 1164.

In operation of a hydrocracking zone 1160 operating as a once-through single reactor hydrocracking system, the feedstock and hydrogen are charged to the reaction zone. The hydrogen is provided in an effective quantity to support the requisite degree of hydrocracking, feed type, and other factors, and can be any combination including recycle hydrogen from optional gas separation subsystems associated with reaction zone, hydrogen derived from the fractionator gas stream, and/or make-up hydrogen, if necessary. In certain embodiments, a reaction zone can contain multiple catalyst beds and can receive one or more quench hydrogen streams between the beds.

The reaction effluent stream contains converted, partially converted and unconverted hydrocarbons. Reaction effluents are passed to the fractionating zone (optionally after one or more high pressure and low pressure separation stages to recover recycle hydrogen), generally to recover gas and liquid products and by-products, and separate a bottoms fraction.

The gas stream, typically containing $H_2$, $H_2S$, $NH_3$, and light hydrocarbons ($C_1$-$C_4$), is discharged and recovered, and can be further processed, for instance, in the olefins recovery train, the saturated gas plant as part of the other gases stream 1134, and/or integrated directly in a fuel gas system. LPG can be recovered and routed to the steam cracking zone, the olefins recovery train and/or the saturated gas plant. One or more cracked product streams are discharged via appropriate outlets of the fractionator as the naphtha 1162 and diesel range products 1164. In certain embodiments, a fractionating zone can operate as a flash vessel to separate heavy components at a suitable cut point, for example, a range corresponding to the upper temperature range of the diesel range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

The reactor arrangement in the gas oil hydrocracking zone 1160 operating as a once-through single reactor hydrocracking system can contain one or more fixed-bed, ebullated-bed, slurry-bed, moving bed, continuous stirred tank (CSTR), or tubular reactors, which can be in parallel arrangement, and is operated under conditions effective for gas oil hydrocracking, the particular type of reactor, the feed characteristics, the desired product slate and the catalyst selection. The once-through single reactor hydrocracking system can operate in a mild hydrocracking mode of operation or a partial conversion mode of operation. Additional equipment, including exchangers, furnaces, feed pumps, quench pumps, and compressors to feed the reactor(s) and maintain proper operating conditions, are well known and are considered part of the once-through single reactor hydrocracking system. In addition, equipment, including pumps, compressors, high temperature separation vessels, low temperature separation vessels and the like to separate reaction products and provide hydrogen recycle within the once-through single reactor hydrocracking system, are well known and are considered part of the once-through single reactor hydrocracking system.

In certain embodiments, operating conditions for the reactor(s) in a hydrocracking zone 1160 using a once-through (single stage without recycle) configuration and operating in a mild hydrocracking mode include:

a reactor temperature (° C.) in the range of from about 300-500, 300-475, 300-450, 330-500, 330-475 or 330-450;

a hydrogen partial pressure (barg) in the range of from about 15-100, 15-70, 15-60, 15-50, 20-100, 20-70, 20-60, 20-50, 30-100, 30-70, 30-60 or 30-50;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the gas oil hydrocracking zone 1160 operating as a once-through single reactor system, and operating in a mild hydrocracking mode of operation, include 27-52, 27-48, 30-50 or 30-52 wt % of effluent (relative to the feed to the gas oil hydrocracking zone 1160) boiling at or below the atmospheric residue end boiling point, such as 370° C., including LPG and distillate product components (naphtha 1162 and diesel range products 1164). The remaining bottoms fraction is the unconverted oil fraction.

In certain embodiments, operating conditions for the reactor(s) in a hydrocracking zone 1160 using a once-through (single stage without recycle) configuration and operating in a partial conversion mode include:

a reactor temperature (° C.) in the range of from about 300-500, 300-475, 300-450, 330-500, 330-475 or 330-450;

a hydrogen partial pressure (barg) in the range of from about 50-120, 50-100, 50-90, 60-120, 60-100, 60-90, 70-120, 70-100 or 70-90;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from the gas oil hydrocracking zone 1160 operating as a once-through single reactor system, and operating as a partial conversion hydrocracker, include 48-82, 50-80, 48-75, or 50-75 wt % of effluent (relative to the feed to the gas oil hydrocracking zone 1160) boiling at or below the atmospheric residue end boiling point, such as 370° C., including LPG and distillate product components (naphtha 1162 and diesel range products 1164). The remaining bottoms fraction is the unconverted oil fraction that is routed to the coking zone 1300 as described herein.

In certain embodiments, a gas oil hydrocracking zone 1160 operates as a series-flow hydrocracking system with recycle to the first reactor zone, the second reactor zone, or both the first and second reactor zones. In general, series flow hydrocracking zone includes a first reaction zone, a second reaction zone and a fractionating zone. The first reaction zone generally includes one or more inlets in fluid communication with the feedstock 1144 and optionally all or any portion of stream 1124, a source of hydrogen gas, in certain embodiments a recycle stream comprising all or a portion of the fractionating zone bottoms stream (and optionally a portion of the fractionating zone products). One or more outlets of the first reaction zone that discharge an effluent stream is in fluid communication with one or more inlets of the second reaction zone. In certain embodiments, the effluents are passed to the second reaction zone without separation of any excess hydrogen and light gases. In optional embodiments, one or more high pressure and low pressure separation stages are provided between the first and second reaction zones for recovery of recycle hydrogen. The second reaction zone generally includes one or more inlets in fluid communication with one or more outlets of the first reaction zone, optionally a source of additional hydrogen gas, and in certain embodiments a recycle stream comprising all or a portion of the fractionating zone bottoms stream, and optionally a portion of the fractionating zone products. One or more outlets of the second reaction zone that discharge an effluent stream is in fluid communication with one or more inlets of the fractionating zone (optionally having one or more high pressure and low pressure separation stages in between the second reaction zone and the fractionating zone for recovery of recycle hydrogen). The fractionating zone includes one or more outlets for discharging gases, typically $H_2$, $H_2S$, $NH_3$, and light hydrocarbons ($C_1$-$C_4$); one or more outlets for recovering distillate products, such as naphtha 1162 and diesel range products 1164; and one or more outlets for discharging bottoms 1166 including hydrocarbons boiling above the atmospheric gas oil range (for instance about 370° C.), that is routed to the coking zone 1300 as described herein. In certain embodiments, the temperature cut point for the bottoms stream (and correspondingly the end point for the products) is a range corresponding to the upper temperature limit of the diesel range products 1164.

In operation of a hydrocracking zone 1160 operating as a series flow hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with one or both of the reaction zones, derived from the fractionator gas stream, and/or make-up hydrogen. In certain embodiments, one or both of the reaction zones can contain multiple catalyst beds and can receive one or more quench hydrogen streams between the beds.

The first reaction zone operates under effective conditions for production of a reaction effluent stream which is passed to the second reaction zone (optionally after one or more high pressure and low pressure separation stages to recover recycle hydrogen), optionally along with an additional hydrogen stream. The second reaction zone operates under conditions effective for production of the second reaction effluent stream, which contains converted, partially converted and unconverted hydrocarbons. The second reaction effluent stream is passed to the fractionating zone, generally to recover gas and liquid products and by-products, and separate a bottoms fraction. The gas stream, typically containing $H_2$, $H_2S$, $NH_3$, and light hydrocarbons ($C_1$-$C_4$), is discharged and recovered, and can be further processed, for instance, in the olefins recovery train, the saturated gas plant as part of the other gases stream 1134, and/or integrated directly in a fuel gas system. LPG can be recovered and routed to the steam cracking zone, the olefins recovery train and/or the saturated gas plant. One or more cracked product streams are discharged via appropriate outlets of the fractionator as the naphtha 1162 and diesel range products 1164. In certain embodiments, a portion of the diesel range products 1164 can be integrated with the recycle streams to the reactors, for instance, to maximize naphtha feed to the steam cracker. In certain embodiments, a fractionating zone can operate as a flash vessel to separate heavy components at a suitable cut point, for example, a range corresponding to the upper temperature range of the diesel range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream. In certain embodiments, in which the recycle is at or approaches 100 vol %, recycle of the unconverted oil increases the yield of products suitable as feed to the steam cracking zone 1220.

The reactor arrangement in the gas oil hydrocracking zone 1160 operating as a series flow hydrocracking system with recycle can contain one or more fixed-bed, ebullated-bed, slurry-bed, moving bed, continuous stirred tank (CSTR), or tubular reactors, which can be in parallel arrangement, and are operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the series flow hydrocracking system. In addition, equipment, including pumps, compressors, high temperature separation vessels, low temperature separation vessels and the like to separate reaction products and provide hydrogen recycle within the series flow hydrocracking system, are well known and are considered part of the series flow hydrocracking system.

In certain embodiments, operating conditions for the first reactor(s) in a hydrocracking zone 1160 using a once-through series configuration (with recycle) operating in a partial conversion mode of operation include:

a reactor temperature (° C.) in the range of from about 300-500, 300-475, 300-450, 330-500, 330-475 or 330-450;

a hydrogen partial pressure (barg) in the range of from about 50-150, 50-120, 50-100, 50-90, 60-150, 60-120, 60-100, 60-90, 60-80, 70-150, 70-120 or 70-100;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second reactor(s) in a hydrocracking zone 1160 using a once-through series configuration (with recycle) operating in a partial conversion mode of operation include:

a reactor temperature (° C.) in the range of from about 300-500, 300-475, 300-450, 330-500, 330-475 or 330-450;

a hydrogen partial pressure (barg) in the range of from about 50-150, 50-120, 50-100, 50-90, 60-150, 60-120, 60-100, 60-90, 60-80, 70-150, 70-120 or 70-100;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a hydrocracking zone 1160 using a series-flow configuration (with recycle) and operating as a partial conversion hydrocracker include 48-82, 50-80, 48-75 or 50-75 wt % of effluent (relative to the feed to the hydrocracking zone 1160) boiling at or below the atmospheric residue end boiling point, such as 370° C., including LPG and distillate product components (naphtha 1162 and diesel range products 1164). The remaining bottoms fraction is the unconverted oil fraction that is routed to the coking zone 1300 as described herein.

In certain embodiments, a gas oil hydrocracking zone 1160 operates as a two-stage hydrocracking system with recycle, and typically includes a first reaction zone, a second reaction zone and a fractionating zone. The first reaction zone generally includes one or more inlets in fluid communication with the feedstock 1144 and optionally all or any portion of stream 1124, and a source of hydrogen gas. One or more outlets of the first reaction zone that discharge an effluent stream is in fluid communication with one or more inlets of the fractionating zone (optionally having one or more high pressure and low pressure separation stages therebetween for recovery of recycle hydrogen. The fractionating zone includes one or more outlets for discharging gases, typically $H_2S$, $NH_3$, and light hydrocarbons ($C_1$-$C_4$); one or more outlets for recovering distillate product, such as naphtha 1162 and diesel range 1164; and one or more outlets for discharging bottoms 1166 including hydrocarbons boiling above the atmospheric gas oil range (for instance about 370° C.) that is routed to the coking zone 1300 as described herein. In certain embodiments, the temperature cut point for the bottoms stream (and correspondingly the end point for the products) is a range corresponding to the upper temperature limit of the diesel range products 1164. The fractionating zone bottoms outlet is in fluid communication with the one or more inlets of the second reaction zone for receiving a recycle stream, which is all or a portion of the bottoms stream. In certain optional embodiments, a portion of the bottoms stream is in fluid communication with one or more inlets of the first reaction zone. The second reaction zone generally includes one or more inlets in fluid communication with the fractionating zone bottoms outlet portion and a source of hydrogen gas. One or more outlets of the second reaction zone that discharge effluent stream are in fluid communication with one or more inlets of the fractionating zone (optionally having one or more high pressure and low pressure separation stages therebetween for recovery of recycle hydrogen).

In operation of a hydrocracking zone 1160 operating as a two-stage hydrocracking system with recycle, the feedstock and hydrogen are charged to the first reaction zone. The hydrogen is provided in an effective quantity to support the requisite degree of hydrocracking, feed type, and other factors, and can be any combination including recycle hydrogen from optional gas separation subsystems associated with the reaction zones, derived from the fractionator gas stream, and/or make-up hydrogen, if necessary. In certain embodiments, a reaction zone can contain multiple catalyst beds and can receive one or more quench hydrogen streams between the beds.

The first reaction zone operates under effective conditions for production of a reaction effluent stream which is passed to the fractionating zone (optionally after one or more high pressure and low pressure separation stages to recover recycle hydrogen) generally to recover gas and liquid products and by-products, and separate a bottoms fraction. The gas stream, typically containing $H_2$, $H_2S$, $NH_3$, and light hydrocarbons ($C_1$-$C_4$), is discharged and recovered, and can be further processed, for instance, in the olefins recovery train, the saturated gas plant as part of the other gases stream 1134, and/or integrated directly in a fuel gas system. LPG can be recovered and routed to the steam cracking zone, the olefins recovery train and/or the saturated gas plant.

One or more cracked product streams are discharged via appropriate outlets of the fractionator as the naphtha 1162 and diesel range products 1164. In certain embodiments, a portion of the diesel range products 1164 can be integrated with the feed to the second stage reactor, for instance, to maximize naphtha feed to the steam cracker. In certain embodiments, a fractionating zone can operate as a flash vessel to separate heavy components at a suitable cut point, for example, a range corresponding to the upper temperature range of the diesel range products 1164. In certain embodiments, a suitable cut point is in the range of 350 to 450° C., 360 to 450° C., 370 to 450° C., 350 to 400° C., 360 to 400° C., 370 to 400° C., 350 to 380° C., or 360 to 380° C.

In certain embodiments at least a portion of the fractionator bottoms stream from the reaction effluent is recycled to the first or second reaction zones. In certain embodiments, a portion of the fractionator bottoms from the reaction effluent is removed as bleed stream, which can be about 0-10 vol %, 1-10 vol %, 1-5 vol % or 1-3 vol % of the fractionator bottoms. In certain embodiments, all or a portion of the bottoms stream is recycled to the second reaction zone, the first reaction zone, or both the first and second reaction zones. For instance, a recycle stream to the first reaction zone can comprise 0 to 100 vol %, 0 to about 80 vol %, or 0 to about 50 vol % of the fractionator bottoms stream, and a recycle stream to the second reaction zone can comprise 0 to 100 vol %, 0 to about 80 vol %, or 0 to about 50 vol % of the fractionator bottoms stream. In certain embodiments, in which the recycle is at or approaches 100 vol %, recycle of the unconverted oil increases the yield of products suitable as feed to the steam cracking zone 1220.

The second reaction zone operates under conditions effective for production of the reaction effluent stream, which contains converted, partially converted and unconverted hydrocarbons. The second stage reaction effluent is passed to the fractionating zone, optionally through one or more gas separators to recover recycle hydrogen and remove certain light gases.

The reactor arrangement in the gas oil hydrocracking zone 1160 operating as a two-stage hydrocracking system with recycle can contain one or more fixed-bed, ebullated-bed, slurry-bed, moving bed, continuous stirred tank (CSTR), or tubular reactors, which can be in parallel arrangement, and are operated under conditions effective for gas oil hydrocracking, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the two-stage hydrocracking system. In addition, equipment, including pumps, compressors, high temperature separation vessels, low temperature separation vessels and the like to separate reaction products and provide hydrogen recycle within the two-stage hydrocracking system, are well known and are considered part of the two-stage hydrocracking system.

In certain embodiments, operating conditions for the first stage reactor(s) in a hydrocracking zone 1160 using a two-stage (with recycle) configuration operating in a full conversion mode of operation include:

a reactor temperature (° C.) in the range of from about 300-500, 300-475, 300-450, 330-500, 330-475 or 330-450;

a hydrogen partial pressure (barg) in the range of from about 80-170, 80-150, 80-140, 80-130, 90-170, 90-150, 90-140, 90-130, 100-170, 100-150, 100-140, 100-130, 110-170, 110-150, 110-140, or 110-130;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

In certain embodiments, operating conditions for the second stage reactor(s) in a hydrocracking zone 1160 using a two-stage (with recycle) configuration operating in a full conversion mode of operation include:

a reactor temperature (° C.) in the range of from about 300-500, 300-475, 300-450, 330-500, 330-475 or 330-450;

a hydrogen partial pressure (barg) in the range of from about 80-170, 80-150, 80-140, 80-130, 90-170, 90-150, 90-140, 90-130, 100-170, 100-150, 100-140, 100-130, 110-170, 110-150, 110-140, or 110-130;

a hydrogen gas feed rate (standard liters per liter of hydrocarbon feed, SLt/Lt) of up to about 2500, 2000 or 1500, in certain embodiments from about 800-2500, 800-2000, 800-1500, 1000-2500, 1000-2000 or 1000-1500; and a liquid hourly space velocity ($h^{-1}$), on a fresh feed basis relative to the hydrotreating catalysts, in the range of from about 0.1-10.0, 0.1-6.0, 0.1-5.0, 0.1-4.0, 0.1-2.0, 0.3-10.0, 0.3-5.0, 0.3-2.0, 0.5-10.0, 0.5-6.0, 0.5-5.0, 0.5-4.0, 0.5-3.0 or 0.5-2.0.

Under the above conditions and catalyst selections, exemplary products from a hydrocracking zone 1160 using a two-stage hydrocracker (with recycle) configuration in a full conversion mode include 78-99, 78-90, 78-85, 80-90 or 80-99 wt % of effluent (relative to the feed to the hydrocracking zone 1160 boiling at or below the atmospheric residue end boiling point, such as 370° C., including LPG, and distillate product components (naphtha 1162 and diesel range products 1164). The remaining bottoms fraction is the unconverted oil fraction that is routed to the coking zone 1300 as described herein.

In a hydrotreating mode of operation for treatment of the vacuum gas oil, denoted as gas oil hydrotreating zone 1170, the feed is converted by reaction under suitable hydrotreating conditions, and generally produces off-gas and light ends (not shown), a wild naphtha stream 1172 and hydrotreated gas oil stream 1176. Effluent off-gases are recovered from the gas oil hydrotreating zone 1170 and are passed to the olefins recovery train, the saturated gas plant as part of the other gases stream 1134, and/or directly to a fuel gas system. LPG can be recovered from the gas oil hydrotreating zone 1170 and routed to the steam cracking zone, the olefins recovery train and/or the saturated gas plant. The naphtha fraction 1172 is routed to the steam cracking zone 1220. In certain embodiments, the hydrotreated naphtha fraction 1172 is routed through the crude complex 1105, alone, or in combination with other wild naphtha fractions from within the integrated process. In embodiments in which hydrotreated naphtha fraction 1172 is routed through the crude complex 1105, all or a portion of the LPG produced in the gas oil hydrotreating zone 1170 can be passed with the hydrotreated naphtha fraction 1172. Hydrotreated gas oil 1176 is separately treated. In certain embodiments, in addition to or in conjunction with the hydrotreated naphtha fraction 1172, all or a portion of the hydrotreated distillates and naphtha from the gas oil hydrotreating zone 1170 are passed to the diesel hydrotreating zone 1150. In additional embodiments, a middle distillates stream 1164 is also recovered, for instance, as used as a diesel fuel blending component.

The gas oil hydrotreating zone 1170 can operate under mild, moderate or severe conditions, depending on factors including the feedstock and the desired degree of conversion. Such conditions are effective for removal of a significant amount of the sulfur and other known contaminants, and for conversion of the feed(s) into a major proportion of hydrotreated gas oil 1176 that is routed to the coking zone 1300 as described herein, and minor proportions of off-gases, light ends, and hydrotreated naphtha 1172 that is routed to the steam cracking zone 1220 (optionally via the crude complex 1105). The hydrotreated gas oil fraction 1176 generally contains the portion of the gas oil hydrotreating zone 1170 effluent that is at or above the AGO, H-AGO or VGO range.

The gas oil hydrotreating zone 1170 can contain one or more fixed-bed, ebullated-bed, slurry-bed, moving bed, continuous stirred tank (CSTR) or tubular reactors, in series and/or parallel arrangement, and is operated under conditions effective for gas oil hydrotreating, the particular type of reactor, the feed characteristics, the desired product slate and the catalyst selection. Additional equipment, including exchangers, furnaces, feed pumps, quench pumps, and compressors to feed the reactor(s) and maintain proper operating conditions, are well known and are considered part of the gas oil hydrotreating zone 1170. In addition, equipment, including pumps, compressors, high temperature separation vessels, low temperature separation vessels and the like to separate reaction products and provide hydrogen recycle within the gas oil hydrotreating zone 1170, are well known and are considered part of the gas oil hydrotreating zone 1170.

An effective quantity of catalyst is provided in the gas oil hydrotreating zone 1170, including those possessing hydrotreating functionality, for hydrodesulfurization and hydrodenitrification. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Co, Ni, W and Mo. The active metal component is typically deposited or otherwise incorporated on a support, such as amorphous alumina, amorphous silica alumina, zeolites, or combinations thereof. In certain embodiments, the catalyst used in the gas oil hydrotreating zone 1170 includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodesulfurization and hydrodenitrification. One or more series of reactors can be provided, with different catalysts in the different reactors of each series. For instance, a first reactor includes Co/Mo catalyst and a second reactor includes Ni/Mo catalyst.

In additional embodiments, an effective quantity of hydrodemetallization also can be added. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Ni and Mo. The active metal component is typically deposited or otherwise incorporated on a support such as gamma alumina.

In certain embodiments, the gas oil hydrotreating zone 1170 operating conditions include:

a reactor temperature (° C.) in the range of from about 300-440, 300-400, 300-390, 310-440, 310-400, 310-390, 320-440, 320-400 or 320-390;

a hydrogen partial pressure (barg) in the range of from about 30-100, 30-80, 30-60, 40-100, 40-80, 40-60, 50-100, 50-80 or 50-60;

a hydrogen gas feed rate (standard liters per liter of hydrocarbon feed, SLt/Lt) of up to about 1000, 750 or 500, in certain embodiments from about 100-1000, 100-750, 100-500, 200-1000, 200-750, 200-500, 300-1000, 300-750 or 300-500; and a liquid hourly space velocity ($h^{-1}$), on a fresh feed basis relative to the hydrotreating catalysts, in the range of from about 0.5-10.0, 0.5-5.0, 0.5-4.0, 1.0-10.0, 1.0-5.0, 1.0-4.0, 2.0-10.0, 2.0-5.0 or 2.0-4.0.

Under the above conditions and catalyst selections, exemplary products from the gas oil hydrotreating zone 1170 include 1-30, 5-30, 2-27 or 5-27 wt % of effluent (relative to the feed to the gas oil hydrotreating zone 1170) boiling at or below the atmospheric residue end boiling point, such as 370° C., including LPG, kerosene, naphtha, and atmospheric gas oil range components. The remaining bottoms fraction is the hydrotreated gas oil fraction.

In additional embodiments, the gas oil hydrotreating zone 1170 can operate under conditions effective for feed conditioning and to maximize targeted conversion to petrochemicals in the steam cracker complex. Accordingly, in certain embodiments severity conditions are selected that achieve objectives differing from those used for conventional refinery operations. That is, while typical VGO hydrotreating operates with less emphasis on conservation of liquid product yield, in the present embodiment VGO hydrotreating operates to produce a higher yield of lighter products which are intentionally recovered to maximize chemicals yield. In embodiments to maximize conversion to petrochemicals, the gas oil hydrotreating zone 1170 operating conditions include:

a reactor temperature (° C.) in the range of from about 320-440, 320-420, 320-410, 330-440, 330-420, 330-410, 330-400, 340-440, 340-420, 340-410 or 340-400;

a hydrogen partial pressure (barg) in the range of from about 40-100, 40-90, 40-80, 45-100, 45-90, 45-80, 50-100, 50-90 or 50-80;

a hydrogen gas feed rate (standard liters per liter of hydrocarbon feed, SLt/Lt) of up to about 1000, 900 or 800, in certain embodiments from about 300-1000, 300-900, 300-800, 400-1000, 400-900, 400-800, 500-1000, 500-900 or 500-800; and a liquid hourly space velocity ($h^{-1}$), on a fresh feed basis relative to the hydrotreating catalysts, in the range of from about 0.2-4.0, 0.2-3.0, 0.2-2.0, 0.5-4.0, 0.5-3.0, 0.5-2.0, 1.0-4.0, 1.0-3.0 or 1.0-2.0.

Under the above conditions and catalyst selections, exemplary products from the gas oil hydrotreating zone 1170 operating under conditions effective for feed conditioning and to maximize targeted conversion to petrochemicals in the steam cracker complex include 20-30, 22-28, 23-27 or 24-26 wt % of effluent (relative to the feed to the gas oil hydrotreating zone 1170) boiling at or below the atmospheric residue end boiling point, such as 370° C., including LPG, kerosene, naphtha, and atmospheric gas oil range components. The remaining bottoms fraction is the hydrotreated gas oil fraction.

In certain embodiments, the gas oil hydrotreating zone 1170 contains one or more trains of reactors, with a first reactor having two catalyst beds with two quench streams including an inter-bed quench stream, and a second reactor (lag reactor) having one catalyst bed with a quench stream. In high capacity operations, two or more parallel trains of reactors are utilized. In such embodiments, the flow in gas oil hydrotreating zone 1170 is split after the feed pump into parallel trains, wherein each train contains feed/effluent heat exchangers, feed heater, a reactor and the hot separator. The trains recombine after the hot separators. Tops from the hot separators are combined and passed to a cold separator.

Bottoms from the hot separators are passed to a hot flash drum. Bottoms from the cold separator and tops from the hot flash drum are passed to a low pressure flash drum to remove off-gasses. Hot flash liquid bottoms and low pressure flash bottoms are passed to a stripper to recover hydrotreated gas oil and wild naphtha. Tops from the cold separator are subjected to absorption and amine scrubbing. Recycle hydrogen is recovered and passed (along with make-up hydrogen) to the reaction zone as treat gas and quench gas.

In the system 1100, the vacuum residue treatment is catalytic hydroprocessing. The vacuum residue stream 1142 is optionally processed in a vacuum residue hydrocracking zone 1180, in the presence of an effective amount of hydrogen obtained from recycle within the vacuum residue hydrocracking zone and from make-up hydrogen. In certain embodiments, all or a portion of the make-up hydrogen is derived from the steam cracker hydrogen stream 1232 from the olefins recovery train 1230.

The vacuum residue hydrocracking zone 1180 operates under severe hydrocracking conditions, and generally produces off-gas and light ends (not shown), pitch 1190, and one or more of a wild naphtha stream 1184, a diesel fraction 1186, an unconverted oil fraction 1188, and a middle distillates stream 1182 that is routed to the vacuum gas oil hydroprocessing zone 1160/170 and/or the diesel hydrotreating zone 1150. Effluent off-gases are recovered from the vacuum residue hydrocracking zone 1180 and are passed to the olefins recovery train, the saturated gas plant as part of the other gases stream 1134, and/or directly to a fuel gas system. LPG can be recovered from the vacuum residue hydrocracking zone 1180 and routed to the steam cracking zone, the olefins recovery train and/or the saturated gas plant. In embodiments in which a naphtha fraction 114 is recovered, it is routed to the steam cracking zone 1220. In certain embodiments, in which a naphtha fraction 1184 is recovered, it is routed through the crude complex 1105, alone, or in combination with other wild naphtha fractions from within the integrated process. The unconverted oil fraction 118 is routed to the coking zone 1300 as described herein.

The diesel fraction 1186 is recovered as a diesel fuel pool component, or used as diesel fuel compliant with Euro V standards. In embodiments in which the vacuum residue hydrocracking zone 1180 operates under conditions effective to produce diesel fuel compliant with Euro V standards, the fraction 1186 can be combined with the diesel fuel fraction 1154 from the diesel hydrotreater 1150, the diesel fuel fraction 1164 from the vacuum gas oil hydrocracking zone 1160, or both the diesel fuel fractions 1154 and 1164.

The vacuum residue hydrocracking zone 1180 can operate under severe conditions, depending on factors including the feedstock and the desired degree of conversion. Such conditions are effective for removal of a significant amount of the sulfur and other known contaminants, and for conversion of the vacuum residue 1142 feed into a major proportion of hydrocracked products and unconverted oil 1188, and a minor portion of off-gases, light ends and pitch 1190 that is passed to the fuel oil pool. The hydrocracked products are recovered as a diesel fuel pool component or used as diesel fuel compliant with Euro V standards, routed to the steam cracking zone 1220, and/or routed to one or more of the other hydroprocessing zones in the integrated process and system (the vacuum gas oil hydroprocessing zone 1160/1170 and/or the diesel hydrotreating zone 1150). The unconverted oil 1188 is routed to the coking zone 1300 as described herein.

The vacuum residue hydrocracking zone 1180 can include one or more ebullated-beds, slurry-beds, fixed-beds or moving beds, in series and/or parallel arrangement. Additional equipment, including exchangers, furnaces, feed pumps, quench pumps, and compressors to feed the reactor(s) and maintain proper operating conditions, are well known and are considered part of the vacuum residue hydrocracking zone 1180. In addition, equipment including pumps, compressors, high temperature separation vessels, low temperature separation vessels and the like to separate reaction products and provide hydrogen recycle within the vacuum residue hydrocracking zone 1180 are well known and are considered part of the vacuum residue hydrocracking zone 1180.

Furthermore, the vacuum residue hydrocracking zone 1180 can include a hydrotreating reaction zone and a hydrocracking reaction zone. For example, the vacuum residue 1142 from the vacuum distillation unit 1140 can be routed to a hydrotreating reaction zone for initial removal of heteroatom-containing compounds, such as those containing metals (in particular Ni and vanadium), sulfur and nitrogen. In certain embodiments, the Ni+V content is reduced by at least about 30, 45, 77, 95 or 100 wt %, the sulfur content is reduced by at least about 70, 80, 92 or 100 wt %, and the nitrogen content is reduced by at least about 70, 80, 92 or 100 wt %.

A vacuum residue hydrocracking zone 1180 generally includes a reaction zone and a fractionating zone. The reaction zone generally includes one or more inlets in fluid communication with a source of the initial feedstock 1142 and a source of hydrogen gas. One or more outlets of the reaction zone that discharge an effluent stream is in fluid communication with one or more inlets of the fractionating zone (typically including one or more high pressure and/or low pressure separation stages therebetween for recovery of recycle hydrogen, not shown, and typically including a vacuum distillation unit). The fractionating zone, which can include one or more flash and/or distillation vessels, generally includes one or more outlets for discharging gases, typically $H_2$, $H_2S$, $NH_3$, and light hydrocarbons (C1-C4); one or more outlets for discharging a wild naphtha stream 1184 that is routed to the steam cracking zone 1220, one or more outlets for discharging either or both of (a) a diesel fraction 1186 that is recovered as a diesel fuel pool component, or used as diesel fuel compliant with Euro V standards, and/or (b) a middle distillates stream 1182 that is routed to the vacuum gas oil hydroprocessing zone 1160/170 and/or the diesel hydrotreating zone 1150; and one or more outlets for routing heavy oils 1188 typically including unconverted oils and other hydrocarbons boiling above the atmospheric gas oil range (for instance about 370° C.), sometimes referred to as residue hydroprocessing VGO, all or a portion of which can be passed to the coking zone 1300 as described herein; and one or more outlets for discharging pitch 1190, sometimes referred to as unconverted vacuum residue.

In operation of the vacuum residue hydrocracking zone 1180, a feedstock stream 1142 and hydrogen are introduced into one or more reactors. The quantity of hydrogen is effective to support the requisite degree of hydrocracking, feed type, and other factors, and can be any combination including, recycle hydrogen from optional gas separation subsystems associated with the vacuum residue reaction zone, derived from vacuum residue fractionator gas stream, and/or make-up hydrogen, if necessary. In certain embodiments, a reaction zone can contain multiple catalyst beds and can receive one or more quench hydrogen streams between the beds (not shown). The reaction effluent stream contains converted, partially converted and unconverted hydrocarbons, and is passed to the fractionating zone (optionally after one or more high pressure and low pressure separation stages to recover recycle hydrogen), generally to recover gas and liquid products and by-products, including one or more of a wild naphtha stream 1184, a diesel fraction 1186, and a middle distillates stream 1182 (that is routed to the vacuum gas oil hydroprocessing zone 1160/170 and/or the diesel hydrotreating zone 1150). A heavy oil stream 1188 is routed to the coking zone 1300 as described herein and pitch 1190 is also recovered. The gas stream, typically containing $H_2$, $H_2S$, $NH_3$, and light hydrocarbons ($C_1$-$C_4$), is discharged and recovered and can be further processed. Effluent off-gases are passed to the olefins recovery train, the saturated gas plant as part of the other gases stream 1134, and/or directly to a fuel gas system. LPG can be recovered and routed to the steam cracking zone, the olefins recovery train and/or the saturated gas plant.

In certain embodiments, a vacuum residue hydrocracking zone 1180, can include an initial vacuum residue hydrotreating zone, generally having a vacuum residue hydrotreating reaction zone, and the vacuum residue hydrocracking reaction zone and the fractionating zone as described above. The vacuum residue hydrotreating zone generally includes one or more inlets in fluid communication with a source of the initial feedstock 1142 and a source of hydrogen gas (including recycle and make-up hydrogen). One or more outlets of the hydrotreating reaction zone that discharge hydrotreated effluent stream is in fluid communication with one or more inlets of the hydrocracking reaction zone. In certain embodiments, the hydrotreated effluents are passed to the second reaction zone without separation of any excess hydrogen and light gases. In optional embodiments, one or more high pressure and low pressure separation stages are provided between the hydrotreating and hydrocracking reaction zones for recovery of recycle hydrogen (not shown). The hydrocracking reaction zone and the fractionation zone generally function as described above.

The feedstock stream 1142 and a hydrogen stream are charged to the hydrotreating reaction zone. The hydrogen stream contains an effective quantity of hydrogen to support the requisite degree of hydrotreating, feed type, and other factors, and can be any combination including, recycle hydrogen from optional gas separation subsystems (not shown) associated with hydrotreating reaction zone and hydrocracking reaction zone, and/or derived from the vacuum residue fractionator gas stream, and make-up hydrogen if necessary. In certain embodiments, a reaction zone can contain multiple catalyst beds and can receive one or more quench hydrogen streams between the beds (not shown).

The hydrotreating reaction zone operates under effective conditions for production of hydrotreated effluent stream which is passed to the hydrocracking reaction zone (optionally after one or more high pressure and low pressure separation stages to recover recycle hydrogen), optionally along with a make-up hydrogen stream. The hydrotreating reaction zone for treatment of the vacuum residue 1142, prior to residue hydrocracking, can contain one or more fixed-bed, ebullated-bed, slurry-bed, moving bed, continuous stirred tank (CSTR) or tubular reactors, in series and/or parallel arrangement, and is operated under conditions effective for vacuum residue hydrocracking, the particular type of reactor, the feed characteristics, the desired product slate and the catalyst selection. In certain embodiments, the operating conditions for hydrotreatment of the vacuum residue 1142, prior to residue hydrocracking, include:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0.

An effective quantity of catalyst is provided for hydrotreatment of the vacuum residue 1142, prior to residue hydrocracking, including those possessing hydrotreating functionality, for hydrodemetallization, hydrodesulfurization and hydrodenitrification. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Co, Ni, W and Mo. The active metal component is typically deposited or otherwise incorporated on a support, such as amorphous alumina, amorphous silica alumina, zeolites, or combinations thereof. In certain embodiments, the catalyst used for hydrotreatment of the vacuum residue 1142, prior to residue hydrocracking, includes one or more beds selected from Co/Mo, Ni/Mo, Ni/W, and Co/Ni/Mo. Combinations of one or more beds of Co/Mo, Ni/Mo, Ni/W and Co/Ni/Mo can also be used. The combinations can be composed of different particles containing a single active metal species, or particles containing multiple active species. In certain embodiments, a combination of Co/Mo catalyst and Ni/Mo catalyst are effective for hydrodemetallization, hydrodesulfurization and hydrodenitrification. One or more series of reactors can be provided, with different catalysts in the different reactors of each series.

For example, in one embodiment a vacuum residue hydrocracking reactor is an ebullated bed reactor. In the ebullated bed reactor liquid is recycled internally with a recycle downflow conduit. A reaction zone includes an ebullated-bed reactor and an associated ebullating pump. An ebullated-bed reactor includes an inlet for receiving a mixture of hydrogen gas and feedstock, and an outlet for discharging product effluent. The ebullating pump is in fluid communication with the ebullated-bed reactor and includes an inlet for receiving effluent recycled from the ebullated-bed reactor and an outlet for discharging the recycled effluent at an increased pressure. In the reaction zone, a mixture of hydrogen gas and feedstock is introduced into the ebullated-bed reactor for reaction that includes conversion of the feedstock into lower molecular weight hydrocarbons. Liquid reaction effluent continuously flows down in the downflow conduit located inside ebullated-bed reactor, and is recycled back to the ebullated-bed reactor at elevated pressure using the ebullating pump. Product effluent is recovered via a reactor outlet. Alternatively, the recycle liquid can be obtained from a vapor separator located downstream of the reactor or obtained from an atmospheric stripper bottoms stream. The recycling of liquid serves to ebullate and stabilize the catalyst bed, and maintain temperature uniformity through the reactor.

In embodiments with an ebullated bed reactor for hydrocracking in the vacuum residue hydrocracking zone 1180, the catalyst is in an ebullated, or suspended state with random movement throughout the reactor vessel. A recirculating pump expands the catalytic bed and maintains the catalyst in suspension. The fluidized nature of the catalyst also permits on-line catalyst replacement of a small portion of the bed to produce a high net bed activity that remains relatively constant over time. In an ebullated bed reactor, highly contaminated feeds can be treated because of the continuous replacement of catalyst.

In certain embodiments, the vacuum residue hydrocracking zone 1180 includes a hydrocracking ebullated bed reactor operating under the following conditions:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500;

a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2.

Effective hydrocracking catalyst for an ebullated bed reactor in the vacuum residue hydrocracking zone 1180 include those possessing hydrotreating functionality. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Co, Ni, and Mo. The active metal component is typically deposited or otherwise incorporated on a support, such as amorphous alumina, amorphous silica alumina, zeolites, or combinations thereof. One or more series of reactors can be provided, with different catalysts in the different reactors of each series.

Under the above conditions and catalyst selections, exemplary products from a ebullated bed reactor in the vacuum residue hydrocracking zone 1180 include LPG in the range of 3-6 wt %, diesel in the range of about 25-40 wt %, naphtha in the range of about 10-20 wt %, pitch in the range of about 10-20 wt %, and hydroprocessed gas oil in the range of about 20-30 wt %. All or a portion of diesel from the vacuum residue hydrocracking zone 1180 can be combined with the VGO and routed to the gas oil hydrocracking zone 1160, or routed to the diesel hydrotreating zone 1150.

In embodiments with a slurry bed reactor for hydrocracking in the vacuum residue hydrocracking zone 1180, the catalyst particles have a very small average dimension that can be uniformly dispersed and maintained in the medium in order for efficient and immediate hydrogenation processes throughout the volume of the reactor. In general, in a slurry bed reactor, the catalyst is suspended in a liquid through which a gas is bubbled. The mechanism in a slurry bed reactor is a thermal cracking process and is based on free radical formation. The free radicals formed are stabilized with hydrogen in the presence of catalysts, thereby preventing the coke formation.

In certain embodiments, the vacuum residue hydrocracking zone 1180 includes a hydrocracking slurry bed reactor operating under the following conditions:

a reactor temperature (° C.) in the range of from about 370-450, 370-440, 370-430, 380-450, 380-440, 380-430, 390-450, 390-440 or 390-430;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500;

a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0; and annualized relative catalyst consumption (RCC) rate in the range of about 1.0-3.0, 1.0-2.2, 1.0-2.0, 1.0-1.8, 1.0-1.4, 1.2-3.0, 1.2-2.2, 1.2-1.4, 1.4-3.0, 1.4-2.2, 1.4-1.8, 1.4-1.6, 1.6-1.8, 1.8-2.0, or 2.0-2.2.

Effective hydrocracking catalyst for a slurry bed reactor in the vacuum residue hydrocracking zone 1180 include those possessing hydrotreating and hydrogenation functionality. Such catalysts generally contain one or more active transition metal component of metals or metal compounds (oxides or sulfides) selected from the Periodic Table of the Elements IUPAC Groups 6, 7, 8, 9 and 10. The active metal component is typically unsupported. The catalyst is generally in the form of a sulfide of the metal that is formed during the reaction or in a pretreatment step. The metals that make up the dispersed catalysts can be selected from Mo, W, Ni, Co and/or Ru. Mo and W are especially preferred since their performance is superior to vanadium or iron, which in turn are preferred over Ni, Co or Ru. The active metal component is typically deposited or otherwise incorporated on a support, such as amorphous alumina, amorphous silica alumina, zeolites, or combinations thereof. The catalysts can be used at a low concentration, for example, a few hundred parts per million (ppm), in a once-through arrangement, but are not especially effective in upgrading of the heavier products under those conditions. To obtain better product quality, catalysts are used at higher concentration, and it is necessary to recycle the catalyst in order to make the process economically feasible. The catalysts can be recovered using methods such as settling, centrifugation or filtration. One or more series of reactors can be provided, with different catalysts in the different reactors of each series.

Under the above conditions and catalyst selections, exemplary products from a slurry bed reactor in the vacuum residue hydrocracking zone 1180 include LPG in the range of 3-6 wt %, diesel in the range of about 23-55 wt %, naphtha in the range of about 10-20 wt %, pitch in the range of about 10-20 wt %, and hydroprocessed gas oil in the range of about 15-30 wt %. All or a portion of diesel from the vacuum residue hydrocracking zone 1180 can be combined with the VGO and routed to the gas oil hydrocracking zone 1160, or routed to the diesel hydrotreating zone 1150.

In embodiments with a fixed bed reactor for hydrocracking in the vacuum residue hydrocracking zone 1180, catalyst particles are stationary and do not move with respect to a fixed reference frame. In conventional fixed-bed reactors, the hydroprocessing catalysts are replaced regularly in order to maintain the desired level of catalyst activity and throughput.

In certain embodiments, the vacuum residue hydrocracking zone 1180 includes a hydrocracking fixed bed reactor operating under the following conditions:

a reactor temperature (° C.) in the range of from about 370-470, 370-450, 380-470, 380-450, 390-470 or 390-450;

a hydrogen partial pressure (barg) in the range of from about 80-250, 80-200, 80-150, 90-250, 90-200, 90-150, 100-250, 100-200 or 100-150;

a hydrogen gas feed rate (standard liters per liter of hydrocarbon feed, SLt/Lt) of up to about 3500, 3000 or 2500, in certain embodiments from about 1000-3500, 1000-3000, 1000-2500, 1500-3500, 1500-3000, 1500-2500, 2000-3500, 2000-3000 or 2000-2500; and a liquid hourly space velocity ($h^{-1}$), on a fresh feed basis relative to the hydrotreating catalysts, in the range of from about 0.1-4.0, 0.1-2.0, 0.1-1.5, 0.1-1.0, 0.2-4.0, 0.2-2.0, 0.2-1.5, 0.2-1.0, 0.5-4.0, 0.5-2.0, 0.5-1.5 or 0.5-2.0.

Effective hydrocracking catalyst for a fixed bed reactor in the vacuum residue hydrocracking zone 1180 include those possessing hydrotreating functionality. Such catalysts generally contain one or more active metal component of metals or metal compounds (oxides or sulfides) selected from the Periodic Table of the Elements IUPAC Groups 6, 7, 8, 9 and 10. In certain embodiments, the active metal component is one or more of Co, Ni, and Mo. The active metal component is typically deposited or otherwise incorporated on a support, such as amorphous alumina, amorphous silica alumina, zeolites, or combinations thereof. One or more series of reactors can be provided, with different catalysts in the different reactors of each series. Effective liquid hourly space velocity values ($h^{-1}$), on a fresh feed basis relative to the hydrotreating catalysts, are in the range of from about 0.1-0.5, 0.1-0.2, 0.2-0.3, 0.3-0.4, 0.4-0.5, 0.1-0.3 or 0.3-0.5.

In embodiments with a moving bed reactor for hydrocracking in the vacuum residue hydrocracking zone 1180, catalyst can be replaced without interrupting the unit's operation. Moving bed reactors combine certain advantages of fixed bed operations and the relatively easy catalyst replacement of ebullated bed technology. During catalyst replacement, catalyst movement is slow compared to the linear velocity of the feed. The frequency of catalyst replacement depends on the rate of catalyst deactivation. Catalyst addition and withdrawal are performed, for instance, via a sluice system at the top and bottom of the reactor. In certain embodiments, the moving bed reactor is operated in a counter current mode. In the counter current mode, spent catalyst already saturated by contaminates is located at the bottom of the reactor and meets the fresh feed entering from the bottom. This allows for fresh catalyst located at the top of the reactor to react with an already demetallized feed.

In certain embodiments, the vacuum residue hydrocracking zone 1180 includes a hydrocracking moving bed reactor operating under the conditions stated above for a fixed bed reactor. Catalyst material in a moving bed reactor is continuously replaced in an annualized relative catalyst consumption (RCC) rate in the range of about 0.4-0.8, 0.4-0.6, 0.6-0.8, 0.4-0.5, 0.5-0.6, 0.6-0.7 and 0.7-0.8. Under the above conditions and catalyst selections, exemplary products from a fixed bed reactor or moving bed reactor in the vacuum residue hydrocracking zone 1180 include LPG in the range of 3-6 wt %, diesel in the range of about 5-30 wt %, naphtha in the range of about 1-20 wt %, pitch in the range of about 30-60 wt %, and hydroprocessed gas oil in the range of about 20-40 wt %. All or a portion of diesel from the vacuum residue hydrocracking zone 1180 can be combined with the VGO and routed to the gas oil hydrocracking zone 1160, or routed to the diesel hydrotreating zone 1150.

In the description herein, both the steam cracking zone 1220 and the product separation systems associated therewith are collectively referred to as the "steam cracker complex" 1215 in certain instances, although a person having ordinary skill in the art will appreciate that the steam cracking zone can contain different furnaces and associated exchangers, with certain products from each combined for further downstream operations.

The steam cracking zone 1220, which operates as high severity or low severity thermal cracking process, generally converts LPG, naphtha and heavier hydrocarbons primarily into a mixed product stream containing mixed C1-C4 paraffins and olefins. In certain embodiments, the steam cracking zone 1220 processes straight-run liquids from the crude unit, ethane and/or propane (from outside battery limits and/or recycled) and various recycle streams from chemical production and recovery areas within the integrated process and system.

For instance, the plural feeds to the steam cracking zone 1220 include: light ends 1136 and naphtha 1114 from the crude complex 1105; a recycle ethane stream 1236 from the olefins recovery zone 1230; a recycle propane stream 1246 from a methylacetylene/propadiene (MAPD) saturation and propylene recovery zone 1244 described below; C4 raffinate 1264 from a 1-butene recovery zone 1266 described below; wild naphtha 1152 from a diesel hydrotreating zone 1150 described above; wild naphtha 1162 from a gas oil hydrocracking zone 1160, or wild naphtha 1172 from a gas oil hydrotreating zone 1170, described above; and a naphtha fraction 1184 from the vacuum residue hydrocracking zone 1180. The products from the steam cracking zone 1220 include: a quenched cracked gas stream containing mixed C1-C4 paraffins and olefins that is routed to the olefins recovery zone 1230; a pyrolysis gasoline stream 1228 that is treated separately; and a pyrolysis fuel oil stream 1226 that is treated separately.

The steam cracking zone 1220 operates under parameters effective to crack the feed into desired products including ethylene, propylene, butadiene, and mixed butenes. Pyrolysis gasoline and pyrolysis oil are also recovered. In certain embodiments, the steam cracking furnace(s) are operated at conditions effective to produce an effluent having a propylene-to-ethylene weight ratio of from about 0.3-0.8, 0.3-0.6, 0.4-0.8 or 0.4-0.6. The steam cracking zone 1220 generally comprises one or more trains of furnaces. For instance, a typical arrangement includes reactors that can operate based on well-known steam pyrolysis methods, that is, charging the thermal cracking feed to a convection section in the presence of steam to raise the temperature of the feedstock, and passing the heated feed to the pyrolysis reactor containing furnace tubes for cracking. In the convection section, the mixture is heated to a predetermined temperature, for example, using one or more waste heat streams or other suitable heating arrangement(s).

The feed mixture is heated to a high temperature in a convection section and material with a boiling point below a predetermined temperature is vaporized. The heated mixture (in certain embodiments along with additional steam) is passed to the pyrolysis section operating at a further elevated temperature for short residence times, such as 1-2 seconds or less, effectuating pyrolysis to produce a mixed product stream. In certain embodiments separate convection and radiant sections are used for different incoming feeds to the steam cracking zone 1220 with conditions in each optimized for the particular feed.

In certain embodiments, steam cracking in the steam cracking zone 1220 is carried out using the following conditions: a temperature (° C.) in the convection section in the range of about 400-600, 400-550, 450-600 or 500-600; a pressure (barg) in the convection section in the range of about 4.3-4.8, 4.3-4.45, 4.3-4.6, 4.45-4.8, 4.45-4.6 or 4.6-4.8; a temperature (° C.) in the pyrolysis section in the range of about 700-950, 700-900, 700-850, 750-950, 750-900 or 750-850; a pressure (barg) in the pyrolysis section in the range of about 1-4, 1-2 or 1-1.4; a steam-to-hydrocarbon ratio in the convection section in the range of about 0.3:1-2:1, 0.3:1-1.5:1, 0.5:1-2:1, 0.5:1-1.5:1, 0.7:1-2:1, 0.7:1-1.5:1, 1:1-2:1 or 1:1-1.5:1; and a residence time (seconds) in the pyrolysis section in the range of about 0.05-1.2, 0.05-1, 0.1-1.2, 0.1-1, 0.2-1.2, 0.2-1, 0.5-1.2 or 0.5-1.

In operation of the steam cracking zone 1220, effluent from the cracking furnaces is quenched, for instance, using transfer line exchangers, and passed to a quench tower. The light products, quenched cracked gas stream are routed to the olefins recovery zone 1230. Heavier products are separated in a hot distillation section. A raw pyrolysis gasoline stream 1228 is recovered in the quench system. Pyrolysis oil 1226 is separated at a primary fractionator tower before the quench tower.

In operation of one embodiment of the steam cracking zone 1220, the feedstocks are mixed with dilution steam to reduce hydrocarbon partial pressure and then are preheated. The preheated feeds are fed to tubular reactors mounted in the radiant sections of the cracking furnaces. The hydrocarbons undergo free-radical pyrolysis reactions to form light olefins ethylene and propylene, and other by-products. In certain embodiments, dedicated cracking furnaces are provided with cracking tube geometries optimized for each of the main feedstock types, including ethane, propane, and butanes/naphtha. Less valuable hydrocarbons, such as ethane, propane, C4 raffinate, and aromatics raffinate, produced within the integrated system and process, are recycled to extinction in the steam cracking zone 1220.

In certain embodiments, cracked gas from the furnaces is cooled in transfer line exchangers (quench coolers), for example, producing 1800 psig steam suitable as dilution steam. Quenched cracked gas enters a primary fractionator within the steam cracking complex 1215 for removal of pyrolysis fuel oil bottoms from lighter components. The primary fractionator enables efficient recovery of pyrolysis fuel oil. Pyrolysis fuel oil is stripped with steam in a fuel oil stripper to control product vapor pressure, and cooled. In addition, secondary quench can be carried out by direct injection of pyrolysis fuel oil as quench oil into liquid furnace effluents. The stripped and cooled pyrolysis fuel oil can be sent to a fuel oil pool or product storage. The primary fractionator overhead is sent to a quench water tower; condensed dilution steam for process water treating, and raw pyrolysis gasoline, are recovered. Quench water tower overhead is sent to the olefins recovery zone 1230, particularly the first compression stage. Raw pyrolysis gasoline is sent to a gasoline stabilizer to remove any light ends and to control vapor pressure in downstream pyrolysis gasoline processing. A closed-loop dilution steam/process water system is enabled, in which dilution steam is generated using heat recovery from the primary fractionator quench pumparound loops. The primary fractionator enables efficient recovery of pyrolysis fuel oil due to energy integration and pyrolysis fuel oil content in the light fraction stream.

The mixed product stream 1224 effluent from the steam cracking zone 1220 is routed to the olefins recovery zone 1230. For instance, light products from the quenching step, C4-, $H_2$ and $H_2S$, are contained in the mixed product stream that is routed to the olefins recovery zone 1230. Products include: hydrogen 1232 that is used for recycle and/or passed to users; fuel gas 1234 that is passed to a fuel gas system; ethane that is recycled to the steam cracking zone 1220; ethylene 1236 that is recovered as product; a mixed C3 stream 1238 that is passed to a methyl acetylene/propadiene saturation and propylene recovery zone 1244; and a mixed C4 stream 1240 that is passed to a butadiene extraction zone 1250.

The olefins recovery zone 1230 operates to produce on-specification light olefin (ethylene and propylene) products from the mixed product stream. For instance, cooled gas intermediate products from the steam cracker is fed to a cracked gas compressor, caustic wash zone, and one or more separation trains for separating products by distillation. In certain embodiments two trains are provided. The distillation train includes a cold distillation section, wherein lighter products such as methane, hydrogen, ethylene, and ethane are separated in a cryogenic distillation/separation operation. The mixed C2 stream from the steam cracker contains acetylenes that are hydrogenated to produce ethylene in an acetylene selective hydrogenation unit. This system can also include ethylene, propane and/or propylene refrigeration facilities to enable cryogenic distillation.

In one embodiment, mixed product stream 1224 from the steam cracking zone 1220 is passed through three to five stages of compression. Acid gases are removed with caustic in a caustic wash tower. After an additional stage of compression and drying, light cracked gases are chilled and routed to a depropanizer. In certain embodiments light cracked gases are chilled with a cascaded two-level refrigeration system (propylene, mixed binary refrigerant) for cryogenic separation. A front-end depropanizer optimizes the chilling train and demethanizer loading. The depropanizer separates C3 and lighter cracked gases as an overhead stream, with C4s and heavier hydrocarbons as the bottoms stream. The depropanizer bottoms are routed to the debutanizer, which recovers a crude C4s stream 1240 and any trace pyrolysis gasoline.

The depropanizer overhead passes through a series of acetylene conversion reactors, and is then fed to the demethanizer chilling train, which separates a hydrogen-rich product via a hydrogen purification system, such as pressure swing adsorption. Front-end acetylene hydrogenation is implemented to optimize temperature control, minimize green oil formation and simplify ethylene product recovery by eliminating a C2 splitter pasteurization section that is otherwise typically included in product recovery. In addition, hydrogen purification via pressure swing adsorption eliminates the need for a methanation reactor that is otherwise typically included in product recovery.

The demethanizer recovers methane in the overhead for fuel gas, and C2 and heavier gases in the demethanizer bottoms are routed to the deethanizer. The deethanizer separates ethane and ethylene overhead which feeds a C2 splitter. The C2 splitter recovers ethylene product 1236, in certain embodiments polymer-grade ethylene product, in the overhead. Ethane 1242 from the C2 splitter bottoms is recycled to the steam cracking zone 1220. Deethanizer bottoms contain C3s from which propylene product 1248, in certain embodiments polymer-grade propylene product, is recovered as the overhead of a C3 splitter, with propane 1246 from the C3 splitter bottoms recycled to the steam cracking zone 1220.

A methyl acetylene/propadiene (MAPD) saturation and propylene recovery zone 1244 is provided for selective hydrogenation to convert methyl acetylene/propadiene, and to recover propylene from a mixed C3 stream 1238 from the olefins recovery zone 1230. The mixed C3 1238 from the olefins recovery zone 1230 contains a sizeable quantity of propadiene and propylene. The methyl acetylene/propadiene saturation and propylene recovery zone 1244 enables production of propylene 1248, which can be polymer-grade propylene in certain embodiments.

The methyl acetylene/propadiene saturation and propylene recovery zone 1244 receives hydrogen and mixed C3 1238 from the olefins recovery zone 1230. Products from the methyl acetylene/propadiene saturation and propylene recovery zone 1244 are propylene 1248 which is recovered, and the recycle C3 stream 1246 that is routed to the steam cracking zone 1220. In certain embodiments, hydrogen used to saturate methyl acetylene and propadiene is derived from hydrogen 1232 obtained from the olefins recovery zone 1230.

A stream 1240 containing a mixture of C4s, known as crude C4s, from the olefins recovery zone 1230, is routed to a butadiene extraction zone 1250 to recover a high purity 1,3-butadiene product 1252 from the mixed crude C4s. In certain embodiments (not shown), a step of hydrogenation of the mixed C4 before the butadiene extraction zone 1250 can be integrated to remove acetylenic compounds, for instance, with a suitable catalytic hydrogenation process using a fixed bed reactor. 1,3-butadiene 1252 is recovered from the hydrogenated mixed C4 stream by extractive distillation using, for instance, n-methyl-pyrrolidone (NMP) or dimethylformamide (DMF) as solvent. The butadiene extraction zone 1250 also produces a raffinate stream 1254 containing butane/butene, which is passed to a methyl tertiary butyl ether zone 1256.

In one embodiment, in operation of the butadiene extraction zone 1250, the stream 1240 is preheated and vaporized into a first extractive distillation column, for instance having two sections. NMP or DMF solvent separates the 1,3-butadiene from the other C4 components contained in stream 1254. Rich solvent is flashed with vapor to a second extractive distillation column that produces a high purity 1,3-butadiene stream as an overhead product. Liquid solvent from the flash and the second distillation column bottoms are routed to a primary solvent recovery column. Bottoms liquid is circulated back to the extractor and overhead liquid is passed to a secondary solvent recovery or solvent polishing column. Vapor overhead from the recovery columns combines with recycle butadiene product into the bottom of the extractor to increase concentration of 1,3-butadiene. The 1,3-butadiene product 1252 can be water washed to remove any trace solvent. In certain embodiments, the product purity (wt %) is 97-99.8, 97.5-99.7 or 98-99.6 of 1,3-butadiene; and 94-99, 94.5-98.5 or 95-98 of the 1,3-butadiene content (wt %) of the feed is recovered. In addition to the solvent such as DMF, additive chemicals are blended with the solvent to enhance butadiene recovery. In addition, the extractive distillation column and primary solvent recovery columns are reboiled using high pressure steam (for instance, 600 psig) and circulating hot oil from another source as heat exchange fluid.

A methyl tertiary butyl ether zone 1256 is integrated to produce methyl tertiary butyl ether 1262 and a second C4 raffinate 1260 from the first C4 raffinate stream 1254. In certain embodiments C4 Raffinate 1 1254 is subjected to selective hydrogenation to selectively hydrogenate any remaining dienes and prior to reacting isobutenes with methanol to produce methyl tertiary butyl ether.

Purity specifications for recovery of a 1-butene product stream 1268 necessitate that the level of isobutylene in the second C4 raffinate 1260 be reduced. In general, the first C4 raffinate stream 1254 containing mixed butanes and butenes, and including isobutylene, is passed to the methyl tertiary butyl ether zone 1256. Methanol 1258 is also added, which reacts with isobutylene and produces methyl tertiary butyl ether 1262. For instance, methyl tertiary butyl ether product and methanol are separated in a series of fractionators, and routed to a second reaction stage. Methanol is removed with water wash and a final fractionation stage. Recovered methanol is recycled to the fixed bed downflow dehydrogenation reactors. In certain embodiments, additional isobutylene can be introduced to the methyl tertiary butyl ether zone 1256, for instance, derived from a metathesis conversion unit.

In operation of one embodiment of the methyl tertiary butyl ether zone 1256, the raffinate stream 1254, contains 35-45%, 37-42.5%, 38-41% or 39-40% isobutylene by weight. This component is removed from the C4 raffinate 1260 to attain requisite purity specifications, for instance, greater than or equal to 98 wt % for the 1-butene product stream 1268 from the butene-1 recovery zone 1266. Methanol 1258, in certain embodiments high purity methanol having a purity level of greater than or equal to 98 wt % from outside battery limits, and the isobutylene contained in the raffinate stream 1254 and in certain embodiments isobutylene from an optional metathesis step, react in a primary reactor. In certain embodiments the primary reactor is a fixed bed downflow dehydrogenation reactor and operates for isobutylene conversion in the range of about 70-95%, 75-95%, 85-95% or 90-95% on a weight basis. Effluent from the primary reactor is routed to a reaction column where reactions are completed. In certain embodiments, exothermic heat of the reaction column and the primary reactor can optionally be used to supplement the column reboiler along with provided steam. The reaction column bottoms stream contains methyl tertiary butyl ether, trace amounts, for instance, less than 2%, of unreacted methanol, and heavy products produced in the primary reactor and reaction column. Reaction column overhead contains unreacted methanol and non-reactive C4 raffinate. This stream is water washed to remove unreacted methanol and is passed to the 1-butene recovery zone 1266 as the C4 raffinate 1260. Recovered methanol is removed from the wash water in a methanol recovery column and recycled to the primary reactor.

The C4 raffinate stream 1260 from the methyl tertiary butyl ether zone 1256 is passed to a separation zone 1266 for butene-1 recovery. In certain embodiments, upstream of the methyl tertiary butyl ether zone 1256, or between the methyl tertiary butyl ether zone 1256 and separation zone 1266 for butene-1 recovery, a selective hydrogenation zone can also be included (not shown). For instance, in certain embodiments, raffinate from the methyl tertiary butyl ether zone 1256 is selectively hydrogenated in a selective hydrogenation unit to produce butene-1. Other co-monomers and paraffins are also co-produced. The selective hydrogenation zone operates in the presence of an effective amount of hydrogen obtained from recycle within the selective hydrogenation zone and make-up hydrogen; in certain embodiments, all or a portion of the make-up hydrogen for the selective hydrogenation zone is derived from the steam cracker hydrogen stream 1232 from the olefins recovery train 1230.

For selective recovery of a 1-butene product stream 1268, and to recover a recycle stream 1264 that is routed to the steam cracking zone 1220, and/or in certain embodiments described herein routed to a metathesis zone, one or more separation steps are used. For example, 1-butene can be recovered using two separation columns, where the first column recovers olefins from the paraffins and the second column separates 1-butene from the mixture including 2-butene, which is blended with the paraffins from the first column and recycled to the steam cracker as a recycle stream 1264.

In certain embodiments, the C4 raffinate stream 1260 from the methyl tertiary butyl ether zone 1256 is passed to a first splitter, from which isobutane, 1-butene, and n-butane are separated from heavier C4 components. Isobutane, 1-butene, and n-butane are recovered as overhead, condensed in an air cooler and sent to a second splitter. Bottoms from the first splitter, which contains primarily cis- and trans-2-butene can be added to the recycle stream 1264, or in certain embodiments described herein passed to a metathesis unit. In certain arrangements, the first splitter overhead enters the mid-point of the second splitter. Isobutane product can optionally be recovered in an overhead stream, 1-butene product 1268 is recovered as a sidecut, and n-butane is recovered as the bottoms stream. Bottoms from both splitters are recovered as all or a portion of recycle stream 1264.

A pyrolysis gasoline stream 1228 can be subjected to treatment to form gasoline blending components. Optionally a pyrolysis gasoline stream 1228 can be subjected to hydrotreating and aromatics extraction for recovery of aromatics, as disclosed in commonly owned US Patent Publication Numbers US20180142168A1, US20180223197A1 and US20180155642A1, and US Patents U.S. Ser. No. 10/472,579B2, U.S. Ser. No. 10/472,580B2, U.S. Ser. No. 10/487,276B2, U.S. Ser. No. 10/487,275B2, U.S. Ser. No. 10/407,630B2 and U.S. Ser. No. 10/472,574B2, which are incorporated by reference herein.

For example, as shown in dashed lines as optional, all, a substantial portion or a significant portion of the pyrolysis gasoline 1228 from the steam cracker complex 1215 is fed to a py-gas hydrotreatment and recovery center 1270/1272. In certain embodiments, select hydrocarbons having 5-12 carbons are recovered from untreated pyrolysis gasoline and the remainder is subsequently hydrotreated for aromatics recovery. In a py-gas hydrotreating unit, diolefins and olefins in the pyrolysis gasoline are saturated. Hydrotreated pyrolysis gasoline from the py-gas hydrotreating unit (in certain embodiments having C5s removed and recycled to the steam cracking complex 1215 instead of or in conjunction with C5s from the aromatics extraction zone 1272) is routed to the aromatics extraction zone 1272. The py-gas hydrotreating zone 1270 and the aromatics extraction zone 1272 are shown for simplicity in a single schematic block in the figures herein.

The aromatics extraction zone 1272 includes, for instance, one or more extractive distillation units, and operates to separate the hydrotreated pyrolysis gasoline into an aromatics stream 1274 containing high-purity benzene, toluene, xylenes and C9 aromatics, which are recovered for chemical markets. C5 raffinate 1282 and non-aromatics 1280 (for instance, C6-C9) are recycled to the steam cracking complex 1215. A heavy aromatics stream 1278 (for instance, C10-C12) can be used as an aromatic solvent, an octane boosting additive or as a cutter stock into a fuel oil pool. In certain embodiments ethylbenzene 1276 can be recovered.

A pyrolysis fuel oil stream 1226 can be blended into the fuel oil pool as a low sulfur component, and/or used as carbon black feedstock. In certain embodiments, all or a portion of the pyrolysis oil stream 1226 can be fractioned into light pyrolysis oil and heavy pyrolysis oil. For instance, light pyrolysis oil can be blended with one or more of the middle distillate streams, so that 0-100% of light pyrolysis oil derived from the pyrolysis oil stream 1226 is processed to produce in the diesel hydrotreating zone 1150, and/or the vacuum gas oil hydroprocessing zone 1160/1170. Heavy pyrolysis oil can be blended into the fuel oil pool as a low sulfur component, and/or used as a carbon black feedstock. In further embodiments, 0-100% of light pyrolysis oil and/or 0-100% of heavy pyrolysis oil derived from the pyrolysis oil stream 1226 can be processed in the optional residue hydrocracking zone 1180. In certain embodiments, all, a substantial portion, a significant portion or a major portion of light pyrolysis oil can be passed to the residue hydrocracking zone 1180; any remainder can be routed to the diesel hydrotreating zone 1150 and/or the vacuum gas oil hydroprocessing zone and/or the fuel oil pool.

Figure 2A:
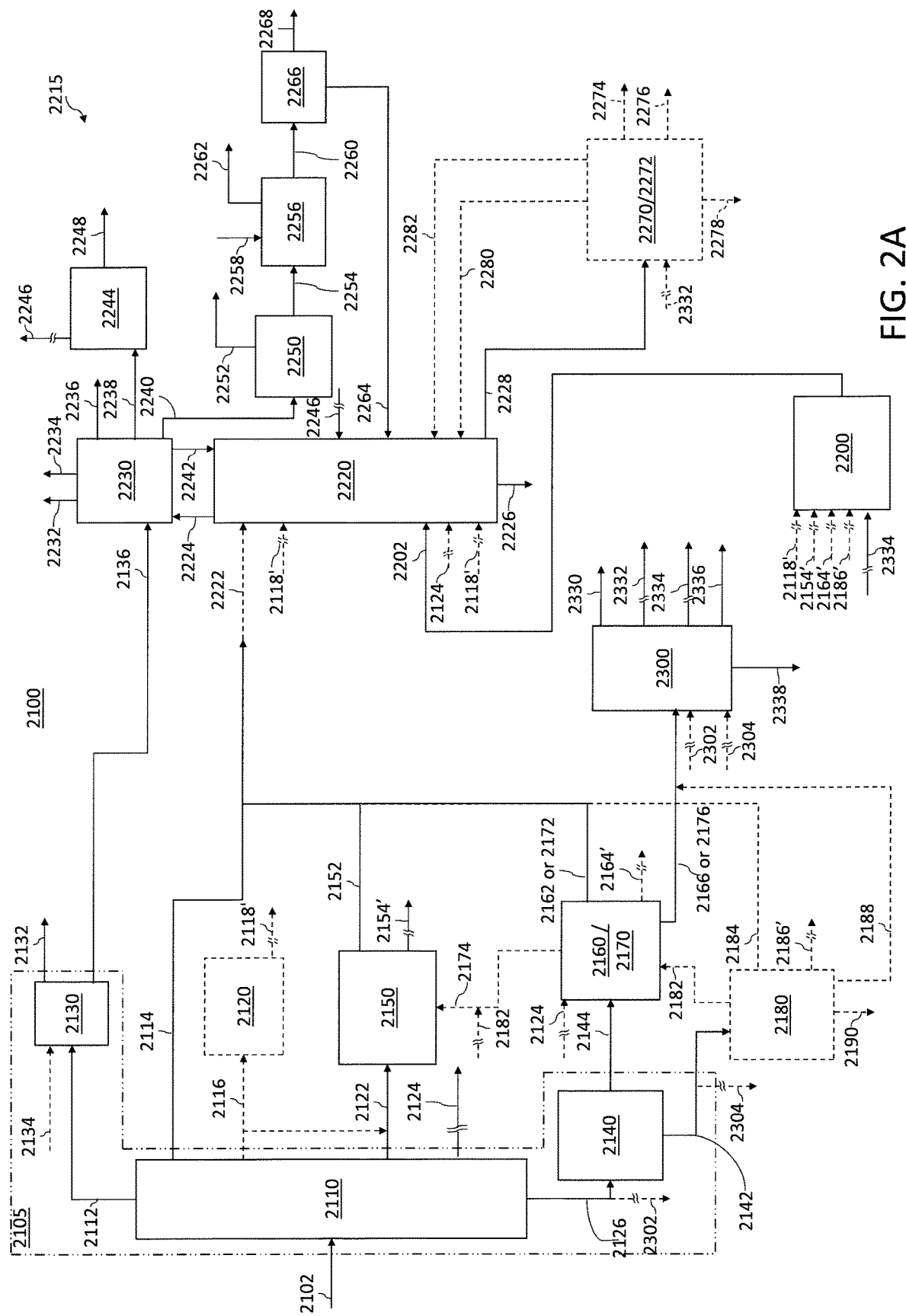
FIG. 2A schematically depicts an embodiment of a process for producing petrochemicals and fuel product integrating coking of certain feeds within a refinery system and a steam cracker complex, and including deep hydrogenation of light coker gas oil.

FIG. 2A schematically depicts an embodiment of a process and system 2100 for conversion of crude oil to petrochemicals and fuel products, integrating deep hydrogenation of middle distillates to increase the steam cracking feedstock, and accordingly increase production of steam cracking products including ethylene, propylene and other valuable petrochemical products. The several unit operations and streams are denoted as a "2000" series of reference numerals that are similar to those described in conjunction with FIG. 1. Unless otherwise noted, units and streams with similar "1000" and "2000" series reference numbers are similar or identical.

As described above in conjunction with the system 1100, the system 2100 generally includes a crude complex 2105, typically including an atmospheric distillation zone ("ADU") 2110, a saturated gas plant 2130, a vacuum distillation zone ("VDU") 2140 and a coking zone 2300. The distillate products from the atmospheric distillation zone 2110 include straight run naphtha 2114, one or more middle distillate streams including light middle distillates 2116, medium range middle distillates 2122, and heavier distillates 2124. Atmospheric residue 2126 can be further separated in the vacuum distillation zone 2140 to obtain vacuum gas oil 2144 and vacuum residue 2142. In certain embodiments, a minor portion of the atmospheric residue fraction 2126, shown as portion 2302, can bypass the vacuum distillation zone 2140 and is routed to the coking zone 2300. In certain embodiments, 0-100% of the atmospheric residue fraction 2126 can be used as portion 2302 to the coking zone 2300. In certain embodiments, a minor portion of the vacuum residue stream 2142, shown as portion 2304, can be routed to the coking zone 2300. In certain embodiments, 0-100% of the vacuum residue fraction 2142 can be used as portion 2304 to the coking zone 2300.

The coking zone 2300 is operable to receive and convert all or a portion of the feed stream, which can be one or more of: all or a portion of the unconverted oil stream 2166 and/or the hydrotreated gas oil stream 2176; the unconverted oil stream 2188 in embodiments in which residue hydrocracking is integrated; atmospheric residue 2302; or vacuum residue 2304. The coking zone 2300 can be operated to produce at least light gases 2330, coker naphtha 2332, light coker gas oil 2334, heavy coker gas oil 2336, and coke 2338. The coking reaction zone 2300 include associated therewith a mixing zone, a separator and a catalyst-stripping zone.

Off-gases from the coking zone 2300 can be integrated with the fuel gas system. In certain embodiments (not shown), certain gases, after treatment in an unsaturated gas plant, can be routed to the separation units within the steam cracking complex 2215, and/or LPGs can be routed to the steam cracking zone 2220. All, a substantial portion, a significant portion or a major portion of the gases containing light olefins (a C2- stream and a C3+ stream) are routed through the unsaturated gas plant. The remainder, if any, can be routed to the steam cracking zone 2220 and/or the olefins recovery train 2230.

In the configuration of FIG. 2A, all or a portion of the coker naphtha 2332 can be processed to produce additional feed for the steam cracking zone 2220. In certain embodiments, all or a portion of the coker naphtha 2332, optionally after hydrogenation (under conditions and using catalysts described herein with respect to the naphtha hydrogenation zone 2204), can be processed as described below in a py-gas hydrotreatment and recovery center 2270/2272 (as shown in dashed lines) to increase the quantity of raffinate as additional feed to the steam cracking zone 2220. In certain embodiments all or a portion of the coker naphtha 2332 can be subjected to hydrogenation (under conditions and using catalysts described herein with respect to the naphtha hydrogenation zone 2204), and hydrogenated effluent used as additional feed to the steam cracking zone 2220. Any portion of the coker naphtha 2332 that is not routed to the py-gas hydrotreatment and recovery center 2270/2272, shown in dashed lines, can be hydrotreated and recovered for fuel production. For instance, in modalities in which the objective is maximum petrochemical production, all, a substantial portion, a significant portion or a major portion of the coker naphtha 2332 is used for additional steam cracking feed; the remainder, if any, is recovered for fuel production and incorporation into a gasoline pool.

In additional embodiments, all or a portion of the coker naphtha 2332 is hydrotreated and recovered for fuel production and incorporation into a gasoline pool. Optionally, a portion of the coker naphtha 2332 that is not recovered for fuel production can be processed in the py-gas hydrotreatment and recovery center 2270/2272, as shown in dashed lines, to increase the quantity of raffinate as additional feed to the steam cracking zone 2220, or subjected to hydrogenation with hydrogenated effluent used as additional steam cracking feed.

Other products from the coking zone 2300 include cycle oil, light coker gas oil 2334 and heavy coker gas oil 2336. Heavy coker gas oil stream 2336 can be routed to a fuel oil pool and/or used as feedstock for production of carbon black. In certain embodiments, all, a substantial portion, a significant portion or a major portion of the light coker gas oil 2334 is used as feed to the deep hydrogenation zone 2200, alone or in combination with other feeds as described herein. In certain embodiments, an additional hydrotreating reaction zone can be included between the coking zone 2300 and the DHG zone 2200, depending on the sulfur and nitrogen content of the light coker gas oil 4334, and whether this stream is processed in the DHG zone 2200 alone or in combination with other middle distillate streams that have lower sulfur and nitrogen content. In these embodiments, the catalyst(s), temperature and space velocity for hydrotreating can be similar to those of the diesel hydrotreating zone 1150 described herein, with a hydrogen partial pressure in the range of from about 50-120, 50-100, 50-90, 60-120, 60-100, 60-90, 70-120, 70-100 or 70-90.

A steam cracking zone 2220 is integrated and receives at least a portion of the light coker gas oil produced within the system that are subjected to deep hydrogenation. The steam cracking zone can include a single unit or multiple units, each processing feedstocks having different boiling point characteristics. In certain embodiments the steam cracking zone 2220 receives plural naphtha streams including the straight run naphtha 2114 and other naphtha fractions produced within the system, shown as the combined stream 2222 in FIGS. 2A (dashed lines) and 2B, and also as described herein with respect to the system 1100. In certain embodiments, one or more of the individual naphtha sources that make up the combined stream 2222 are passed to the steam cracking zone 2220, while others are diverted for other purposes such as gasoline blending components after treatment (if necessary).

For the light middle distillates 2116, such as a kerosene fraction or alight kerosene fraction, a kerosene sweetening zone 2120 can optionally be used to produce a light range middle distillate fraction 2118' as a source of steam cracking feedstock. In certain embodiments the light range middle distillate fraction 2118' is passed to the DHG zone 2200. In additional embodiments, the light range middle distillate fraction 2118' is divided by weight into a heavy portion passing and a light portion, with the heavy portion passing to the DHG zone 2200 or the DHT zone 2150, and the light portion combined with naphtha as stream cracking feed. In additional embodiments, the light middle distillates 2116 can be passed to the DHT zone 2150, or the components of the light middle distillates 2116 can be combined and discharged with the medium range middle distillates 2122 (so that a light middle distillates 2116 stream is not provided).

Medium range middle distillates 2122 are passed to a middle distillate hydrotreating zone 2150 to produce a hydrotreated naphtha fraction 2152 as part of an optional naphtha feed to the steam cracking zone 2220, and all or a portion of a middle distillate fraction 2154' can be used as a feed for hydrogenation. In certain embodiments, all or a portion of the middle distillate fraction 2154' can be recovered as a diesel fuel blending component that can be compliant with Euro V diesel standards as described above in conjunction with FIG. 1, and wherein one or more other sources of middle distillate feed are used for deep hydrogenation, including at least a portion of light coker gas oil 2334. The medium range middle distillates that are passed to the middle distillate hydrotreating zone 2150 can include a diesel range fraction, or a fraction ranging from heavy kerosene through medium atmospheric gas oil.

The vacuum gas oil 2144, and in certain embodiments all or a portion of atmospheric gas oil 2124, is treated in a gas oil hydroprocessing zone 2160/2170 operating as a hydrocracking zone 2160 or as a hydrotreating zone 2170. In embodiments in which gas oils are hydrocracked, the hydrocracking zone 2160 produces a naphtha fraction 2162 as part of the feed to the steam cracking zone 2220, a middle distillate range fraction 2164' which can be used as a feed for hydrogenation, and an unconverted oil fraction 2166. All or a portion of the unconverted oil 2166, for instance a diverted flow of a full range of the unconverted oil, or a light portion of the unconverted oil, can be passed to the DHG zone 2200. In embodiments in which gas oils are hydrotreated, the hydrotreating zone 2170 produces a hydrotreated naphtha fraction 2172 as part of the feed to the steam cracking zone 2220, and hydrotreated gas oil 2176. All or a portion of the hydrotreated gas oil 2176, for a diverted flow of a full range of the hydrotreated gas oil, or a light portion of the hydrotreated gas oil, can be passed to the DHG zone 2200. In certain embodiments, a middle distillate range fraction 2164' is also recovered from the hydrotreating zone 2170 effluents. All or a portion of the middle distillate fraction 2164' can be passed to the DHG zone 2200. In certain embodiments, an additional hydrotreating reaction zone can be included between the gas oil hydroprocessing zone 2160/2170 and the DHG zone 2200, depending on the sulfur and nitrogen content of the middle distillate fraction 2164', and whether this stream is processed in the DHG zone 2200 alone or in combination with other middle distillate streams that have lower sulfur and nitrogen content. In these embodiments, the catalyst used and operating conditions for hydrotreating can be similar to those of the diesel hydrotreating zone 2150. In certain embodiments an in-line hydrotreater can be used after the gas oil hydroprocessing zone 2160/2170 as is known in the art, whereby the temperature and pressure variations between the gas oil hydroprocessing zone and the hydrotreater are minimized as the effluents are passed in-line to one or more hydrotreating catalyst beds. In certain embodiments all or a portion of the middle distillate fraction 2164' can be recovered as a diesel fuel blending component that can be compliant with Euro V diesel standards as described above in conjunction with FIG. 1, and wherein one or more other sources of middle distillate feed are used for deep hydrogenation, including at least a portion of light coker gas oil 2334.

In accordance with the process herein, the severity of the gas oil hydroprocessing operation 2160/2170 can be used to moderate the relative yield of olefin and aromatic chemicals from the overall complex and improve the economic threshold of cracking heavy feeds. This application of a gas oil hydroprocessing zone as a chemical yield control mechanism, is uncommon in the industry, where fuel products are typically the product objectives.

In certain embodiments a vacuum residue conditioning zone 2180 is integrated for treatment of all or a portion of the vacuum residue 2144, for instance, producing a naphtha stream 2184 as part of the feed to the steam cracking zone 2220, a middle distillate range fraction 2186' which can be used as a feed for hydrogenation, an unconverted oil fraction 2188, and pitch 2190.

In certain embodiments a middle distillates stream 2182 (instead of the diesel fraction or in conjunction therewith) is routed to the gas oil hydroprocessing zone 2160/2170 and/or the diesel hydrotreating zone 2150. All or a portion of the middle distillate range fraction 2186' can be passed to the DHG zone 2200. In certain embodiments, an additional hydrotreating reaction zone can be included between the vacuum residue conditioning zone 2180 and the DHG zone 2200, depending on the sulfur and nitrogen content of the middle distillate fraction 2186', and whether this stream is processed in the DHG zone 2200 alone or in combination with other middle distillate streams that have lower sulfur and nitrogen content. In these embodiments, the catalyst used and conditions within this additional hydrotreater can be similar to those of the diesel hydrotreating zone 2150. In certain embodiments an in-line hydrotreater can be used after the vacuum residue conditioning zone 2180 as is known in the art, whereby the temperature and pressure variations between the gas oil hydroprocessing zone and the hydrotreater are minimized as the effluents are passed in-line to one or more hydrotreating catalyst beds. In certain embodiments all or a portion of the middle distillate range fraction 2186' can be recovered as a diesel fuel blending component that can be compliant with Euro V diesel standards as described above in conjunction with FIG. 1, and wherein one or more other sources of middle distillate feed are used for deep hydrogenation, including at least a portion of light coker gas oil 2334.

All or a portion of the desulfurized middle distillate fractions within the system are routed to a deep hydrogenation zone 2200. In certain embodiments, all, a substantial portion, a significant portion or a major portion of the middle distillate range fraction 2154' from the middle distillate hydrotreating zone 2150 is routed to the deep hydrogenation zone 2200. In certain embodiments, all, a substantial portion, a significant portion or a major portion of the middle distillate range fraction 2164' from the hydroprocessing zone 2160/1170 is routed to the deep hydrogenation zone 2200. In certain embodiments, all, a substantial portion, a significant portion or a major portion of the middle distillate range fraction 2186' from the vacuum residue conditioning zone 2180 is routed to the deep hydrogenation zone 2200. These streams can be combined, or the deep hydrogenation zone 2200 can operate to hydrogenate one, two or all of these streams. The products from the deep hydrogenation zone 2200, the hydrogenated middle distillate stream 2202, serves as feed to the steam cracker or steam cracker complex 2215, in certain embodiments combined with one or more naphtha feeds.

Figure 2B:
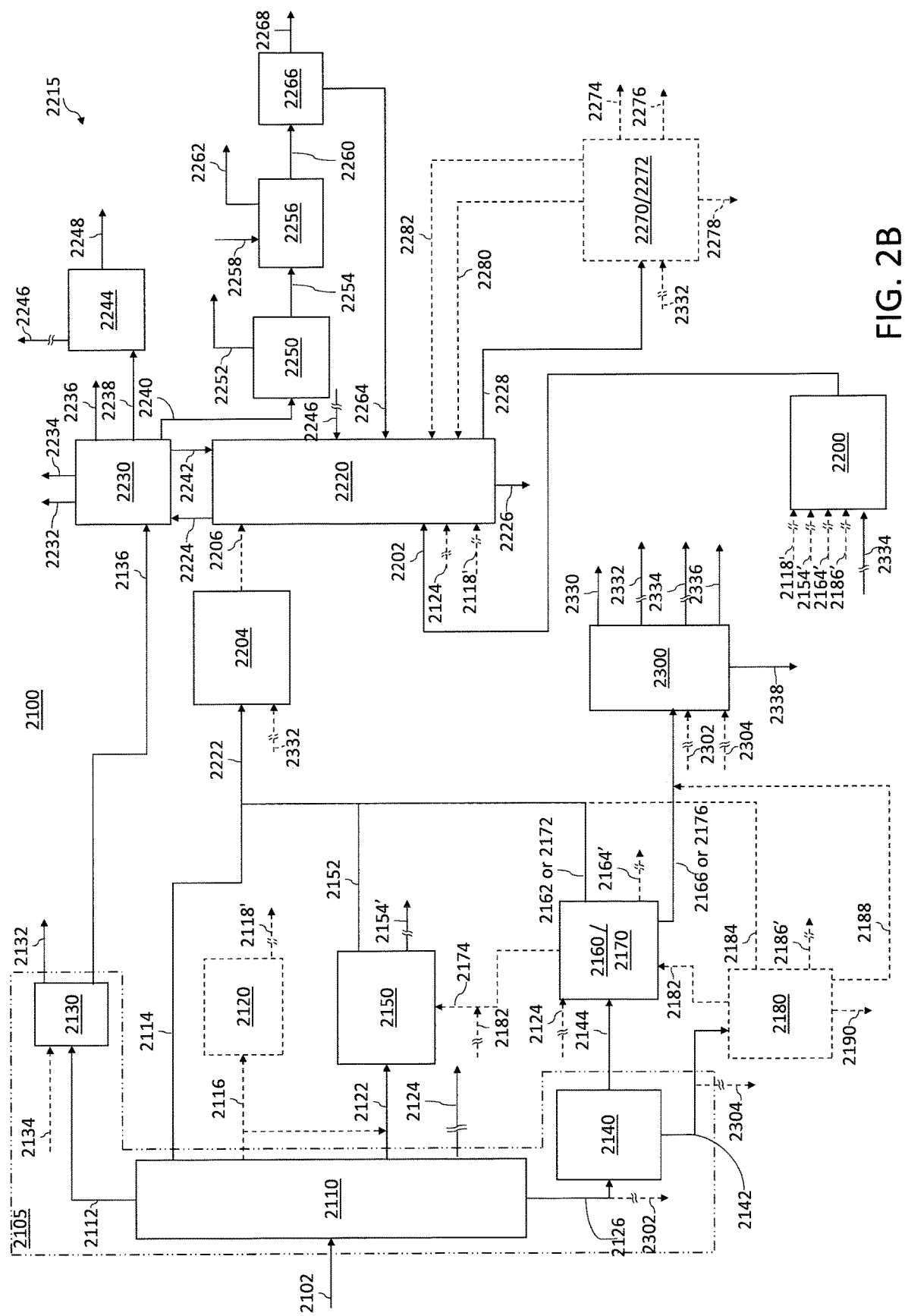
FIG. 2B schematically depicts an embodiment of a process for producing petrochemicals and fuel product integrating coking of certain feeds within a refinery system and a steam cracker complex, and including deep hydrogenation of light coker gas oil and hydrogenation of naphtha.

In the embodiment of FIG. 2B, a system similar to that of FIG. 2A is schematically depicted, further integrating a naphtha hydrogenation zone 2204 for hydrogenation of naphtha to produce a hydrogenated naphtha stream 2206 as additional stream cracker feed.

In FIG. 2B, the combined naphtha stream 2222 is processed in a naphtha hydrogenation zone 2204. In other embodiments (not shown), the wild naphtha 2152 only is processed in the naphtha hydrogenation zone 2204. In further embodiments, all or a portion of the coker naphtha 2332 can be used as feed to the naphtha hydrogenation zone 2204. In certain embodiments all or a portion of the coker naphtha 2332 is subjected to hydrotreating first to remove sulfur and nitrogen compounds prior to hydrogenation. Typically the coker naphtha 2332 stream contains olefin content that makes it less desirable as a steam cracking feedstock, as the higher olefin content leads to coking in the steam cracking operation. However, the coker naphtha 2332 or hydrotreated coker naphtha 2332 can be subjected to hydrogenation. In the embodiment of FIG. 2B, the coker naphtha 2332 or hydrotreated coker naphtha 2332 is passed to the naphtha hydrogenation zone 2204 and thereby increase the steam cracking feed. In other embodiments, the coker naphtha 2332 or hydrotreated coker naphtha 2332 can be subjected to hydrogenation and the hydrogenated product passed to aromatics recovery.

The naphtha hydrogenation zone 2204 can contain one or more fixed-bed, ebullated-bed, slurry-bed, moving bed, continuous stirred tank (CSTR) or tubular reactors, in series and/or parallel arrangement. In certain embodiments, multiple reactors can be provided in parallel in the naphtha hydrogenation zone 2204 to facilitate catalyst replacement and/or regeneration. The reactor(s) are operated under conditions effective for hydrogenation of the reduced organosulfur and reduced organonitrogen middle distillate feed, the particular type of reactor, the feed characteristics, and the catalyst selection. Additional equipment, including exchangers, furnaces, feed pumps, quench pumps, and compressors to feed the reactor(s) and maintain proper operating conditions, are well known and are considered part of the naphtha hydrogenation zone 2204. In addition, equipment including pumps, compressors, high temperature separation vessels, low temperature separation vessels and the like to separate reaction products and provide hydrogen recycle within the naphtha hydrogenation zone 2204, are well known and are considered part of the naphtha hydrogenation zone 2204.

In certain embodiments, the naphtha hydrogenation zone 2204 operating conditions include:

a reaction temperature (° C.) in the range of from about 250-320, 250-315, 250-310, 280-320, 280-315, 280-310, 285-320, 285-315, 285-310, 290-320, 290-315, or 290-310;

a hydrogen partial pressure (barg) in the range of from about 20-85, 20-70, 20-60, 30-85, 40-85 or 40-70;

a hydrogen to oil feed ratio (SLt/Lt) of up to about 3000, 2000 or 1500, in certain embodiments from about 500-3000, 500-2000, 500-1500, 1000-3000, 1000-2000 or 1000-1500; and a liquid hourly space velocity values ($h^{-1}$), on a fresh feed basis relative to the hydrogenation catalysts, in the range of from about 0.1-5.0, 0.1-3.0, 0.1-2.0, 0.5-5.0, 0.5-3.0, 0.5-2.0, 1.0-5.0, 1.0-5.0 or 1.0-2.0.

An effective quantity of hydrogenation catalyst is provided in the naphtha hydrogenation zone 2204 that is effective for hydrogenation of naphtha from the one or more naphtha sources.

Suitable hydrogenation catalysts contain one or more active metal component of metals or metal compounds (oxides or sulfides) selected from the Periodic Table of the Elements IUPAC Groups 7, 8, 9 and 10. In certain embodiments the active metal component is selected from the group consisting of Pt, Pd, Ti, Rh, Re, Ir, Ru, and Ni, or a combination thereof. In certain embodiments the active metal component comprises a noble metal selected from the group consisting of Pt, Pd, Rh, Re, Ir, and Ru, or a combination thereof. The combinations can be composed of different particles containing a single active metal species, or particles containing multiple active species.

Such noble metals can be provided in the range of (wt % based on the mass of the metal relative to the total mass of the catalyst) 0.01-5, 0.01-2, 0.05-5, 0.05-2, 0.1-5, 0.1-2, 0.5-5, or 0.5-2. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units.

The active metal component is typically deposited or otherwise incorporated on a support such as amorphous alumina, and in certain embodiments non-acidic amorphous alumina. In certain embodiments the support comprises non-acidic amorphous alumina containing about 0.1-20, 0.1-15, 0.1-10, 0.1-5, 0.5-20, 0.5-15, 0.5-10, 0.5-5, 1-20, 1-15, 1-10, 2.5-20, 2.5-15, or 2.5-10 wt %, of zeolite, including USY zeolite. Non-acidic catalysts are selected for deep hydrogenation catalyst so as to favor hydrogenation reactions over hydrocracking reactions. Particularly effective hydrogenation catalyst to promote hydrogenation reactions include noble metal active catalyst components on non-acidic supports, such as Pt, Pd or combinations thereof on non-acidic supports. In certain embodiments a suitable hydrogenation catalyst includes a non-acidic support such as alumina having Pt as the active metal component in an amount of about 0.1-0.5 wt % based on the mass of the metal relative to the total mass of the catalyst, with relatively small amounts of zeolite such as USY zeolite, for instance 0.1-5 wt %.

In certain embodiments, the hydrogenation catalyst and/or the catalyst support is prepared in accordance with US Patents U.S. Pat. No. 9,221,036B2 and U.S. Ser. No. 10/081,009B2, which are incorporated herein by reference in their entireties. Such catalyst and/or catalyst support includes a modified USY zeolite support having one or more of Ti, Zr and/or Hf substituting the aluminum atoms constituting the zeolite framework thereof. For instance, the catalyst effective for deep hydrogenation include an active metal component carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis.

Hydrogenation catalysts using noble metal active catalyst components are effective at relatively lower temperatures. As will be appreciated by those having ordinary skill in the art, aromatic hydrogenation reactions are more favorable at lower temperatures, whereas high temperatures are required for cracking. The delta temperature for cracking as compared to hydrogenation can be in the range of about 30-80° C.

Figure 3:
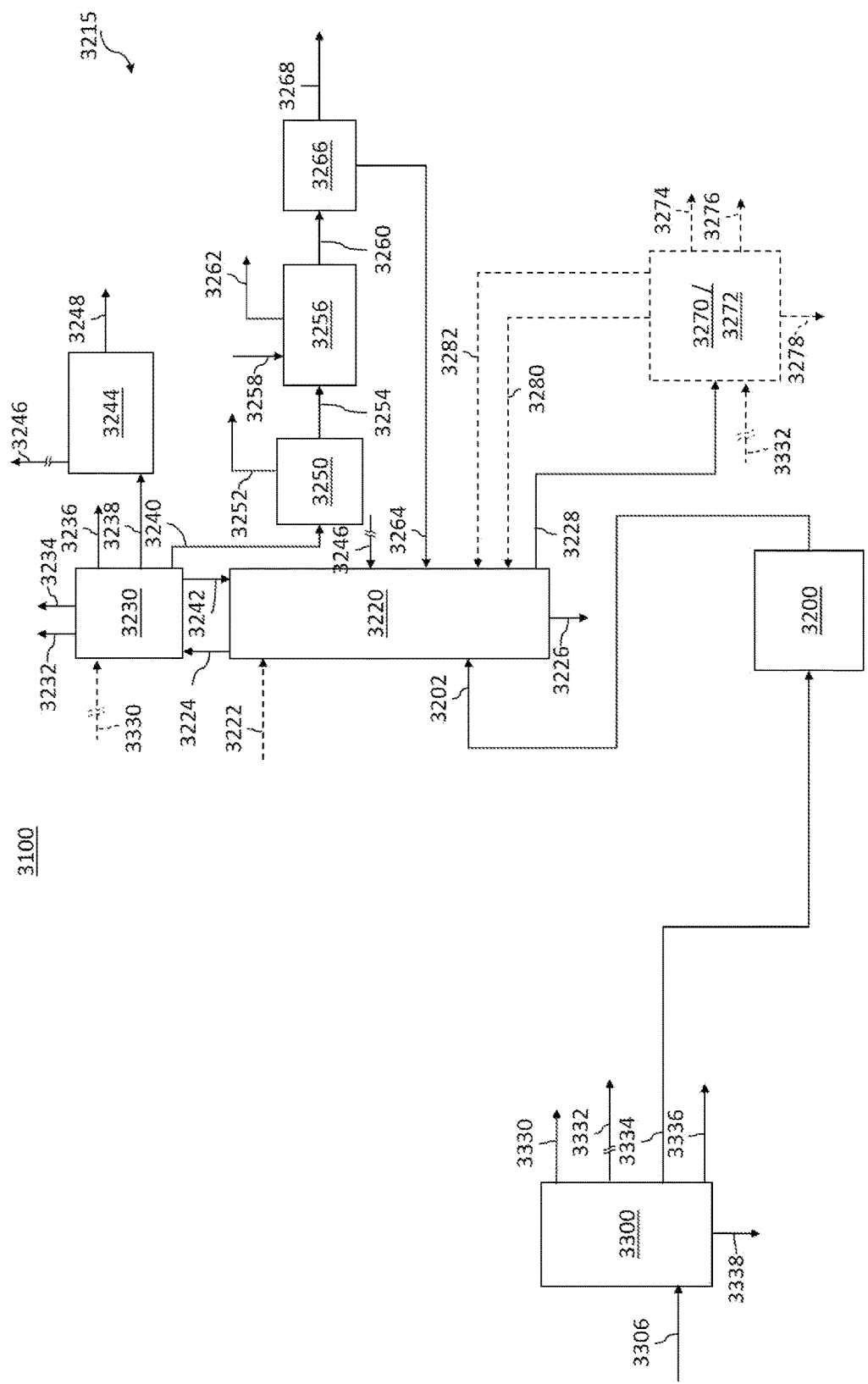
FIG. 3 schematically depicts another embodiment of a process for producing petrochemicals and fuel product integrating coking and a steam cracker complex, and including deep hydrogenation of light coker gas oil.

In certain embodiments, any suitable feedstock, stream 3306 in FIG. 3, can be processed in a coking zone 3300 to produce typical coking zone liquid and gas products, including light gases, coker naphtha and light coker gas oil as feed to a deep hydrogenation zone disclosed herein for conditioning as steam cracking feed. FIG. 3 schematically depicts an embodiment of a process and system 3100 for conversion of crude oil to petrochemicals and fuel products, integrating deep hydrogenation of light coker gas oil. The several unit operations and streams are denoted as a "3000" series of reference numerals that are similar to those described in conjunction with FIG. 1. Unless otherwise noted, units and streams with similar "1000" and "3000" series reference numbers are similar or identical.

The coker feedstock 3306 can be a heavy oil feedstock selected from the group consisting of atmospheric residue, vacuum residue, deasphalted oil, demetallized oil, other heavy oil fractions, and combinations thereof, and can be derived from crude oil, bitumens, oil sand, shale oil, coal oils or biomass oils. In certain embodiments an heavy oil can have an initial boiling point corresponding to that of VGO described herein, an end point based on the characteristics of the heavy oil fraction. In further embodiments an additional feedstock can have an initial boiling point of about 425-565, 450-565, 425-540, 450-540, 425-530, 450-530, 425-510 or 450-510° C., in certain embodiments about 425, 450 or 475° C., and an end point based on the characteristics of the heavy oil fraction.

The coking zone 3300 is operated receive the coker feed 3306 for conversion into at least light gases 3330, coker naphtha 3332, light coker gas oil 3334, heavy coker gas oil 3336 and petroleum coke 3338. Light gases 3330 can be integrated with the fuel gas system. In certain embodiments (not shown), gases 3330 can be routed to the separation units within the steam cracking complex 3215, and/or LPGs can be routed to the steam cracking zone 3220.

In certain embodiments, all or a portion of the coker naphtha 3332 can be processed as described herein in a py-gas hydrotreatment and recovery center 3270/3272, to increase the quantity of raffinate as additional feed to the steam cracking zone 3220. Any portion of the coker naphtha 3332 that is not routed to the py-gas hydrotreatment and recovery center 3270/3272, shown in dashed lines, can be hydrotreated and recovered for fuel production. For instance, in modalities in which the objective is maximum petrochemical production, all, a substantial portion, a significant portion or a major portion of the coker naphtha 3332 is routed to the py-gas hydrotreatment and recovery center 3270/3272; the remainder, if any, is recovered for fuel production and incorporation into a gasoline pool.

In additional embodiments, all or a portion of the fluid catalytic cracking naphtha 4306 is hydrotreated and recovered for fuel production and incorporation into a gasoline pool. Optionally, a portion of the coker naphtha 3332 that is not recovered for fuel production can be processed in the py-gas hydrotreatment and recovery center 3270/3272, as shown in dashed lines, to increase the quantity of raffinate as additional feed to the steam cracking zone 3220.

Other products from the coker zone 3300 include light coker gas oil 3336 and petroleum coke 3338. In certain embodiments, all, a substantial portion, a significant portion or a major portion of the light coker gas oil 3336 is used as feed to the deep hydrogenation zone 3200, alone or in combination with other feeds as described herein.

In certain embodiments, an additional hydrotreating reaction zone can be included between the coking zone 3300 and the DHG zone 4200, depending on the sulfur and nitrogen content of the coker gas oil 3336, and whether this stream is processed in the DHG zone 3200 alone or in combination with other middle distillate streams that have lower sulfur and nitrogen content. In these embodiments, the catalyst(s), temperature and space velocity for hydrotreating can be similar to those of the diesel hydrotreating zone 1150 described herein, with a hydrogen partial pressure in the range of from about 50-120, 50-100, 50-90, 60-120, 60-100, 60-90, 70-120, 70-100 or 70-90.

Figure 6:
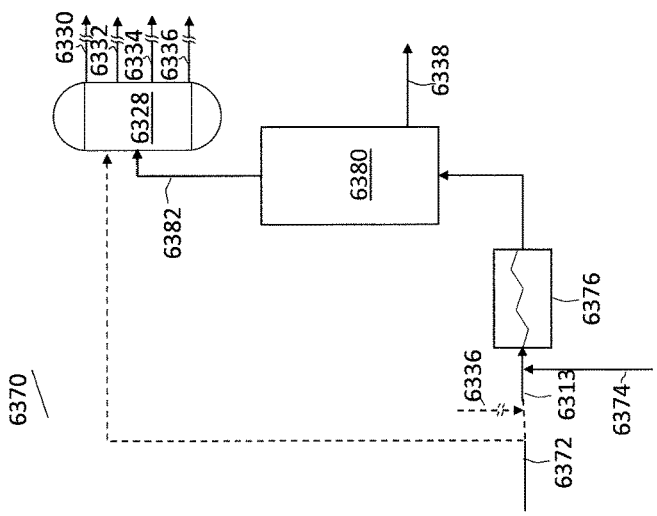
FIGS. 4, 5 and 6 schematically depicts coking operations suitable for use in embodiments herein.
Figure 5:
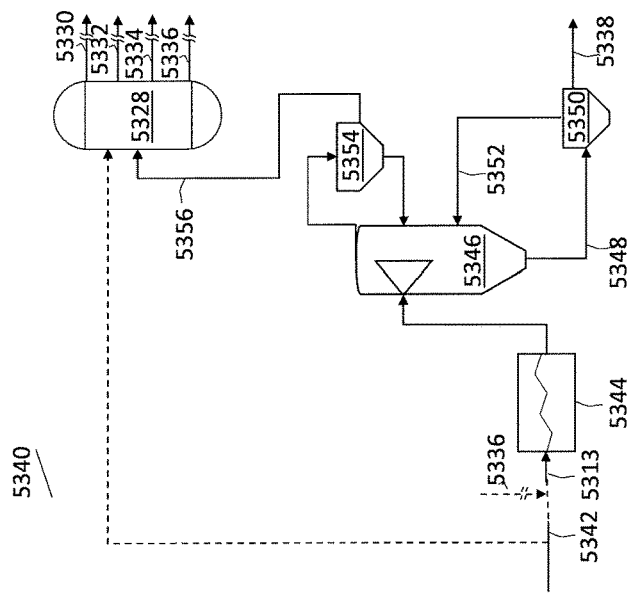
Figure 4:
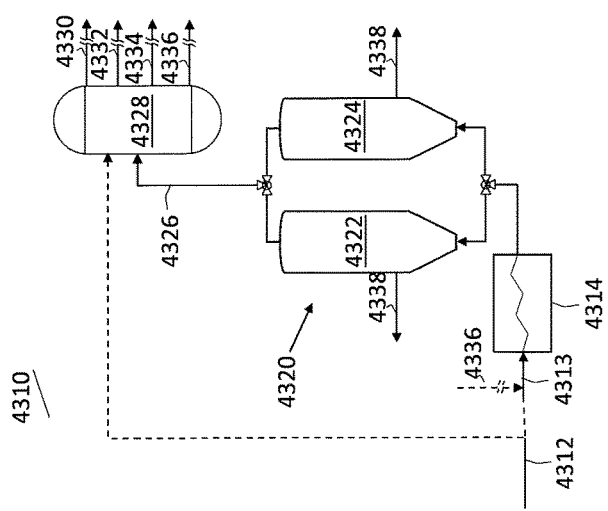

Referring to FIGS. 4, 5 and 6, the coking reaction and separation zones integrated herein, and variations thereto apparent to a person having ordinary skill in the art, are effective for thermal cracking of a coker feed. The coking zone can operate in accordance with known cokers used in oil refineries, including more commonly delayed coker units, and in certain arrangements a fluid coking process. In general, coking operations are carbon rejection processes that are used to convert lower value atmospheric or vacuum distillation residue streams to lighter products, thermally cracked hydrocarbon products. Typically, these thermally cracked hydrocarbon products can be hydrotreated and/or subjected to other known treatment processes to produce transportation fuels such as gasoline and diesel, and increments of light products which can be further desulfurized, treated, and/or concentrated to produce petrochemicals Coking of residuum from heavy high sulfur, or sour, crude oils is typically carried out to convert part of the material to more valuable liquid and gas products. Typical coking processes include delayed coking and fluid coking. The treatment of coke varies depending on the type of coking process and the quality of the coke. In certain embodiments, for instance with delayed coking units, resulting coke is removed from drums, and is generally treated as a low value by-product or recovered for various uses depending upon its quality. In a fluid coking unit, coke is removed as particles and a portion is recycled to provide hot surfaces for thermal cracking.

A delayed coking unit and its general process description is shown and schematically illustrated below. The coker feedstream is mixed with steam and the mixture rapidly heated in a coking furnace to a coking temperature, and then fed to a coking drum. The hot mixed coker feedstream is maintained in the coke drum at coking conditions of temperature and pressure where the feed decomposes or cracks to form coke and volatile components. The volatile components are recovered as vapor and transferred to a coking product fractionator. One or more heavy fractions of the coke drum vapors can be condensed, for example by quenching or heat exchange. In certain embodiments the coke drum vapors are contacted with heavy gas oil in the coking unit product fractionator, and heavy fractions form all or part of a recycle oil stream having condensed coking unit product vapors and heavy gas oil. In certain embodiments, heavy gas oil from the coking feed fractionator is added to a flash zone of the fractionator to condense the heaviest components from the coking unit product vapors.

Delayed coking units are typically configured with two or more parallel drums and operated in an alternating swing mode if there are two drums, or in a sequentially cyclic operating mode if there are three or more drums. Parallel coking drum trains, with two or more drums per train, are also possible. When the coke drum is full of coke, the feed is switched to another drum, and the full drum is cooled. Liquid and gas streams from the coke drum are passed to a coking product fractionator for recovery. Any hydrocarbon vapors remaining in the coke drum are removed, for instance by steam injection. The coke remaining in the drum is typically cooled with water and then removed from the coke drum by conventional methods, such as by hydraulic and/or mechanical techniques to remove green coke from the drum walls for recovery.

Referring to FIG. 4, an embodiment of a coking reaction and separation zone 4310, including a coking zone operating as a delayed coker and an associated fractioning zone. In certain embodiments, the products are light gases 4330, coker naphtha 4332, light coker gas oil 4334, heavy coker gas oil 4336 and petroleum coke 4338.

The coking reaction and separation zone 4310 includes a coking furnace 4314, a coking reaction zone 4320 (shown as parallel coking drum 4322 and 4324) and a coking product fractionator 4328. An optional coker feed 4312 and/or a heavy coker gas oil recycle stream 4336 are in fluid communication with an inlet of the coking furnace 4314. A heated feedstream from an outlet of the coking furnace 4314 is in fluid communication with an inlet of the coking reaction zone 4320, and a coker liquid and gas stream 4326 is discharged from an outlet of the coking reaction zone 4320. The outlet discharging the coker liquid and gas stream 4326 is in fluid communication with an inlet of the coking product fractionator 4328. The fractionating zone 4328 includes as inlets one or more feed inlets in fluid communication the coker liquid and gas stream 4326, and one or more outlets discharging naphtha, light olefins products and gas oil range coker products. The coking zone 4310 also includes associated apparatus for removing coke 4338.

The coker feed is charged to the coking furnace 4314 where the contents are rapidly heated to a coking temperature and then fed to the coking drum 4322 or 4324. The coking unit 4310 can be configured with two or more parallel drums 4322 and 4324 and can be operated in a swing mode, such that when one of the drums is filled with coke, the feed is transferred to the empty parallel drum so that accumulated coke 4338 can be recovered from the filled drum.

The coker liquid and gas stream 4326 from the coker drum 4322 or 4324 is passed to the coking product fractionator 4328, which produces light gases 4330, coker naphtha 4332, light coker gas oil 4334, and heavy coker gas oil 4336. In certain embodiments the coker feed stream 4312 is also charged to the coking product fractionator 4328. The gas oil range coker products can be further separated into light coker gas oil and heavy coker gas oil (not shown). The heavy coker gas oil 4336 can be recycled as all or a portion of the coker furnace stream 4314. Any hydrocarbon vapors remaining in the coke drum are removed by steam injection. The coke is cooled with water and then removed from the coke drum using hydraulic and/or mechanical means.

In operation of the delayed coker, the coker feed stream 4312, and heavy coker gas recycle oil steam 4336, are introduced as combined stream 4313 into the coking furnace 4314 for heating to a predetermined temperature or temperature range that is similar to the coking temperature in delayed coking configurations. In typical operations the temperature of the heated coker feedstream is closely monitored and controlled in the furnace utilizing appropriately positioned thermocouples, or other suitable temperature-indicating sensors to avoid or minimize the undesirable formation of coke in the tubes of the furnace. The sensors and control of the heat source, such as open flame heaters, can be automated as is known to those of skill of the art. For example, in known delayed cokers, a fired furnace or heater with horizontal tubes is used to reach thermal cracking temperatures, for instance, in the range of about 425-650, 425-530, 425-510, 425-505, 425-500, 450-650, 450-530, 450-510, 450-505, 450-500, 480-650, 480-530, 480-510, 480-505 or 480-500° C. With a short residence time in the furnace tubes of the coking furnace 4314, and with the addition of steam, coking of the feed material on the furnace tubes is minimized or obviated, and coking is thereby "delayed" until it is discharged into relatively larger coking drums in the coking reaction zone 4320 downstream of the heater. In addition, the necessary heat for coking is provided in the coking furnace 4314.

The flow of the heated coker feedstream from the coking furnace 4314 is directed into one of the coking drums 4322 or 4324 via a feed line by adjustment of an inlet control valve, for instance, a three-way valve. The coking unit process can be conducted as a semi-continuous process by providing at least two vertical coking drums that are operated in swing mode. This allows the flow through the tube furnace to be continuous. The feedstream is switched from one to another of the at least two drums. In a coking unit with two drums, one drum is on-line filling with coke while the other drum is being steam-stripped, cooled, decoked, pressure checked and warmed up. The overhead vapors from the coke drums flow from the drum used for thermal cracking to the fractionating zone in a continuous manner.

The coke drum is maintained at coking conditions of temperature and pressure where the feed decomposes or cracks to form coke and volatile components. The hydrocracker bottom stream, which is rich in hydrogen due to its highly paraffinic and naphthenic nature, serves as a hydrogen donor during these cracking reactions, and advantageously stabilizes radicals during thermal cracking and as a result minimizes coke formation.

The volatile components are recovered as vapor and transferred to the coking unit product fractionator. In certain embodiments, heavy gas oil from the fractionator is added to the flash zone of the fractionator to condense the heaviest components from the coking unit product vapors. The heaviest fraction of the coke drum vapors can be condensed by other techniques, such as heat exchange. In certain embodiments, as in commercial operations, incoming vapors can be contacted with heavy gas oil in the coking unit product fractionator. Conventional heavy recycle oil includes condensed coking unit product vapors and unflashed heavy gas oil.

When a drum 4322 or 4324 contains the predetermined maximum amount of coke, the inlet control valve is adjusted to direct the heated coker feedstream into the other drum 4324 or 4322. Substantially at the same time, a coking drum outlet valve is adjusted so that the liquid and gas products are discharged through the appropriate line as the coker liquid and gas stream 4326 that is passed to the fractionating zone 4328. Any hydrocarbon vapors remaining in the coke drum are typically removed by steam injection. Typically, the coking zone 4310 includes associated apparatus, for instance, hydraulic and/or mechanical cutters, whereby coke is cooled with water and then removed from the coke drum using hydraulic and/or mechanical cutters while that coking drum is temporarily decommissioned. Coke that is subsequently removed from a drum when it is out of service is schematically represented as lines 4338.

The operating temperature (° C.) in the coking drums 4320 can range from about 425-650, 425-510, 425-505, 425-500, 450-650, 450-510, 450-505, 450-500, 485-650, 485-510, 485-505, 485-500, 470-650, 470-510, 470-505 or 470-500. The operating pressure (bars) in the coking drum can be in the range of about 1-20, 1-10, or 1-3, and in certain embodiments is mildly super-atmospheric. In certain embodiments of the process, steam is introduced or injected with the heated residue into the coking furnace, for instance with a steam introduction rate of about 0.1-3, 0.5-3 or 1-3 wt % relative to the heated residue, to increase the velocity in the tube furnace, and to reduce the partial pressure of the feedstock oil in the drum. The steam also serves to increase the amount of gas oil removed from the coke drums. Steam also assists in decoking of the tubes in the event of a brief interruption of the feed flow. The coking in each drum can occur in cycles, for instance, in the range of about 10-30, 10-24, 10-18, 12-30, 12-24, 12-18, 16-30, 16-24 or 16-18 hours.

In certain embodiments, a fluid coking process is used, wherein circulated coke particles contact the feed and in which coking occurs on the surface of the coke particles, for instance similar to a Flexicoking™ process commercially available from ExxonMobil. Referring to FIG. 5, an embodiment of a coking reaction and separation zone 5340, including a coking zone operating as a fluid coker and an associated fractioning zone, is shown. In certain embodiments, the products are the light gases 5330, coker naphtha 5332, light coker gas oil 5334, and heavy coker gas oil 5336 and coke 5338.

The coking reaction and separation zone 5340 includes a coking furnace 5344, a coking reaction zone 5346 and a coking product fractionator 5328. In addition, suitable systems are provided to facilitate circulation of coke particles including a coke combusting zone 5350 and a fines separation zone 5354. An option coker feed 5342 and/or heavy coker gas oil 5336 are in fluid communication, as combined stream 5313 with an inlet of the coking furnace 5344. A heated feedstream from an outlet of the coking furnace 5344 is in fluid communication with an inlet of the coking reaction zone 5346, and a coker liquid and gas stream 5356 is discharged from an outlet of the coking reaction zone 5346. The outlet discharging the coker liquid and gas stream 5356 is in fluid communication with an inlet of the coking product fractionator 5328. Light gases 5330, coker naphtha 5332, light coker gas oil 5334, and heavy coker gas oil 5336 are discharged from outlets of the coking product fractionator 5328. In some embodiments, the heavy coker gas oil 5336 can be recycled to before the furnace as all or a portion of combined stream 5313.

The coker feed is charged to a coking furnace 5344 where the contents are rapidly heated to a coking temperature and then fed to a coking drum 5346. The coking reaction zone 5346 includes a reactor having one or more inlets that receive a heated feedstream by spraying or other suitable means of injection. A portion of the coke effluent 5348, in particle form, is discharged via one or more outlets, and is in fluid or particulate communication with the coke combusting zone 5350. Heated coke 5352 is discharged from one or more outlets of the coke combusting zone 5350, and is in fluid or particulate communication with one or more inlets of the coking drum 5346.

The coker liquid and gas products are recovered as the coker liquid and gas stream 5356 from one or more outlets of the coking drum 5346, generally through a fines separation zone 5354 for recovery of fine coke particles. The coker liquid and gas stream 5356 is passed to the coking product fractionator 5328, which produces the light gases 5330, coker naphtha 5332, and coker gas oil 5354.

In operation of the fluid coking unit, the coker feedstream(s) and steam are introduced into the coking furnace 5344 for heating to a predetermined temperature or temperature range, for instance, typically at about the coking temperature. For example, a fired furnace or heater with horizontal tubes is used to reach temperature levels that are at or below thermal cracking temperatures, for instance, in the range (° C.) of about 425-650, 425-570, 425-525, 450-650, 450-570, 450-525, 485-650, 485-570 or 485-525. With a short residence time in the furnace tubes of the coking furnace 5344, and with the addition of steam, coking of the feed material on the furnace tubes is minimized or obviated. In the fluid coking unit, coking occurs on coke particles in the coker reactor 5346. Further, additional heat for coking is provided by recirculating combusted heated coke particles 5352 in the coking drum 5346.

All or a portion of the coke product 5348 is burned to provide additional heat for coking reactions to the feed into gases, distillate liquids, and coke. Coking occurs on the surface of circulating coke particles of coke. Coke is heated by burning the surface layers of accumulated coke in the coke combustion zone 5350, by partial combustion of coke produced. The products of coking are sent to the fractionating zone after recovery of fine coke particles in the separation zone 5354. Steam can also be added at the bottom of the reactor (not shown), for instance, in a scrubber to add fluidization and to strip heavy liquids sticking to the surface of coke particles before they are sent to the burner. Coke is deposited in layers on the fluidized coke particles in the reactor. Air is injected into the burner for combustion to burn a portion of the coke produced in the reactor. A portion of the combusted particles are returned to the reactor, heated coke 5352, and the remainder is drawn out as coke 5338.

The operating temperature (° C.) in the coking drum 5346 can range from about 450-760, 450-650, 450-570, 470-760, 470-650, 470-570, 510-760, 510-650 or 510-570. The operating pressure (bars) can be in the range of about 1-20, 1-10 or 1-3, and in certain embodiments is mildly super-atmospheric. In certain embodiments of the process, steam is introduced or injected with the heated residue into the coking furnace, for instance in an amount of about 0.1-3, 0.5-3 or 1-3 wt %.

In certain embodiments, a coking and separation zone is provided with units similar to those shown in FIG. 4 or 5, with additional material to assist in the process. Referring to FIG. 6, a coking and separation zone 6370 is shown operating as a delayed coker or a fluid coker. The coking and separation zone 6370 generally includes a coking drum or vessel 6380 that discharges a coker liquid and gas stream 6382 and coke 6338, for instance removed as in the above descriptions from a delayed coker or as fluidized particles; a coking fractionator 6328 that discharges light gases 6330, coker naphtha 6332, and light coker gas oil 6334, and heavy coker gas oil 6336; and a coking furnace 6376 that receives the an optional initial feedstream 6372 and/or heavy coker gas oil stream 6336, as combined stream 6313. A source of additional material 6374 is provided in fluid or particulate communication with the coking drum 6380 inlet, for instance, via the initial feedstream. While schematically shown upstream of the coking furnace 6376, the additional material 6374 can be added downstream of the coking furnace. In embodiments in which there is a coker recycle stream from the coking fractionator 6328 to the coking drum or vessel 6380, the source of additional material can be integrated in the fractionator so that the coker recycle stream contains catalyst material. The additional material 6374 can be added to the coker feed, or admixed with use of a separate mixing zone, such as an in-line mixing apparatus or a separate mixing apparatus (not shown). In certain embodiments (not shown), additional material 6374 can be metered or otherwise charged directly to the coking drum or vessel 6380.

In embodiments in which additional material is catalyst material, suitable catalysts include those having functionality to stabilize the free radicals formed by thermal cracking and to thereby enhance thermal cracking reactions. The catalyst material can be in homogeneous oil-soluble form, heterogeneous supported catalysts, or a combination thereof.

In certain embodiments, the additional material 6374 is a heterogeneous catalyst material that can be added to the fractionator bottoms prior coking. Suitable heterogeneous catalyst materials include active metals deposited or otherwise incorporated on a support material. The heterogeneous catalyst materials used in embodiments herein are generally granular in nature, and the support material can be selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), used catalyst materials (including zeolitic catalytic materials), regenerated catalyst materials (including zeolitic catalytic materials) and combinations thereof. The active metals of the heterogeneous catalyst material include one or more active metal components of metals or metal compounds (oxides or sulfides) selected from the Periodic Table of the Elements IUPAC Groups 4, 5, 6, 7, 8, 9 and 10. In certain embodiments, the active metal component can be one or more metals or metal compounds (oxides or sulfides) including Mo, V, W, Cr or Fe. In certain embodiments the active metal component can be selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, Mo and Mo compounds are used as the active metal component of a heterogenous catalyst material. The heterogeneous catalyst material is provided in particulate form of suitable dimension, such as granules, extrudates, tablets, or pellets, and may be formed into various shapes such as spheres, cylinders, trilobes, quadrilobes or natural shapes, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 m$^2$/g.

In embodiments in which additional material 6374 is heterogeneous catalyst material, it can be added upstream of the coking furnace, or in an optional embodiment, downstream of the furnace. A mixing zone can be used to mix the catalyst and coker feed. In addition, as catalyst material can be metered or otherwise charged directly to the coking drum or vessel 6380, or metered or otherwise charged directly to the fractionating zone 6328, as noted herein. In embodiments in which heterogeneous catalyst is used, the amount (ppmw) can be about 1-20,000, 10-20,000, 100-20,000, 1-10,000, 10-10,000, 100-10,000, 1-5,000, 10-5,000, 100-5,000, 1-1,000, 10-1,000 or 100-1,000 relative to the weight of the total coker feedstream (stream 6372), and can be determined as is known in the art, for instance based upon factors including the characteristics of the crude oil and its residue, the type of catalyst used and the coking unit operating conditions.

In certain embodiments, a homogenous catalyst is used. For instance, effective homogeneous catalysts include those that are oil-soluble and contain one or more active metal components of metals or metal compounds (oxides, sulfides, or salts of organo-metal complexes) selected from the Periodic Table of the Elements IUPAC Groups 4, 5, 6, 7, 8, 9 and 10. In certain embodiments, homogeneous catalysts are or contain as an active metal component a transition metal-based compound derived from an organic acid salt or an organo-metal compound containing Mo, V, W, Cr or Fe. In certain embodiments homogeneous catalysts can be, or contain an active metal compound, that is selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate and iron naphthenate. In certain embodiments, Mo and Mo compounds are used as homogenous catalyst material. The total concentration (ppmw, based on the total feedstock weight) of the catalyst material can be in the range of 100-20,000, 300-20,000, 500-20,000, 1,000-20,000, 100-5,000, 300-5,000, 500-5,000, 1,000-5,000, 100-1,500, 300-1,500, 500-1,500, 1,000-1,500, 100-1,200, 300-1,200 or 500-1,200.

The homogeneous catalyst can be added upstream of the coking furnace, or in an optional embodiment, downstream of the furnace. Since the catalyst is homogeneous and oil-soluble, it can be added directly to the coking zone or in certain embodiments to the fractionator. If the homogeneous catalyst is prepared from metal oxides or conditioned before use, a separate step is carried for catalyst preparation as is known in the art. The amount of catalyst material (ppmw) can range from 1-10,000, 10-10,000, 100-10,000, 1-5,000, 10-5,000, 100-5,000, 1-1,000, 10-1,000, 100-1,000, 1-100 or 10-100 relative to the weight of the total coker feedstream (stream 6372), and can be determined as is known in the art, for instance based upon factors including the characteristics of the crude oil and its residue, the type of catalyst used and the coking unit operating conditions.

In certain embodiments, the additional material used, alone or in combination with one or more types of catalyst materials, comprises adsorbent material. In this regard, the disclosure of commonly owned U.S. Pat. Nos. 9,023,192 and 9,234,146 are relevant and are incorporated by reference herein in their entireties. For example, adsorbent material is admixed with the coker feedstream(s) in a mixing zone, such as an in-line mixing apparatus or a mixer, to form a slurry of the coker feedstream(s) and adsorbent material. In certain optional embodiments, a source of catalyst material is provided along with the adsorbent material in fluid or solid communication with the coking drum or vessel 6380 inlet. The optional catalyst material can be admixed in the same manner as the adsorbent material, or in a different manner. In embodiments in which optional catalyst material is used, the types and quantities of catalyst described herein for use in coking operations are applicable.

The adsorbent material and/or heterogeneous catalyst material can be admixed with the coker feedstream(s) with or without a dedicated mixing zone. Other embodiments that are not shown are also possible. The adsorbent material and/or heterogeneous catalyst material can be metered or otherwise charged separately to the coking drum or vessel 6380, whereby a source of material is provided in particulate communication or fluid communication (in which the material is formed in a slurry) with the coking drum or vessel 6380 inlet. In further embodiments, the fractionating zone is configured for handling of adsorbent material and/or heterogeneous catalyst material, whereby a source of material is provided in particulate communication or fluid communication (in which the adsorbent material is formed in a slurry) with the fractionating zone 6328. The adsorbent material and/or heterogeneous catalyst material is metered or otherwise charged directly to the fractionating zone 6328 so that a coker recycle stream contains the adsorbent material and/or heterogeneous catalyst material, for instance similar to the process that is disclosed in commonly owned US Patent U.S. Pat. No. 9,023,192B2, which is incorporated by reference herein in its entirety. Coke 6338, which contains adsorbent material that has adsorbed undesirable contaminants and/or heterogeneous catalyst material, is recovered from the coking drum or vessel 6380.

The use of adsorbent material increases the quality of the thermally cracked distillates by removing some of the undesirable contaminants, for instance by selectively adsorbing sulfur- and/or nitrogen-containing compounds. Handling of adsorbent material that has adsorbed undesirable contaminants, and/or heterogeneous catalyst material, largely depends on the type of coker unit deployed. For instance, in delayed coker units, the adsorbent material and/or heterogeneous catalyst material is deposited with the coke on the inside surface of the coking drum(s). In a fluid coking process, the adsorbent material and/or heterogeneous catalyst material can pass with the coke particles that are discharged.

Effective adsorbent materials are selected from the group consisting of silica, alumina, silica-alumina, titania-silica, molecular sieves, silica gel, activated carbon, activated alumina, silica-alumina gel, zinc oxide, clays (for instance, attapulgus clay), fresh catalyst materials (including zeolitic catalytic materials), spent catalyst materials (including zeolitic catalytic materials), regenerated catalyst materials (including zeolitic catalytic materials), and combinations thereof. In certain embodiments adsorbent material comprises activated carbon, clays, or mixtures thereof, The material is provided in particulate form of suitable dimension, such as granules, extrudates, tablets, or pellets, and may be formed into various shapes such as spheres, cylinders, trilobes, quadrilobes or natural shapes, possess average particle diameters (mm) of about 0.01-4.0, 0.1-4.0, or 0.2-4.0, pore sizes (nm) of about 1-5,000 or 5-5,000, possess pore volumes (cc/g) of about 0.08-1.2, 0.3-1.2 or 0.5-1.2, in certain embodiments at least 1.0, and possess a surface area of at least about 100 $m^2/g$. The quantity (weight basis, hydrocarbon to adsorbent) of the solid adsorbent material used in the embodiments herein is about 1000:1-3:1, 200:1-3-1, 100:1-3:1, 50:1-3:1, 20:1-3:1, 1000:1-3:1, 200:1-8:1, 100:1-8:1, 50:1-8:1, 20:1-8:1, 1000:1-3:1, 200:1-10:1, 100:1-10:1, 50:1-10:1 or 20:1-10:1.

The fractionating zone, such as 4328, 5328 or 6328 described herein, includes design features to enable separation of cracker products from the coking drums/vessels, including the coker distillate stream, the coker gas oil stream, and in certain embodiments a coker recycle stream. Components of the fractionating zone that are not shown but which are well-known can include feed/product and pump-around heat exchangers, charge heater(s), product strippers, cooling systems, hot and cold overhead drum systems including re-contactors and off-gas compressors, and units for water washing of overhead condensing systems. Steam is typically injected to prevent cracking of heated feed. In certain embodiments, one or more flash vessels can be used as the fractionating zone. For instance, a first flash vessel can separate gases, and in certain embodiments all or a portion of a coker distillate stream, and a second flash vessel to separate a coker gas oil stream and the hydroprocessing feed and the coker recycle stream. In certain embodiments, in which a source of additional material is used and is integrated in the fractionator so that the coker recycle stream contains the additional material, the fractionator includes appropriate design features.

The feeds to the fractionating zone, the coker liquid and gas stream 4326, 5356 or 6382, can be introduced at different locations in the columns as is known. The effluents shown in the figures include the coker naphtha streams 4332, 5332 or 6332, light gases stream 4330, 5330 or 6330, light gas oil range coker products 4334, 5334, or 6334, and heavy gas oil range coker products 4336, 5336 or 6336.

The deep hydrogenation zones in the embodiments disclosed herein, 2200 and 3200, operate under conditions effective for deep hydrogenation of light coker gas oil (and in certain embodiments middle distillates from one or more other sources within the system) for conversion of aromatics into cycloalkanes and other non-aromatic compounds and to produce the hydrogenated middle distillate streams 2202 and 3202. The sources include the light coker gas oil streams 2334 and 3334. In certain embodiments, other sources can be provided. For instance, in the embodiments of FIGS. 2A and 2B, one or more additional sources can be selected from the middle distillate fraction 2154' from the middle distillate hydrotreating zone 2150, the middle distillate range fraction 2164' from the gas oil hydroprocessing zone 2160/1170, the middle distillate range fraction 2186' from the vacuum residue conditioning zone 2180, and/or the light range middle distillate fraction 2118' from the kerosene sweetening zone 2120. In certain embodiments as noted above middle distillate fractions 2164' and/or 2186' can be subjected to hydrotreating depending on the sulfur and nitrogen content of the middle distillate fractions, and whether they are processed in the DHG zone 2200 alone or in combination with other middle distillate streams that have lower sulfur and nitrogen content.

The selection of catalysts, conditions and the like for deep hydrogenation are dependent on the feed, the aromatic content, and the types of aromatics in the diesel range stream. The effluent stream contains the hydrogenated diesel range compounds, and lighter fractions, that are passed to the steam cracker as additional feed. In certain embodiments, the selection of catalysts and conditions are suitable to reduce aromatic content in a diesel range feedstream from a range of about 10-40 wt % or greater, to a hydrogenated distillate range intermediate product having an aromatic content of less than about 5-0.5, 5-1, 2.5-0.5, 2.5-1, or 1-0.5 wt %.

In certain embodiments, a naphtha fraction (not shown) can be obtained from the DHG zones, which can be combined with other naphtha streams in the system or processed separately. For example, in the embodiments of FIGS. 2A and 2B, naphtha produced in the DHG zone can be combined with the naphtha streams to contribute to the volume of the combined naphtha stream 2222. In certain embodiments naphtha produced in the DHG zone is passed together with the hydrogenated middle distillate stream 2202 and 3202 for steam cracking. Effluent off-gases can also be passed with the hydrogenated middle distillate stream, or recovered from the DHG zone and passed to the olefins recovery train, the saturated gas plant as part of the other gases stream 2134 and 3134, and/or directly to a fuel gas system. LPG can be recovered from the DHG zone and routed to the steam cracking zone, the olefins recovery train and/or the saturated gas plant. In certain embodiments shown with respect to FIGS. 2A and 2B, any recovered naphtha from the DHG zone can be routed through the crude complex, alone, or in combination with other wild naphtha fractions from within the integrated process. In embodiments in which any recovered naphtha is routed through the crude complex, all or a portion of the LPG produced in the DHG zone can be passed with naphtha fraction, or can be passed directly to the gas plant or a separate gas treatment zone. In certain embodiments, all, a substantial portion or a significant portion of any naphtha produced in the DHG zone is routed to the steam cracking zone (directly or through the crude complex).

The DHG zone can contain one or more fixed-bed, ebullated-bed, slurry-bed, moving bed, continuous stirred tank (CSTR) or tubular reactors, in series and/or parallel arrangement. In certain embodiments, multiple reactors can be provided in parallel in DHG zone to facilitate catalyst replacement and/or regeneration. The reactor(s) are operated under conditions effective for hydrogenation of the light coker gas oil and in certain embodiments in combination with reduced organosulfur and reduced organonitrogen middle distillate feed from other sources, and such conditions can vary based on, for instance, the particular type of reactor, the feed characteristics, and the catalyst selection. Additional equipment, including exchangers, furnaces, feed pumps, quench pumps, and compressors to feed the reactor(s) and maintain proper operating conditions, are well known and are considered part of the DHG zone. In addition, equipment including pumps, compressors, high temperature separation vessels, low temperature separation vessels and the like to separate reaction products and provide hydrogen recycle within the DHG zone, are well known and are considered part of the DHG zone.

In certain embodiments, the DHG zone operating conditions include:

a reaction temperature (° C.) in the range of from about 250-320, 250-315, 250-310, 280-320, 280-315, 280-310, 285-320, 285-315, 285-310, 290-320, 290-315, or 290-310;

a hydrogen partial pressure (barg) in the range of from about 20-100, 20-85, 20-70, 30-100, 30-85, 30-40, 40-100, 40-85 or 40-70;

a hydrogen to oil feed ratio (SLt/Lt) of up to about 3000, 2000 or 1500, in certain embodiments from about 500-3000, 500-2000, 500-1500, 1000-3000, 1000-2000 or 1000-1500; and a liquid hourly space velocity values ($h^{-1}$), on a fresh feed basis relative to the hydrogenation catalysts, in the range of from about 0.1-5.0, 0.1-3.0, 0.1-2.0, 0.5-5.0, 0.5-3.0, 0.5-2.0, 1.0-5.0, 1.0-5.0 or 1.0-2.0.

An effective quantity of hydrogenation catalyst is provided in the DHG zone that is effective for deep hydrogenation. Suitable hydrogenation catalysts contain one or more active metal component of metals or metal compounds (oxides or sulfides) selected from the Periodic Table of the Elements IUPAC Groups 7, 8, 9 and 10. In certain embodiments the active metal component is selected from the group consisting of Pt, Pd, Ti, Rh, Re, Ir, Ru, and Ni, or a combination thereof. In certain embodiments the active metal component comprises a noble metal selected from the group consisting of Pt, Pd, Rh, Re, Ir, and Ru, or a combination thereof. The combinations can be composed of different particles containing a single active metal species, or particles containing multiple active species. Such noble metals can be provided in the range of (wt % based on the mass of the metal relative to the total mass of the catalyst) 0.01-5, 0.01-2, 0.05-5, 0.05-2, 0.1-5, 0.1-2, 0.5-5, or 0.5-2. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units.

The active metal component is typically deposited or otherwise incorporated on a support such as amorphous alumina, and in certain embodiments non-acidic amorphous alumina. In certain embodiments the support comprises non-acidic amorphous alumina containing about 0.1-20, 0.1-15, 0.1-10, 0.1-5, 0.5-20, 0.5-15, 0.5-10, 0.5-5, 1-20, 1-15, 1-10, 2.5-20, 2.5-15, or 2.5-10 wt %, of zeolite, including USY zeolite. Non-acidic catalysts are selected for deep hydrogenation catalyst so as to favor hydrogenation reactions over hydrocracking reactions. Particularly effective deep hydrogenation catalyst to promote hydrogenation reactions include noble metal active catalyst components on non-acidic supports, such as Pt, Pd or combinations thereof on non-acidic supports. In certain embodiments a suitable deep hydrogenation catalyst includes a non-acidic support such as alumina having Pt as the active metal component in an amount of about 0.1-0.5 wt % based on the mass of the metal relative to the total mass of the catalyst, with relatively small amounts of zeolite such as USY zeolite, for instance 0.1-5 wt %.

In certain embodiments, the catalyst and/or the catalyst support is prepared in accordance with US Patents U.S. Pat. No. 9,221,036B2 and U.S. Ser. No. 10/081,009B2, which are incorporated herein by reference in their entireties. Such catalyst and/or catalyst support includes a modified USY zeolite support having one or more of Ti, Zr and/or Hf substituting the aluminum atoms constituting the zeolite framework thereof. For instance, the catalyst effective for deep hydrogenation include an active metal component carried on a support containing an ultra-stable Y-type zeolite, wherein the above ultra-stable Y-type zeolite is a framework-substituted zeolite (referred to as a framework-substituted zeolite) in which a part of aluminum atoms constituting a zeolite framework thereof is substituted with 0.1-5 mass % zirconium atoms and 0.1-5 mass % Ti ions calculated on an oxide basis.

Catalyst using noble metal active catalyst components are effective at relatively lower temperatures. As will be appreciated by those having ordinary skill in the art, aromatic hydrogenation reactions are more favorable at lower temperatures, whereas high temperatures are required for cracking. The delta temperature for cracking as compared to hydrogenation can be in the range of about 30-80° C.

In certain embodiments, the feedstock to the reactor within the DHG zone (a single reactor with one bed, a single reactor with multiple beds, or multiple reactors) is mixed with an excess of hydrogen gas in a mixing zone. A portion of the hydrogen gas is mixed with the feedstock to produce a hydrogen-enriched liquid hydrocarbon feedstock. This hydrogen-enriched liquid hydrocarbon feedstock and undissolved hydrogen can be supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the reactor(s) of the DHG zone.

In certain embodiments, the steam cracking complex integrated in the embodiments of FIGS. 2A, 2B, and 3 includes one or more units for steam cracking of the combination of the naphtha range feeds and the middle distillate range feeds. Products from the steam cracking zone include a quenched cracked gas stream containing mixed C1-C4 paraffins and olefins that is routed to the olefins recovery zone, a pyrolysis gasoline stream, and a pyrolysis fuel oil stream, which can be handled as described herein with respect to the streams 1224, 1228 and 1226 described in conjunction with FIG. 1, or as otherwise known.

Figure 7:
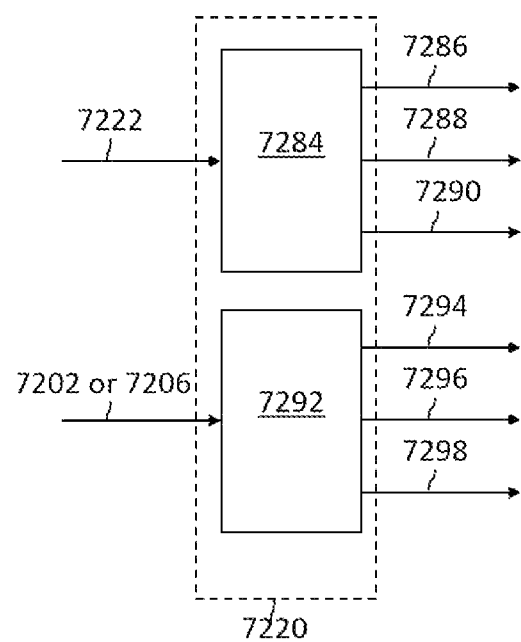
FIG. 7 schematically depicts an embodiment of a steam cracker complex including a middle distillate steam cracking section and a naphtha steam cracking section.

With reference to FIG. 7, another embodiment of a steam cracking zone is shown, which can be integrated in the embodiments of FIGS. 2A, 2B, and 3. A steam cracking zone 7220' includes multiple units for processing feedstocks having different boiling point characteristics. For instance, the steam cracking zone 7220' is shown including a naphtha steam cracking section 7284 and a middle distillate steam cracking section 7292.

The naphtha steam cracking section 7284 is operated under conditions effective for conversion of the feed, the combined naphtha stream 7222 or the hydrogenated combined naphtha stream 7206, into a major portion of light olefins, and minor portions of pyrolysis gasoline and pyrolysis oil. The naphtha steam cracking section 7284 can include operations the same or similar to that of the steam cracking zone 1220 described in conjunction with FIG. 1. Products from the naphtha steam cracking section 7284 include a quenched cracked gas stream 7286 containing mixed C1-C4 paraffins and olefins that is routed to the olefins recovery zone, a pyrolysis gasoline stream 7288, and a pyrolysis fuel oil stream 7290, which can be handled as described herein with respect to the streams 1224, 1228 and 1226 described in conjunction with FIG. 1.

The middle distillate steam cracking section 7292 is operated under conditions effective for conversion of the feed, hydrogenated middle distillate stream 7202, into a major portion of light olefins, and minor portions of pyrolysis gasoline and pyrolysis oil. Products from the middle distillate steam cracking section 7292 include a quenched cracked gas stream 7294 containing mixed C1-C4 paraffins and olefins that is routed to the olefins recovery zone, a pyrolysis gasoline stream 7296, and a pyrolysis fuel oil stream 7298, which can be handled as described herein with respect to the streams 1224, 1228 and 1226 described in conjunction with FIG. 1.

In certain embodiments, the quenched cracked gas streams 7286 and 7294 are combined and treated in a common olefins recovery zone as described herein with respect to the gas stream 1224. The pyrolysis gasoline streams can be treated separately, or the fraction derived from middle distillate steam cracking can be pretreated before combining for a common treatment, for instance as described herein with respect to the pyrolysis gasoline stream 1228. The pyrolysis oil streams can be treated separately, or the fraction derived from middle distillate steam cracking can be pretreated before combining for a common treatment, for instance as described herein with respect to the pyrolysis oil stream 1226. In other embodiments the pyrolysis oil stream obtained from naphtha cracking can be divided into heavy pyrolysis oil and light pyrolysis oil, and where the heavy pyrolysis oil from naphtha cracking is combined with the pyrolysis oil stream obtained from middle distillate cracking.

The middle distillate steam cracking section 7292 can be operated under parameters effective to crack the feed into desired products including ethylene, propylene, butadiene, and mixed butenes. Pyrolysis gasoline and pyrolysis oil are also recovered. In certain embodiments, the steam cracking furnace(s) in the middle distillate steam cracking section 7292 are operated at conditions effective to produce an effluent having a propylene-to-ethylene weight ratio of from about 0.3-0.8, 0.3-0.6, 0.4-0.8 or 0.4-0.

In one embodiment of the middle distillate steam cracking section 7292, hydrogenated middle distillate stream 7202 and the hydrogenated middle distillate stream 7202 is preheated and mixed with a dilution steam to reduce hydrocarbon partial pressure in a convection section. The steam-hydrocarbon mixture is heated further and fed to tubular reactors mounted in the radiant sections of the cracking furnaces. The hydrocarbons undergo free-radical pyrolysis reactions to form light olefins, ethylene and propylene, and other by-products.

In certain embodiments, steam cracking in the middle distillate steam cracking section 7292 is carried out using the following conditions: a temperature (° C.) in the convection section in the range of about 300-450 or 300-400; a pressure (barg) in the convection section in the range of about 7.2-9.7, 7.2-8.5, 7.2-7.7, 7.7-8.5, 7.7-9.7 or 8.5-9.7; a temperature (° C.) in the pyrolysis section in the range of about 700-850, 700-800, 700-820, 750-850, 750-800 or 750-820; a pressure (barg) in the pyrolysis section in the range of about 0.9-1.2, 0.9-1.4, 0.9-1.6, 1.2-1.4, 1.2-1.6 or 1.4-1.6; a steam-to-hydrocarbon ratio in the convection section in the range of about 0.75:1-2:1, 0.75:1-1.5:1, 0.85:1-2:1, 0.9:1-1.5:1, 0.9:1-2:1, 1:1-2:1 or 1:1-1.5:1; and a residence time (seconds) in the pyrolysis section in the range of about 0.02-1, 0.02-0.08, 0.02-0.5, 0.1-1, 0.1-0.5, 0.2-0.5, 0.2-1, or 0.5-1.

In certain embodiments, cracked gas from the middle distillate steam cracking zone furnaces is quenched in transfer line exchangers by producing, for instance, 1800 psig steam. Quenched gases are stripped with steam in a primary fractionator. Lighter gases are recovered as the overhead product; a side-draw stream contains pyrolysis fuel oil. The primary fractionator bottoms product is pyrolysis tar, which is cooled and sent to product storage. Pyrolysis fuel oil from the primary fractionator is stripped with steam in the pyrolysis fuel oil stripper, which separates pyrolysis gasoline as the overhead and pyrolysis fuel oil as the bottoms product. Gasoline in the primary fractionator overhead is condensed and combined with gasoline from the pyrolysis fuel oil stripper before being sent to a gasoline stabilizer. The gasoline stabilizer removes light products in the overhead, while the stabilizer bottoms are sent to the py-gas hydrotreater. C4 and lighter gases in the primary fractionator overhead are compressed, for instance, in two stages of compression, before entering an absorber, depropanizer and debutanizer.

Compression of C4 and lighter gases from both the naphtha steam cracking zone 7284 and the middle distillate steam cracking section 7292 can be carried out in certain embodiments in a common step, to reduce capital and operating costs associated with compression, thereby increasing efficiencies in the integrated process herein. Accordingly, both the C4 and lighter gas streams from both steam cracking zones can be passed to an olefins recovery zone, operating for instance as described with respect to the olefins recovery zone 1230.

In certain embodiments, cracked gas from the furnaces of both the naphtha steam cracking zone 7284 and the middle distillate steam cracking section 7292 are subjected to common steps for quenching, recovery of pyrolysis gasoline, recovery of pyrolysis oil, and recovery of C4 and lighter gases. For instance, in one embodiment, the cracked gas from the furnaces of both steam cracking zones are combined cooled in transfer line exchangers (quench coolers), for example, producing 1800 psig steam suitable as dilution steam. Quenched cracked gas enters a primary fractionator for removal of pyrolysis fuel oil bottoms from lighter components. The primary fractionator enables efficient recovery of pyrolysis fuel oil. Pyrolysis fuel oil is stripped with steam in a fuel oil stripper to control product vapor pressure and cooled. In addition, secondary quench can be carried out by direct injection of pyrolysis fuel oil as quench oil into liquid furnace effluents. The stripped and cooled pyrolysis fuel oil can be sent to a fuel oil pool or product storage. The primary fractionator overhead is sent to a quench water tower; condensed dilution steam for process water treating, and raw pyrolysis gasoline, are recovered. Quench water tower overhead is sent to an olefins recovery zone, particularly the first compression stage. Raw pyrolysis gasoline is sent to a gasoline stabilizer to remove any light ends and to control vapor pressure in downstream pyrolysis gasoline processing. A closed-loop dilution steam/process water system is enabled, in which dilution steam is generated using heat recovery from the primary fractionator quench pumparound loops. The primary fractionator enables efficient recovery of pyrolysis fuel oil due to energy integration and pyrolysis fuel oil content in the light fraction stream.

Advantageously, process dynamics of the configurations and the integration of units and streams attain a very high level of integration of utility streams between the steam cracking and other process units, result in increased efficiencies and reduced overall operating costs.

For instance, the hydrogen can be tightly integrated so that the net hydrogen demand from outside of the battery limits is reduced, for instance in the deep hydrogenation zone 2200. Furthermore, the integrated process described herein offers useful outlets for the off-gases and light ends from the hydroprocessing units. For instance, the stream 2134 that is passed to the saturated gas plant 2130 of the crude complex 2105 can contain off-gases and light ends from the hydroprocessing units, such as the deep hydrogenation zone 2200, the diesel hydrotreating zone 2150, the gas oil hydroprocessing zone 2160/2170 and/or from the optional residue treatment zone 2180. In other embodiments, in combination with or as an alternative to the passing these off-gases and light ends to stream 2134, all or a portion can be routed to the steam cracking zone 2220. For instance, C2s can be separated from the mixture of methane, hydrogen and C2s using a cold distillation section ("cold box") including cryogenic distillation/separation operations, which can be integrated with any or all of the steam cracking zone 2220, the saturated gas plant 2130 and/or the olefins recovery zone 2230. Methane and hydrogen can be passed to a fuel gas system or to an appropriate section of the olefins recovery zone 2230, such as the hydrogen purification system. In still further embodiments, in combination with or as an alternative to the passing these off-gases and light ends to stream 2134 and/or routing them to the steam cracking zone 2220, all or a portion can be routed to an appropriate section of the olefins recovery zone 2230, such as the depropanizer, or combining the gases with the depropanizer overheads.

The unique configurations presented herein set forth a level of integration, of streams and units that allows the use of delayed coking units and steam crackers in an economically efficient manner. The configurations support and enhance chemical conversion using integrated processes with crude oil as a feed. Accordingly, despite the use of crude oil as the feed, the processes herein are comparable to other options currently common in the industry such as ethane crackers that benefit from availability of ethane as a feed.

Embodiments described herein provide the ability to achieve a crude to chemical conversion ratio in the range of, for instance, up to 90, 80, 50 or 45 wt %, and in certain embodiments in the range of about 39-45 wt %. It should be appreciated that this crude to chemicals conversion ratio can vary depending on criteria such as feed, selected technology, catalyst selection and operating conditions for the individual unit operations.

In some embodiments, individual unit operations can include a controller to monitor and adjust the product slate as desired. A controller can direct parameters within any of the individual unit operations of the apparatus depending upon the desired operating conditions, which may, for example, be based on customer demand and/or market value. A controller can adjust or regulate valves, feeders or pumps associated with one or more unit operations based upon one or more signals generated by operator data input and/or automatically retrieved data.

Such controllers provide a versatile unit having multiple modes of operation, which can respond to multiple inputs to increase the flexibility of the recovered product. The controller can be implemented using one or more computer systems which can be, for example, a general-purpose computer. Alternatively, the computer system can include specially-programmed, special-purpose hardware, for example, an application-specific integrated circuit (ASIC) or controllers intended for a particular unit operation within a refinery.

The computer system can include one or more processors typically connected to one or more memory devices, which can comprise, for example, any one or more of a disk drive memory, a flash memory device, a RAM memory device, or other device for storing data. The memory is typically used for storing programs and data during operation of the system. For example, the memory can be used for storing historical data relating to the parameters over a period of time, as well as operating data. Software, including programming code that implements embodiments of the invention, can be stored on a computer readable and/or writeable nonvolatile recording medium, and then typically copied into memory wherein it can then be executed by one or more processors. Such programming code can be written in any of a plurality of programming languages or combinations thereof.

Components of the computer system can be coupled by one or more interconnection mechanisms, which can include one or more busses, for instance, between components that are integrated within a same device, and/or a network, for instance, between components that reside on separate discrete devices. The interconnection mechanism typically enables communications, for instance, data and instructions, to be exchanged between components of the system.

The computer system can also include one or more input devices, for example, a keyboard, mouse, trackball, microphone, touch screen, and other man-machine interface devices as well as one or more output devices, for example, a printing device, display screen, or speaker. In addition, the computer system can contain one or more interfaces that can connect the computer system to a communication network, in addition or as an alternative to the network that can be formed by one or more of the components of the system.

According to one or more embodiments of the processes described herein, the one or more input devices can include sensors and/or flow meters for measuring any one or more parameters of the apparatus and/or unit operations thereof. Alternatively, one or more of the sensors, flow meters, pumps, or other components of the apparatus can be connected to a communication network that is operatively coupled to the computer system. Any one or more of the above can be coupled to another computer system or component to communicate with the computer system over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms can be affected by utilizing any suitable technique including but not limited to those utilizing wired networks and/or wireless networks and protocols.

Although the computer system is described above by way of example as one type of computer system upon which various aspects of the processes herein can be practiced, it should be appreciated that the invention is not limited to being implemented in software, or on the computer system as exemplarily described. Indeed, rather than implemented on, for example, a general purpose computer system, the controller, or components or subsections thereof, can alternatively be implemented as a dedicated system or as a dedicated programmable logic controller (PLC) or in a distributed control system. Further, it should be appreciated that one or more features or aspects of the processes can be implemented in software, hardware or firmware, or any combination thereof. For example, one or more segments of an algorithm executable by a controller can be performed in separate computers, which in turn, can be in communication through one or more networks.

In some embodiments, one or more sensors and/or flow meters can be included at locations throughout the process, which are in communication with a manual operator or an automated control system to implement a suitable process modification in a programmable logic controlled process. In one embodiment, a process includes a controller which can be any suitable programmed or dedicated computer system, PLC, or distributed control system. The flow rates of certain product streams can be measured, and flow can be redirected as necessary to meet the requisite product slate.

Factors that can result in various adjustments or controls include customer demand of the various hydrocarbon products, market value of the various hydrocarbon products, feedstock properties such as API gravity or heteroatom content, and product quality (for instance, gasoline and middle distillate indicative properties such as octane number for gasoline and cetane number for middle distillates).

The disclosed processes and systems create new outlets for direct conversion of crude oil. Additionally, the disclosed processes and systems offer novel configurations that, compared to known processes and systems, requires lower capital expenditure relative to conventional approaches of chemical production from fuels or refinery by-products and that utilize refining units and an integrated chemicals complex. The disclosed processes and systems substantially increase the proportion of crude oil that is converted to high purity chemicals that traditionally command high market prices. Complications resulting from advancing the threshold of commercially proven process capacities are minimized or eliminated using the processes and systems described herein.

In certain embodiments, feedstock to the reactor(s) within one or more of the hydrocracking, hydrotreating or other hydroprocessing zones described herein (a single reactor with one bed, a single reactor with multiple beds, or multiple reactors) is mixed with an excess of hydrogen gas in a mixing zone. A portion of the hydrogen gas is mixed with the feedstock to produce a hydrogen-enriched liquid hydrocarbon feedstock. This hydrogen-enriched liquid hydrocarbon feedstock and undissolved hydrogen can be supplied to a flashing zone in which at least a portion of undissolved hydrogen is flashed, and the hydrogen is recovered and recycled. The hydrogen-enriched liquid hydrocarbon feedstock from the flashing zone is supplied as a feed stream to the reactor. The liquid product stream that is recovered from the reactor is further processed and/or recovered as provided here.

Each of the processing units are operated at conditions typical for such units, with conditions which can be varied based on the type of feed to maximize, within the capability of the unit's design, the desired products. Desired products can include fractions suitable as feedstock to the steam cracking zone 2220, or fractions suitable for use as fuel products. Likewise, processing units employ appropriate catalyst(s) depending upon the feed characteristics and the desired products. Certain embodiments of these operating conditions and catalysts are described herein, although it shall be appreciated that variations are well known in the art and are within the capabilities of those skilled in the art.

For the purpose of the simplified schematic illustrations and descriptions herein, accompanying components that are conventional in crude centers, such as the numerous valves, temperature sensors, preheater(s), desalting operation(s), and the like are not shown or described. In addition, accompanying components that are in conventional hydroprocessing units such as, for example, hydrogen recycle sub-systems, bleed streams, spent catalyst discharge sub-systems, and catalyst replacement sub-systems the like are not shown or described. Further, the numerous valves, temperature sensors, electronic controllers and the like that are conventional in fluid catalyst cracking are not included. Further, accompanying components that are in conventional in fluid catalyst cracking systems such as, for example, air supplies, catalyst hoppers, flue gas handling the like are also not shown. Further, accompanying components that are in conventional thermal cracking systems such as steam supplies, coke removal sub-systems, pyrolysis sections, convection sections and the like are not shown or described.

The methods and systems of the present invention have been described above and in the attached drawings; however, modifications will be apparent to those of ordinary skill in the art and the scope of protection for the invention is to be defined by the claims that follow.

The invention claimed is:

1. A process for petrochemical production comprising:
providing a heavy oil feedstock;
subjecting the heavy oil feedstock to coking to produce at least light coker gas oil;
subjecting the light coker gas oil to hydrogenation to hydrogenate aromatics contained in the light coker gas oil and produce hydrogenated middle distillates, wherein hydrogenation occurs in the presence of hydrogenation catalyst that contains one or more active metal components selected from Pt, Pd, Re and a combination comprising at least two of Pt, Pd or Re, and includes a catalyst support comprising non-acidic amorphous alumina and about 0.1-15 wt % of a modified USY zeolite having one or more of Ti, Zr and/or Hf substituting aluminum atoms constituting the zeolite framework thereof; and
subjecting the hydrogenated middle distillates to thermal cracking in a steam cracking complex to obtain light olefins.

2. The process as in claim 1, wherein the heavy oil feedstock is selected from the group consisting of atmospheric residue, deasphalted oil, demetallized oil, coker gas oil, gas oil obtained from a visbreaking process, and combinations comprising at least one of the foregoing heavy oils.

3. The process as in claim 1, further comprising hydrotreating the light coker gas oil to produce hydrotreated light coker gas oil, and subjecting the hydrotreated light coker gas oil to hydrogenation.

4. The process as in claim 1, further comprising thermal cracking further produces pyrolysis gasoline, the process further comprising passing the pyrolysis gasoline to hydrotreating to produce hydrotreated pyrolysis gasoline, separating the hydrotreated pyrolysis gasoline into a raffinate stream that is recycled to the steam cracking complex and an extract stream that is used for BTX recovery.

5. The process as in claim 4, further wherein coking produces coker naphtha, and wherein the coker naphtha is separated together with the hydrotreated pyrolysis gasoline.

6. The process as in claim 4, further wherein coking produces coker naphtha, the process further comprising hydrotreating the coker naphtha produced by coking to produce hydrotreated coker naphtha, and wherein the hydrotreated coker naphtha is separated together with the hydrotreated pyrolysis gasoline.

7. The process as in claim 1, wherein coking is with a delayed coker.

8. The process as in claim 7, further wherein the delayed coker operating conditions include a temperature of about 425-650° C.; a pressure of about 1-20 bars, and a steam introduction rate of about 0.1-3 wt % relative to the feedstock.

9. The process as in claim 1, wherein coking is with a fluid coker.

10. The process as in claim 9, further wherein the fluid coker operating conditions include a temperature of about 450-760° C.; a pressure of about 1-20 bars; and a steam introduction rate of about 0.1-3 wt % relative to the feedstock.

11. The process as in claim 1, wherein adsorbent material or catalytic material is added to the coking zone.

12. The process as in claim 11, wherein catalytic material is added, and wherein catalytic material is a heterogeneous catalyst selected from the group consisting of silica, alumina, silica-alumina, titania-silica, molecular sieves, silica gel, activated carbon, activated alumina, silica-alumina gel, zinc oxide, clays, fresh catalyst materials, used catalyst materials, regenerated catalyst materials and combinations thereof.

13. The process as in claim 12, wherein the heterogeneous catalyst incudes one or more active metal components of metals or metal compounds selected from the Periodic Table of the Elements IUPAC Groups 4, 5, 6, 7, 8, 9 and 10.

14. The process as in claim 13, wherein the active metal component is a metal or metal compound selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate, iron naphthenate and combinations thereof.

15. The process as in claim 11, wherein catalytic material is added, and wherein catalytic material is a homogeneous catalyst that is oil-soluble and contains one or more active metal components of metals or metal compounds selected from the Periodic Table of the Elements IUPAC Groups 4, 5, 6, 7, 8, 9 and 10.

16. The process as in claim 15, wherein the homogeneous catalyst is, or contains as an active metal component, a transition metal-based compound derived from an organic acid salt or an organo-metal compound containing Mo, V, W, Cr, Fe and combinations thereof.

17. The process as in claim 15, wherein the homogeneous catalyst is, or contains as an active metal compound, selected from the group consisting of vanadium pentoxide, molybdenum alicyclic and aliphatic carboxylic acids, molybdenum naphthenate, nickel 2-ethylhexanoate, iron pentacarbonyl, molybdenum 2-ethyl hexanoate, molybdenum di-thiocarboxylate, nickel naphthenate, iron naphthenate and combinations thereof.

18. The process as in claim 11, wherein adsorbent material is added, and wherein adsorbent material is selected from the group consisting of silica, alumina, silica-alumina, titania-silica, molecular sieves, silica gel, activated carbon, activated alumina, silica-alumina gel, zinc oxide, clays, fresh catalyst materials, spent catalyst materials, regenerated catalyst materials, and combinations thereof.

19. The process as in claim 1, wherein hydrogenation occurs at a hydrogen partial pressure of about 50-150 barg.

20. The process as in claim 1, wherein hydrogenation occurs at a reaction temperature of about 250-400° C.

21. The process as in claim 1, wherein hydrogenation occurs at a liquid hourly space velocity values, on a fresh feed basis relative to the hydrogenation catalysts, of about 0.1-5.0 $h^{-1}$.

22. The process as in claim 1, wherein hydrogenation occurs at a hydrogen to oil feed ratio of about 100-1500 SLt/Lt.

23. The process as in claim 1, wherein hydrogenation occurs:
   at a hydrogen partial pressure of about 50-150 barg;
   at a reaction temperature of about 250-400° C.;
   at a liquid hourly space velocity values, on a fresh feed basis relative to the hydrogenation catalysts, of about 0.1-5.0 $h^{-1}$; and
   at a hydrogen to oil feed ratio of about 100-1500 SLt/Lt.

24. The process as in claim 1, wherein the light coker gas oil contains at least about 10 wt % aromatics, and wherein the hydrogenated middle distillates contain less than about 1 wt % aromatics.

25. A system for petrochemical production comprising:
   a source of heavy oil feedstock;
   a coking zone operable to thermally crack heavy oil from the source of heavy oil feedstock and to produce at least light coker gas oil;
   a fixed-bed hydrogenation zone operable to produce hydrogenated middle distillates from the light coker gas oil containing an effective quantity of a hydrogenation catalyst, the hydrogenation catalyst
      containing one or more active metal components selected from Pt, Pd, Re and a combination comprising at least two of Pt, Pd or Re, and
      including a catalyst support comprising non-acidic amorphous alumina and about 0.1-15 wt% of a modified USY zeolite having one or more of Ti, Zr and/or Hf substituting aluminum atoms constituting the zeolite framework thereof; and
   a steam cracking complex operable to thermally crack the hydrogenated middle distillates for production of light olefins.

* * * * *